(12) United States Patent
Itamoto et al.

(10) Patent No.: US 8,989,966 B2
(45) Date of Patent: Mar. 24, 2015

(54) ELECTRIC POWER STEERING DEVICE AND SENSOR ABNORMALITY DETECTION DEVICE

(75) Inventors: Hidenori Itamoto, Tajimi (JP); Akira Ito, Kariya (JP); Hirozumi Eki, Okazaki (JP); Gempei Nakasone, Nisshin (JP)

(73) Assignee: JTEKT Corporation, Osaka (JP)

(*) Notice: Subject to any disclaimer, the term of this patent is extended or adjusted under 35 U.S.C. 154(b) by 0 days.

(21) Appl. No.: 13/990,963

(22) PCT Filed: Feb. 10, 2012

(86) PCT No.: PCT/JP2012/053094
§ 371 (c)(1),
(2), (4) Date: May 31, 2013

(87) PCT Pub. No.: WO2012/108525
PCT Pub. Date: Aug. 16, 2012

(65) Prior Publication Data
US 2013/0253773 A1    Sep. 26, 2013

(30) Foreign Application Priority Data

| Feb. 10, 2011 | (JP) | 2011-027388 |
| Mar. 10, 2011 | (JP) | 2011-052443 |
| Mar. 11, 2011 | (JP) | 2011-054028 |
| Mar. 16, 2011 | (JP) | 2011-057821 |
| Mar. 16, 2011 | (JP) | 2011-057822 |
| Mar. 23, 2011 | (JP) | 2011-064297 |
| Apr. 4, 2011 | (JP) | 2011-082632 |
| May 10, 2011 | (JP) | 2011-105388 |

(51) Int. Cl.
B62D 7/00 (2006.01)
B62D 5/04 (2006.01)

(52) U.S. Cl.
CPC ............. B62D 5/049 (2013.01); B62D 5/0484 (2013.01)

USPC .............................................. 701/43

(58) Field of Classification Search
USPC ........ 701/42, 41, 38, 36, 1, 48; 180/402, 444, 180/442, 6.48, 446, 400
See application file for complete search history.

(56) References Cited

U.S. PATENT DOCUMENTS

| 8,190,329 B2* | 5/2012 | Kawakami et al. ............. 701/41 |
| 2006/0089770 A1* | 4/2006 | Ito .................................. 701/41 |
| 2006/0090952 A1* | 5/2006 | Ito .................................. 180/446 |

(Continued)

FOREIGN PATENT DOCUMENTS

| JP | A-4-359126 | 12/1992 |
| JP | A-2000-185657 | 7/2000 |

(Continued)

OTHER PUBLICATIONS

May 22, 2012 International Search Report issued in Application No. PCT/JP2012/053094 (with translation).

(Continued)

*Primary Examiner* — John R Olszewski
*Assistant Examiner* — James M McPherson
(74) *Attorney, Agent, or Firm* — Oliff PLC

(57) ABSTRACT

An ECU controls the operation of an EPS actuator in order to periodically apply instantaneous motor torque to a steering system when assist continuation control is executed using a sensor signal (residual sensor signal) that is output by a sensor element in which an abnormality has not been detected, regardless of the application of an assist force. The ECU also detects an abnormality in the residual sensor signal based on whether the application of instantaneous motor torque is reflected in the residual sensor signal, which is the basis of the assist continuation control.

15 Claims, 53 Drawing Sheets

(56) References Cited

U.S. PATENT DOCUMENTS

| | | | |
|---|---|---|---|
| 2009/0267551 A1* | 10/2009 | Shibata | 318/400.21 |
| 2009/0281692 A1* | 11/2009 | Tamaizumi et al. | 701/42 |
| 2010/0045227 A1 | 2/2010 | Ura et al. | |
| 2010/0299027 A1* | 11/2010 | Aoki | 701/42 |
| 2011/0010050 A1* | 1/2011 | Suzuki et al. | 701/41 |
| 2011/0080160 A1* | 4/2011 | Tomita | 324/76.77 |
| 2011/0120797 A1* | 5/2011 | Kitahata et al. | 180/443 |

FOREIGN PATENT DOCUMENTS

| | | | |
|---|---|---|---|
| JP | A-2002-104212 | 4/2002 | |
| JP | A-2003-149062 | 5/2003 | |
| JP | A-2003-261046 | 9/2003 | |
| JP | A-2004-276697 | 10/2004 | |
| JP | A-2005-37334 | 2/2005 | |
| JP | A-2010-048760 | 3/2010 | |
| JP | A-2011-51456 | 3/2011 | |
| WO | WO 2011/007784 | * | 1/2010 |

OTHER PUBLICATIONS

Aug. 13, 2013 International Preliminary Report on Patentability issued in International Application No. PCT/JP2012/053094.

* cited by examiner

Ordinary control (ASFLG = 0) gain map

Assist continuation control (ASFLG = 1) gain map

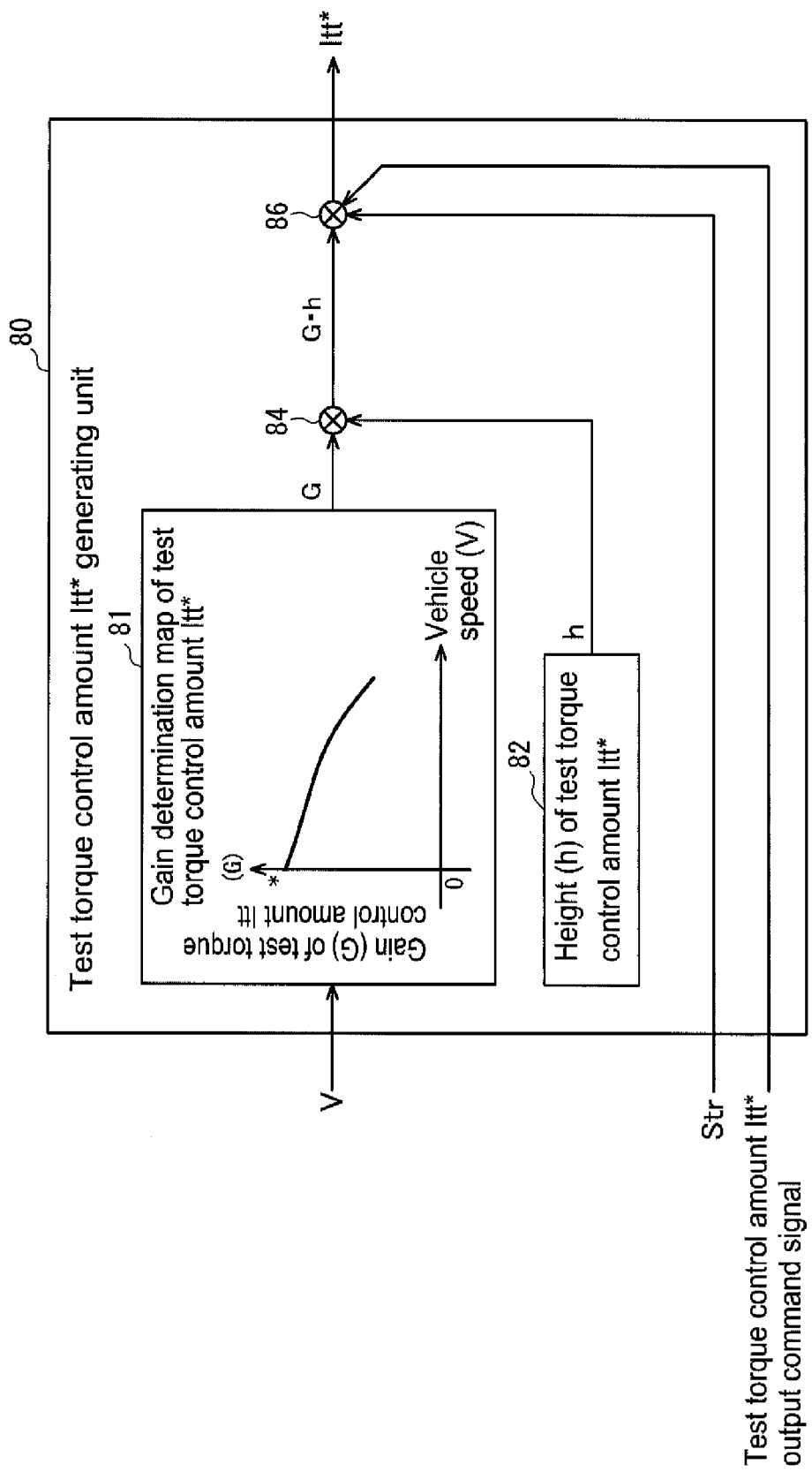

ELECTRIC POWER STEERING DEVICE AND SENSOR ABNORMALITY DETECTION DEVICE

FIELD OF THE INVENTION

The present invention relates to an electric power steering device and a sensor abnormality detection device.

BACKGROUND OF THE INVENTION

Usually, an electric power steering device (EPS) that has a motor as a drive source includes a motor rotation angle sensor that detects a rotation angle of the motor and a torque sensor that detects steering torque. The torque sensor is configured by a rotation sensor that outputs a sensor signal based on torsion of a torsion bar provided in the middle of a steering shaft. A control device of the EPS controls the motor to apply an assist force to a steering system based on a sensor signal. Therefore, detecting stably and in high precision a motor rotation angle and steering torque is one of important tasks of the EPS.

Patent Document 1 discloses a configuration for improving reliability of a torque sensor by avoiding an electric contact portion from the torque sensor, by using a noncontact-type magnetism detecting element in a sensor element. Based on this configuration, the number of sensor elements can be easily increased without increasing the magnitude of the torque sensor. Detection precision of steering torque also improves based on multiplexing of sensor signals. On the other hand, when one of the sensor elements is out of order, application of an assist force can be continued by detecting steering torque based on sensor signals generated by residual sensor elements (assist continuation control).

Patent Document 2 discloses a method for specifying in higher precision a sensor element that is out of order when any one of sensor elements of a plurality of systems becomes abnormal. By specifying the sensor element that is out of order, a situation in which assist continuation control of the EPS is possible can be expanded.

However, to enjoy the benefit of multiplexing sensor signals, at least two sensor signals are necessary, as a matter of course. Further, particularly because a magnetic sensor element has a variation in temperature characteristics, a correction process using multiple sensor signals is essential for detection in high precision. Therefore, conventionally, as described in Patent Document 2, after only one sensor signal remains, assist continuation control needs to be executed such that an assist force is gradually reduced (gradual reduction) using the residual sensor signal so as to promptly stop application of the assist force.

PRIOR ART DOCUMENT

Patent Document

Patent Document 1: Japanese Laid-Open Patent Publication No. 2003-149062
Patent Document 2: Japanese Laid-Open Patent Publication No. 2000-185657

SUMMARY OF THE INVENTION

An objective of the present invention is to provide an electric power steering device and a sensor abnormality detection device that can stably continue application of an assist force even when only one sensor signal remains.

To achieve the foregoing objective and in accordance with a first aspect of the present invention, an electric power steering device is provided that includes a steering force assist device that applies an assist force to a steering system by using a motor as a drive source, a rotation body that constitutes a part of the motor or the steering system and rotates as the motor rotates, a rotation sensor that outputs a sensor signal based on the rotation of the rotation body, a control means that controls operation of the steering force assist device to generate the assist force based on the sensor signal, and an abnormality detecting means that detects an abnormality in the sensor signal. The control means controls the operation of the steering force assist device to apply instantaneous motor torque to the steering system. The abnormality detecting means detects an abnormality in the sensor signal if the application of instantaneous motor torque is not reflected in the sensor signal.

According to the present configuration, based on application of instantaneous motor torque, a situation is created in which a timing change and a direction change of a sensor signal can be naturally forecast, by generating rotation in a rotation body that constitutes a steering system. Then, in this situation, by monitoring a change in the sensor signal, an abnormality is promptly detected, at a stage before the sensor signal indicates a clearly abnormal value. As a result, when controlling the operation of a steering force assist device using one sensor signal, application of an assist force is more stably continued. Particularly, more pronounced effect is obtained, by applying detection of an abnormality in a sensor signal based on application of instantaneous motor torque and its reflection, to a configuration in which application of an assist force is continued by using a residual sensor signal output by a failure-non-detected residual output element out of output elements that output sensor signals. Further, reliability further improves, when detection of an abnormality in a sensor signal based on application of instantaneous motor torque and its reflection is applied to a configuration in which an assist force is applied based on one of sensor signals.

In the above described electric power steering device, the control means preferably alternately applies positive and negative instantaneous motor torque to the steering system.

According to the present configuration, by alternately applying positive and negative instantaneous motor torque to the steering system, torsion can be generated in the rotation body, without requiring large steering torque.

In the above described electric power steering device, the rotation sensor is preferably a torque sensor that outputs a sensor signal based on torsion of a torsion bar, which serves as the rotation body provided in the middle of a steering shaft. The electric power steering device preferably comprises a torque detecting means that detects steering torque based on the sensor signal. The control means preferably controls the operation of the steering force assist device such that: when the absolute value of steering torque detected by the torque detecting means is less than or equal to a predetermined value, positive and negative instantaneous motor torque is alternately applied to the steering system regardless of application of the assist force; and when the absolute value of steering torque detected by the torque detecting means is greater than a predetermined value, instantaneous motor torque is applied to the steering system in an application direction of the assist force.

According to the present configuration, when the absolute value of steering torque is less than or equal to a predetermined value, positive and negative instantaneous motor torque is alternately applied to the steering system, regardless of application of an assist force. Accordingly, torsion is generated in a torsion bar provided in a steering shaft, without requiring large steering torque. On the other hand, when the absolute value of the steering torque is greater than the predetermined value, instantaneous motor torque is applied to the steering system, in the application direction of the assist force. Accordingly, because the steering torque, which has become too large, is promptly reduced, an erroneous detection due to the excessive steering torque is prevented, and steering feeling improves. Accordingly, by creating a situation in which a timing change and a direction change of a sensor signal can be naturally forecast and by monitoring a change in the sensor signal of a torque sensor in this situation, an abnormality is promptly detected.

In the above described electric power steering device, the control means preferably calculates a change amount between values based on a sensor signal before and after the application of instantaneous motor torque is reflected in the sensor signal, and changes the magnitude of instantaneous motor torque based on the magnitude of the change amount.

According to the present configuration, a change amount between a value based on a sensor signal before application of instantaneous motor torque is reflected and a value based on a sensor signal after the application of instantaneous motor torque is reflected is calculated. Then, instantaneous motor torque is changed, based on the magnitude of the calculated change amount of the sensor signal. Accordingly, instantaneous motor torque of a proper magnitude can be applied, and application of an assist force is stably continued.

In the above described electric power steering device, the control means preferably gradually reduces the magnitude of instantaneous motor torque to be applied, as the absolute value of the change amount becomes greater.

According to the present configuration, because a change amount of a sensor signal before and after reflection of the application of instantaneous motor torque is set substantially constant, an erroneous detection of determining a rotation sensor as abnormal even when the rotation sensor is normal and degradation of steering feeling is prevented. As a result, application of an assist force is more stably continued.

In the above described electric power steering device, when the absolute value of the change amount is within a first basic value, the control means preferably increases, by a predetermined amount, the magnitude of instantaneous motor torque to be applied subsequently, and when the absolute value of the change amount is equal to or greater than a second basic value, which is greater than the first basic value, the control means preferably decreases, by a predetermined amount, the magnitude of instantaneous motor torque to be applied subsequently.

According to the present configuration, the magnitude of a change amount is determined based on a comparison between the absolute value of the change amount and the first and second basic values, and an instantaneous motor torque value is changed based on the magnitude of the change value. Accordingly, an optimum instantaneous motor torque value is applied such that the absolute value of the change amount is maintained in the magnitude between the first basic value and the second basic value. Therefore, application of an assist force is more stably continued by suppressing the occurrence of an erroneous determination.

In the above described electric power steering device, the rotation sensor preferably has a plurality of output elements that output the sensor signal, and the control means preferably reduces the assist force when only one of the output elements remains in which failure is not detected by the abnormality detecting means.

According to the present configuration, after there remains only one output element in which failure is not detected, when continuously applying an assist force to the steering system by using a sensor signal that is output by the residual output element, the applied assist force is gradually reduced. Accordingly, steering torque greater than that at the ordinary control becomes necessary for a driver to perform steering, the driver can promptly know of a failure in the rotation sensor. Further, after only one output element remains, because an assist force applied to the steering system is reduced, a change in the assist torque when the residual output element further becomes out of order is suppressed. As a result, rapid degradation of steering feeling is prevented. Therefore, preferred steering performance is provided, by reducing the assist force to be applied to the steering system, after only one output element remains.

The above described electric power steering device preferably further includes a vehicle speed sensor that detects a vehicle speed. The rotation sensor preferably has a plurality of output elements that output the sensor signal. The control means preferably controls the operation of the steering force assist device to generate a greater assist force as the vehicle speed becomes smaller. When only one of the output elements remains in which failure is not detected by the abnormality detecting means, the control means preferably fixes the vehicle speed to a high vehicle-speed equivalent value, which is stored in advance, but not to a vehicle speed detected by the vehicle speed sensor.

According to the present configuration, after there remains only one output element in which failure is not detected, when continuously applying an assist force to the steering system by using a sensor signal that is output by the residual output element, the assist force applied is fixed to a value corresponding to a high vehicle-speed equivalent value. Accordingly, because the assist force applied to the steering system is minimized, steering torque greater than ordinary steering torque becomes necessary for the driver to perform steering. Therefore, the driver can promptly know failure in the rotation sensor. Further, because, after only one output element remains, the assist force applied to the steering system is fixed to a value corresponding to the high vehicle-speed equivalent value, a change in the assist torque is minimized when the residual output element further becomes out of order. As a result, rapid degradation of steering feeling is prevented. Therefore, preferred steering performance is provided, by fixing the assist force applied to the steering system to the high vehicle-speed equivalent value, after only one output element remains.

The above described electric power steering device preferably further includes a steering sensor that detects a steering angle generated in a steering and a steering angular velocity detecting means that detects a steering angular velocity by differentiating the steering angle. The control means preferably sets the magnitude of the assist force to zero when signs of the steering angle and the steering angular velocity are different.

According to the present configuration, when signs of a steering angle and a steering angular velocity are different based on the steering angle detected by the steering sensor and the steering angular velocity obtained by differentiating the steering angle, an assist force is not applied to the steering system. Accordingly, after there remains only one output element in which failure is not detected, self-steering and reverse assist is prevented, while continuing application of the assist force by using a sensor signal that is output by the residual output element.

In the above described the electric power steering device, the rotation sensor is preferably a torque sensor that outputs a sensor signal based on torsion of a torsion bar provided in the middle of a steering shaft. The electric power steering device preferably comprises a torque detecting means that detects steering torque based on the sensor signal. The torque sensor preferably has a plurality of output elements that output the sensor signal. The control preferably means executes feedback control of the motor based on a deviation between a current command value for generating the assist force corresponding to the steering torque and an actual current that flows in the motor. After only one of the output elements remains in which failure is not detected, when continuing application of the assist force by using a sensor signal that is output by the residual output element, the control means preferably sets a feedback gain used in the feedback control to be greater than a feedback gain when two or more of the output elements remain in which failure is not detected.

According to the present configuration, after there remains only one output element in which failure is not detected, when continuing application of the assist force by using a sensor signal that is output by the residual output element, a feedback gain of a feedback control means is set to be greater than that when there remain two or more output elements in which failure is not detected. Accordingly, after there remains only one output element in which failure is not detected, application of the assist force is continued by using a sensor signal that is output by the residual output element. When application of instantaneous motor torque occurs to improve reliability of the residual torque sensor, a sensor signal is output in good response from the residual output element.

The above described electric power steering device preferably further includes a vehicle speed sensor that detects a vehicle speed. The control means preferably changes the magnitude of the instantaneous motor torque based on a vehicle speed detected by the vehicle speed sensor.

According to the present configuration, the magnitude of instantaneous motor torque is changed based on a vehicle speed. When the same steering torque is applied, an assist force to be applied to the steering system changes depending on a vehicle speed. Rotation of a rotation body when instantaneous motor torque is applied in a state in which a large assist force is acting is smaller than rotation of a rotation body when the same magnitude of instantaneous motor torque is applied in a state in which a small assist force is acting. When rotation of a rotation body becomes small, the possibility of an erroneous detection that a rotation sensor is determined to be abnormal even when the rotation sensor is normal is increased. On the other hand, when instantaneous motor torque greater than is necessary is applied in a state in which a small assist force is acting, rotation of the rotation body becomes too large, and steering feeling is degraded. In this respect, according to the present configuration, by increasing or decreasing the magnitude of instantaneous motor torque to match a vehicle speed by using the vehicle speed as a variable, rotation of the rotation body is set to a constant value. Therefore, erroneous detection of determining that a rotation sensor is abnormal even when the rotation sensor is normal and degradation of steering feeling is prevented. As a result, application of the assist force is more stably continued.

In the above described electric power steering device, the control means preferably gradually reduces the magnitude of instantaneous motor torque to be applied as a vehicle speed becomes higher.

According to the present configuration, an assist force becomes smaller as a vehicle speed becomes higher. Since the magnitude of instantaneous motor torque to be applied is gradually reduced in accordance with reduction of the assist force, rotation of the rotation body becomes at a constant value. Therefore, erroneous detection of determining that a rotation sensor is abnormal even when the rotation sensor is normal and degradation of steering feeling is prevented. As a result, application of the assist force is more stably continued.

The above described electric power steering device preferably further includes a lateral G sensor that detects lateral direction acceleration acting on a vehicle. The control means preferably changes the magnitude of instantaneous motor torque based on lateral direction acceleration detected by the lateral G sensor.

According to the present configuration, the magnitude of instantaneous motor torque is changed based on lateral direction acceleration. In general, as lateral direction acceleration that acts on a vehicle becomes greater, reactive force that is input to the steering system from a road surface becomes larger. Therefore, when the lateral direction acceleration becomes greater, the driver applies greater steering torque to the steering, and a greater assist force is applied to the steering system. Therefore, rotation of the rotation body when instantaneous motor torque is applied in a state in which lateral direction acceleration that acts on the vehicle is large becomes smaller than rotation of the rotation body when the same magnitude of instantaneous motor torque is applied in a state in which lateral direction acceleration that acts on the vehicle is small. When rotation of the rotation body becomes small, the possibility is increased that a rotation sensor is erroneously detected to be abnormal even when the rotation sensor is normal. On the other hand, when instantaneous motor torque that is greater than is necessary is applied in a state in which lateral direction acceleration that acts on the vehicle is small, rotation of the rotation body becomes too large, and steering feeling is degraded. In this respect, according to the present configuration, by increasing or decreasing the magnitude of instantaneous motor torque to match lateral direction acceleration by using the lateral direction acceleration as a variable, rotation of the rotation body is set to a constant value. Therefore, erroneous detection of determining that a rotation sensor is abnormal even when the rotation sensor is normal and degradation of steering feeling is prevented. As a result, application of the assist force is more stably continued.

In the above described electric power steering device, the control means preferably gradually increases the magnitude of instantaneous motor torque to be applied as lateral direction acceleration becomes greater.

According to the present configuration, an assist force becomes greater as lateral direction acceleration becomes greater. Since the magnitude of instantaneous motor torque is gradually increased in accordance with the increase of the assist force, rotation of the rotation body becomes at a constant value. Therefore, erroneous detection of determining that a rotation sensor is abnormal even when the rotation sensor is normal and degradation of steering feeling is prevented. As a result, application of the assist force is more stably continued.

To achieve the foregoing objective and in accordance with a second aspect of the present invention, a sensor abnormality detection device is provided that includes a sensor that generates a signal corresponding to displacement of an item to be detected that is displaced by drive of a drive source, and a control device that controls the drive source based on a signal generated by the sensor. The control device includes an abnormality detecting means that detects an abnormality in a signal generated by the sensor. If an instantaneous control amount is not reflected in the sensor signal in a case in which the control device supplies the instantaneous control amount to the drive source, in addition to an ordinary control amount by the control device, the abnormality detecting means determines that a sensor signal is abnormal.

According to the present configuration, an advantage similar to the advantage of the first aspect of the present invention is achieved.

Effects of the Invention

According to the present invention, it is possible to provide an electric power steering device and a sensor abnormality detection device that can stably continue application of an assist force, even when there remains only one sensor signal.

BRIEF DESCRIPTION OF THE DRAWINGS

FIG. 55 is a map for determining a gain of a test torque control amount of a test torque control amount generating unit;

DETAILED DESCRIPTION OF THE PREFERRED EMBODIMENTS

First Embodiment

A first embodiment of the present invention will now be described below.

First, outline of an EPS (electric power steering device) is described.

Figure 1:
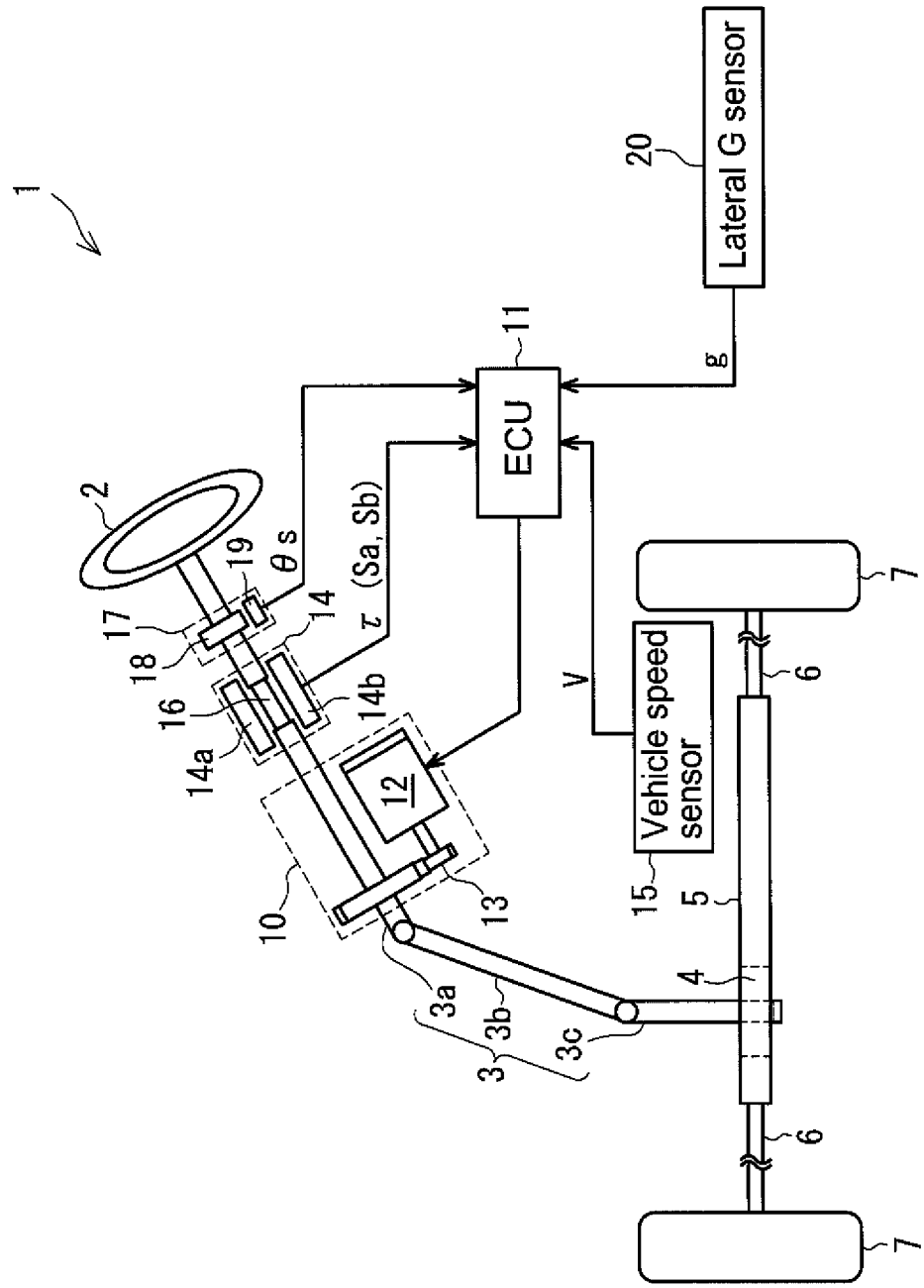
FIG. 1 is a schematic configuration diagram of an electric power steering device (EPS) according to a first embodiment.

As shown in FIG. 1, in an EPS 1, a steering shaft 3, to which a steering wheel 2 is fixed, is interlocked with a rack shaft 5 via a rack-and-pinion mechanism 4. Rotation of the steering shaft 3 caused by steering operation is converted to a reciprocal linear operation of the rack shaft 5 by the rack-and-pinion mechanism 4. The linear operation of the rack shaft 5 is transmitted to a knuckle (not shown), via tie rods 6, 6 that are interlocked respectively with both ends of the rack shaft 5. Accordingly, a steering angle of steerable wheels 7, 7 is changed, and the travelling direction of the vehicle is changed. The steering shaft 3 is configured by interlocking a column shaft 3a, an intermediate shaft 3b, and a pinion shaft 3c.

The EPS 1 includes an EPS actuator 10 as a steering force assist device, and an ECU (Electric Control Unit) 11. The EPS actuator 10 applies an assist force to a steering system to assist a steering operation. The EPS actuator 10 is what is called a column type EPS actuator. That is, the EPS actuator 10 includes a motor 12 as a drive source, and a speed reducing mechanism 13. The motor 12 is interlocked with the column shaft 3a via the speed reducing mechanism 13. A direct-current motor with brushes is employed as the motor 12. The EPS actuator 10 applies motor torque (rotation force) to the steering system as an assist force, by transmitting a decelerated rotation of the motor 12 to the column shaft 3a.

The ECU 11 functions as a control means that controls the operation of the EPS actuator 10. A torque sensor 14, a vehicle speed sensor 15, a steering sensor 17, and a lateral G sensor 20 are connected to the ECU 11. The torque sensor 14 includes two sensor elements 14a, 14b. In the column shaft 3a, a torsion bar 16 is provided between the speed reducing mechanism 13 and the steering wheel 2. The two sensor elements 14a, 14b generate sensor signals Sa, Sb, respectively, based on torsion of the torsion bar 16. The ECU 11 also functions as a torque detecting means. The ECU 11 detects steering torque τ, which is transmitted via the steering shaft 3, based on the two sensor signals Sa, Sb.

The two sensor elements 14a, 14b are magnetism detecting elements. In the present embodiment, a hall IC is employed as a magnetism detecting element. The two sensor elements 14a, 14b are provided at an outer periphery of a sensor core (not shown) that generates a magnetic flux change based on torsion of the torsion bar 16. When the torsion bar 16 is twisted based on input of torque to the steering shaft 3 as a rotation shaft, a magnetic flux that passes both sensor elements 14a, 14b changes. The sensor elements 14a, 14b generate voltages respectively in response to a magnetic flux change, and output the generated voltages to the ECU 11 as sensor signals Sa, Sb, respectively.

The ECU 11 detects the steering torque τ, based on both sensor signals Sa, Sb, which are output by the torque sensor 14, that is, both sensor elements 14a, 14b as output elements.

The steering sensor 17 is provided between the torque sensor 14 in the column shaft 3a and the steering wheel 2. The steering sensor 17 is a magnetic rotation sensor that includes a rotor 18, which is fixed to the column shaft 3a, and a sensor element (hall IC) 19, which detects a magnetic flux change generated by rotation of the rotor 18. The steering sensor 17 outputs an output voltage of a sensor element 19, which varies in response to changes in the magnetic flux, as a sensor signal (θs), to the ECU 11. The ECU 11 detects a steering angle θs, based on the sensor signal from the steering sensor 17.

The lateral G sensor 20 detects lateral direction acceleration (lateral G), which acts on the vehicle. The ECU 11 detects lateral direction acceleration g, based on an output signal of the lateral G sensor 20. Then, the ECU 11 calculates a target assist force based on the steering torque and the vehicle speed V detected by the vehicle speed sensor 15, and executes power feed control of the motor 12 so as to generate the target assist force. The ECU 11 controls the assist force to be applied to the steering system by the power feed control of the motor 12.

Next, a configuration of the ECU 11 is described.

Figure 2:
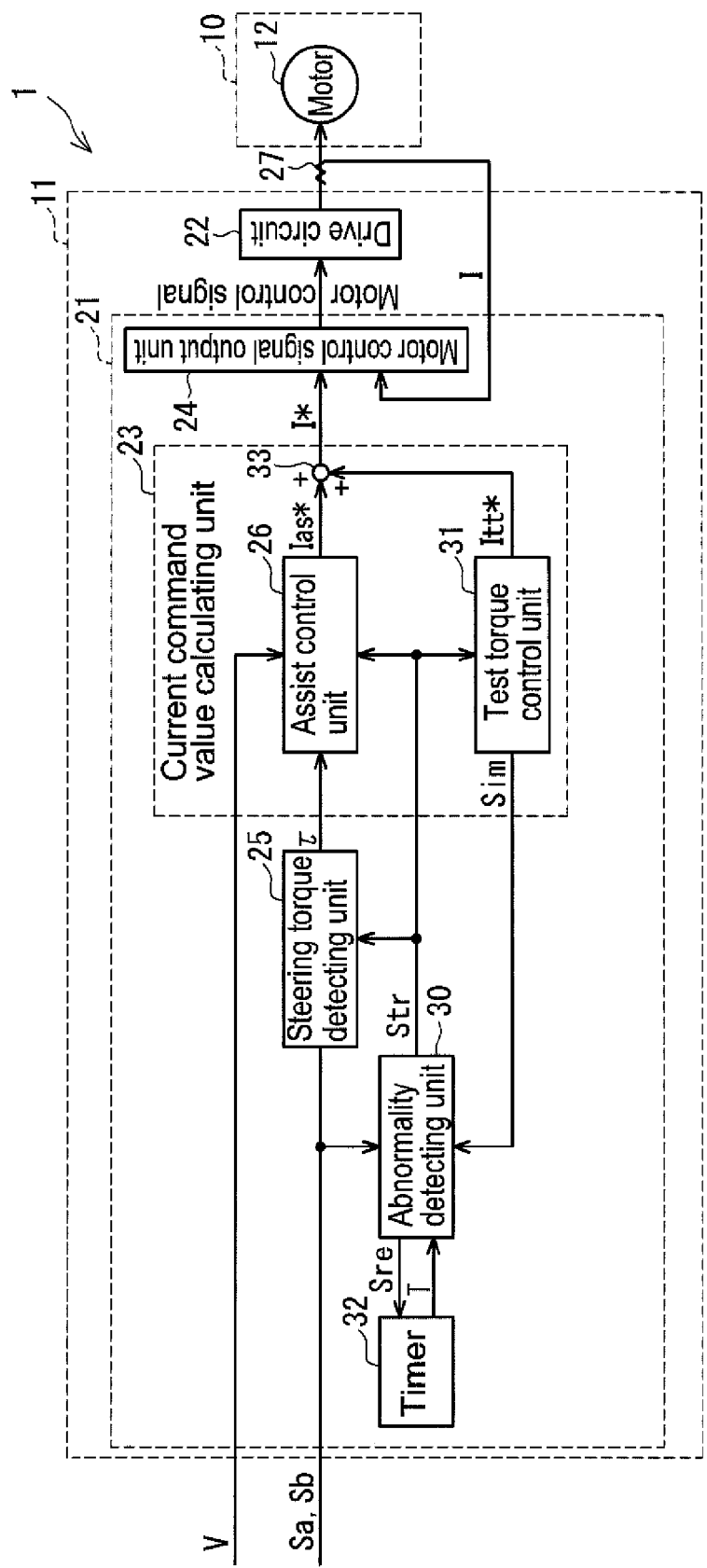
FIG. 2 is a control block diagram of the EPS.

As shown in FIG. 2, the ECU 11 includes a microcomputer 21 that outputs a motor control signal, and a drive circuit 22 that supplies drive power to the motor 12 based on the motor control signal. The microcomputer 21 includes a current command value calculating unit 23, a motor control signal output unit 24, and a steering torque detecting unit 25.

The steering torque detecting unit 25 detects the steering torque τ, based on the two sensor signals Sa, Sb that are generated by the torque sensor 14. As described above, the torque sensor 14 is a magnetic torque sensor that uses a magnetism detecting element for the sensor element. Therefore, the steering torque detecting unit 25 detects the steering torque τ in high precision by executing a correction process (temperature characteristics and the like) using the sensor signals Sa, Sb of the two systems.

The current command value calculating unit 23 calculates a current command value I* corresponding to the target assist force to be generated in the EPS actuator 10. The current command value calculating unit 23 calculates a basic component of the target assist force based on the steering torque τ, which is detected by the steering torque detecting unit 25, and the vehicle speed V, which is detected by the vehicle speed sensor 15. Describing in detail, the current command value calculating unit 23 includes an assist control unit 26. The assist control unit 26 calculates a basic assist control amount Ias* as a basic component for generating the assist force corresponding to the steering torque τ, by using a vehicle speed adaptive three-dimensional map. Specifically, the assist control unit 26 calculates the basic assist control amount Ias* to have a greater value (absolute value) such that a greater assist force is applied to the steering system as the steering torque τ (absolute value) becomes greater. Further, the assist control unit 26 calculates the basic assist control amount Ias* to have a greater value (absolute value) as the vehicle speed V becomes smaller. The assist control unit 26 calculates the current command value I* to be applied to the motor 12, by using the basic assist control amount Ias* as a basic component of the target assist force in power assist control.

The motor control signal output unit 24 generates a motor control signal based on the current command value I* calculated by the current command value calculating unit 23. The motor control signal output unit 24 fetches the current command value I* calculated by the current command value calculating unit 23, and an actual current value I of the motor 12 detected by a current sensor 27. Then, the motor control signal output unit 24 generates the motor control signal by executing current feedback control so as to cause the current command value I* to follow the actual current value I.

The microcomputer 21 (the motor control signal output unit 24) outputs the motor control signal to the drive circuit 22. The drive circuit 22 supplies drive power that is based on the motor control signal to the motor 12. The microcomputer 21 executes the power assist control by controlling the operation of the EPS actuator 10 via the drive circuit 22.

The microcomputer 21 also functions as an abnormality detecting means, which detects an abnormality in the torque sensor 14. That is, as shown in FIG. 2, the microcomputer 21 includes an abnormality detecting unit 30. The abnormality detecting unit 30 detects both sensor signals Sa, Sb generated by the torque sensor 14, and resultantly detects presence or absence of an abnormality in the torque sensor 14. The abnormality detecting unit 30 generates an abnormality detection signal Str, based on a detection result. The abnormality detection signal Str includes information that indicates presence or absence of an abnormality in both sensor signals Sa Sb, and that resultantly indicates presence or absence of failure in both sensor elements 14a, 14b corresponding respectively to both sensor signals Sa, Sb.

The microcomputer 21 executes power assist control in accordance with presence or absence of an abnormality in the torque sensor 14 detected by the abnormality detecting unit 30, or in accordance with an abnormality occurrence mode. The power assist control includes three types of ordinary power assist control (ordinary control), assist stop control, and assist continuation control.

The microcomputer 21 executes the ordinary control when the torque sensor 14 is normal, that is, when both sensor elements 14a, 14b are normal. The microcomputer 21 executes the assist stop control when both sensor elements 14a, 14b are abnormal. That is, the current command value calculating unit 23 of the microcomputer 21 stops outputting the current command value I* when it is determined that both sensor elements 14a, 14b are out of order based on the abnormality detection signal Str.

The microcomputer 21 executes the assist continuation control when only one of the sensor elements 14a, 14b is abnormal. That is, when the steering torque detecting unit 25 determines that only one of the sensor elements 14a, 14b is out of order based on the abnormality detection signal Str, the steering torque detecting unit 25 continues detection of the steering torque τ by using a sensor signal (hereinafter, "residual sensor signal") that is generated in the other sensor element, which is not out of order. The current command value calculating unit 23 calculates the current command value I* based on the steering torque τ that is detected by using the residual sensor signal. Then, based on the current command value I*, the power assist control is continuously executed. When the assist continuation control is being executed, the abnormality detecting unit 30 writes 0 into a flag ASFLG (flag that indicates a state quantity: memory). When the assist continuation control is not being executed, the abnormality detecting unit 30 writes 1 into the flag ASFLG. In this case, the correction process using the two sensor signals Sa, Sb as described above is not executed.

During execution of the assist continuation control, the ECU 11 controls the operation of the EPS actuator 10 so as to periodically apply instantaneous motor torque to the steering system, regardless of application of the assist force as an EPS original function. Then, the ECU 11 detects an abnormality in the residual sensor signal based on whether application of instantaneous motor torque is reflected in the residual sensor signal that becomes a basis of the assist continuation control.

That is, when one of the sensor elements 14a, 14b is out of order, an abnormality determination (detection) cannot be executed based on a comparison between the one residual sensor signal and the other sensor signal, for the one residual sensor signal. Taking this point into account, the ECU 11 applies instantaneous motor torque to the steering system so as to generate torsion in the torsion bar 16 at the execution of assist continuation control. Accordingly, the ECU 11 creates a situation in which a timing change and a direction change of the residual sensor signal can be naturally forecast. In this situation, the ECU 11 can promptly detect an abnormality at a stage before the residual sensor signal indicates a clearly abnormal value, by monitoring a change in the residual sensor signal.

The current command value calculating unit 23 includes a test torque control unit 31. The test torque control unit 31 generates a test torque control amount Itt* as a control component for applying instantaneous motor torque. Output time of the test torque control amount Itt* per one time is set to such an extent that the steering wheel 2 is moved very little by inertia of the application of instantaneous motor torque based on the test torque control amount Itt*. The current command value calculating unit 23 (the adder 33) generates the current command value I* by adding the test torque control amount Itt* to the basic assist control amount Ias* generated by the assist control unit 26.

Further, the test torque control unit 31 generates an application signal Sim at each time of generating the test torque control amount Itt*. The application signal Sim indicates that instantaneous motor torque based on the test torque control amount Itt* is applied. The abnormality detecting unit 30 executes detection of an abnormality in the residual sensor signal at the assist continuation control, based on presence or absence of the application signal Sim.

Further, the microcomputer 21 includes a timer 32. When the abnormality detecting unit 30 detects an abnormality in the residual sensor signal, the abnormality detecting unit 30 measures a lapse time T since first detection of an abnormality by using the timer 32. Further, the abnormality detecting unit 30 includes a counter (not shown), and measures number of times of detecting an abnormality (number of times of abnormality detection n) in the residual sensor signal by the counter. When an abnormality is detected at a threshold number of times n0 before the lapse time T exceeds a threshold time T0, the abnormality detecting unit 30 determines that a sensor element corresponding to the residual sensor signal is out of order.

Next, an application state of instantaneous motor torque at the execution of assist continuation control is described.

Figure 5:
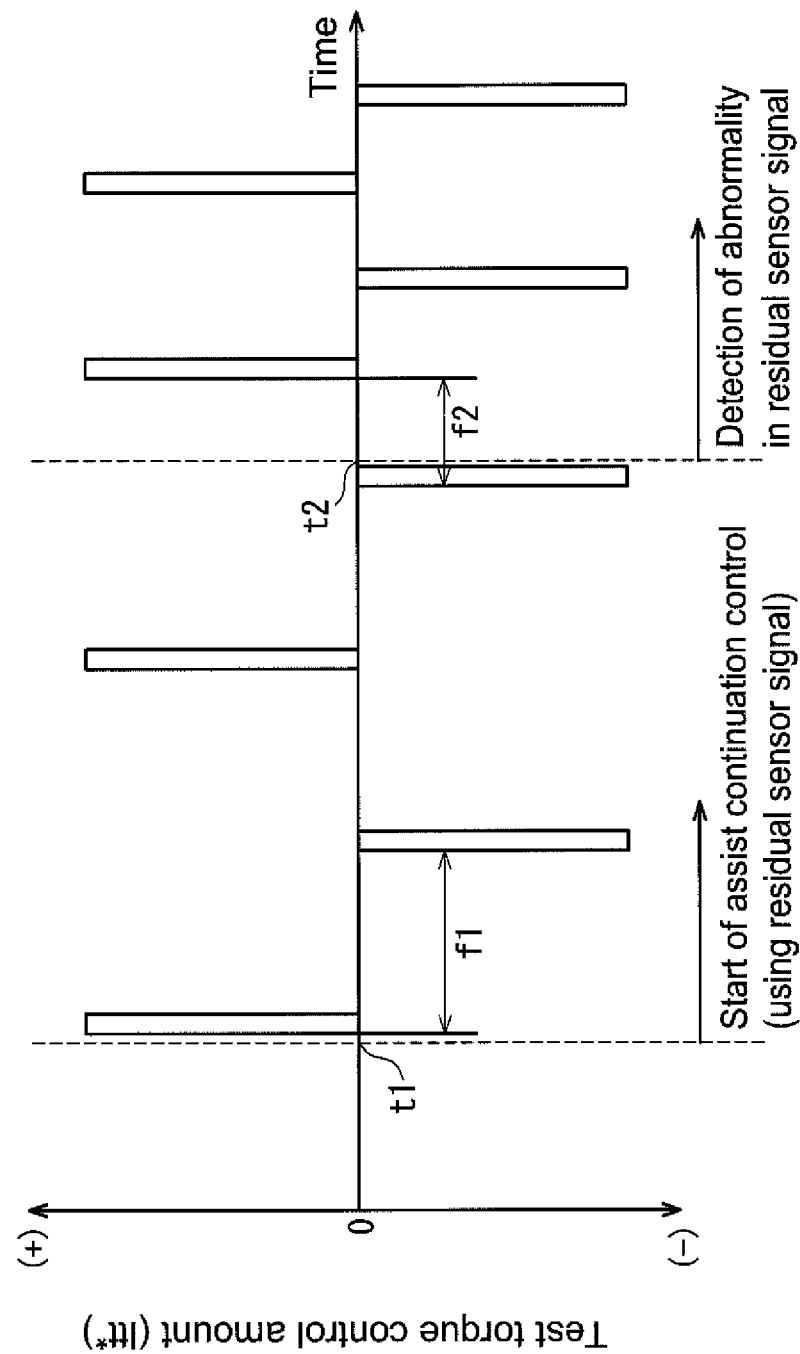
FIG. 5 is an explanatory diagram showing an application manner of instantaneous motor torque at an assist continuation control.

When execution of the assist continuation control is started (a time point t1), the test torque control unit 31 periodically generates the test torque control amount Itt* by alternately inverting the sign (+ or −) after the start of the execution as shown in FIG. 5. That is, instantaneous motor torque is periodically applied to the steering system, and at the same time, the application direction is alternately changed.

When an abnormality in the residual sensor signal is detected (a time point t2) via the abnormality detecting unit 30 during the execution of the assist continuation control, the test torque control unit 31 shortens an output cycle of the test torque control amount Itt*, after the abnormality is detected. That is, an output cycle f2 after the abnormality detection becomes shorter than an output cycle f1 that is before the abnormality detection (f1>f2). As a result, the application cycle of instantaneous motor torque based on the test torque control amount Itt* also becomes short. The test torque control unit 31 shortens the application cycle of instantaneous motor torque only during a period from first detection of an abnormality in the residual sensor signal to confirmation of failure in a sensor element corresponding to the residual sensor signal or only during a period from first detection of an abnormality in the residual sensor signal to confirmation of normality of the sensor element.

Next, a process of the power assist control by the ECU 11 (the microcomputer 21) that is configured as described above is described.

Figure 3:
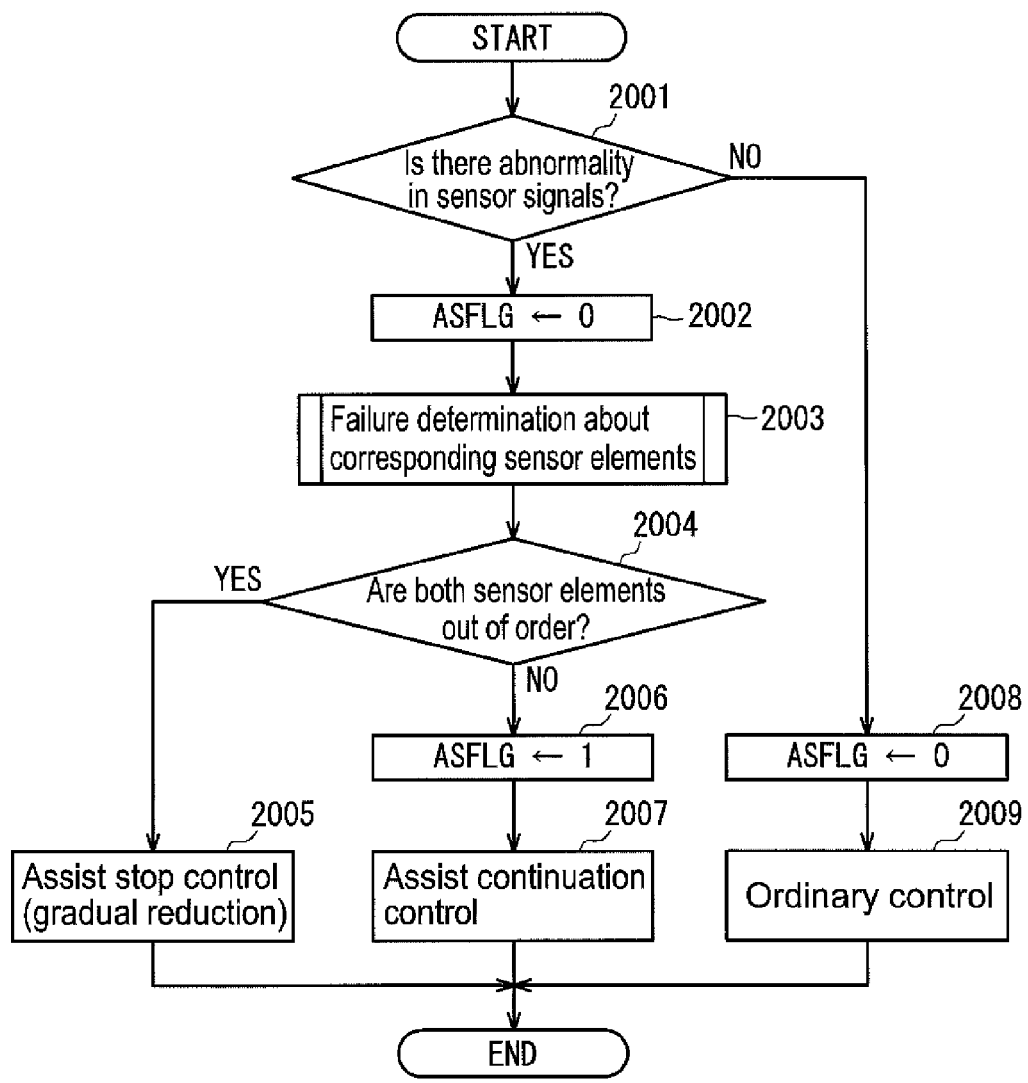
FIG. 3 is a flowchart showing a process of power assist control in accordance with an abnormality occurrence mode of a torque sensor.

As shown in FIG. 3, the microcomputer 21 determines presence or absence of an abnormality in the sensor signals Sa, Sb by the abnormality detecting unit 30 (Step 2001). Detection of an abnormality in the sensor signals Sa, Sb is executed based on a determination on whether values of the sensor signals Sa, Sb are deviated from values that the sensor signals Sa, Sb can take at normal times and a comparison determination about values of the sensor signals Sa, Sb and a change amount per unit time and the like.

When the abnormality detecting unit 30 detects an abnormality in at least one of the sensor signals Sa, Sb (Step 2001: YES), the microcomputer 21 writes 0 into the flag ASFLG, which indicates that the assist continuation control is being executed (Step 2002).

Next, the microcomputer 21 executes a failure determination (detection) about the sensor elements 14a, 14b, which are output elements of the sensor signals Sa, Sb (Step 2003), based on a result of the abnormality detection that is detected at Step 2001. When it is determined that both sensor elements 14a, 14b are out of order (Step 2004: YES), the microcomputer 21 promptly stops the power assist control, and executes assist stop control of gradually reducing the assist force, for failsafe (Step 2005). Further, the test torque control unit 31 stops outputting the test torque control amount Itt*, based on the abnormality detection signal Str that is input from the abnormality detecting unit 30.

On the other hand, at Step 2004, when it is determined that only one of the sensor elements 14a, 14b, which correspond to the sensor signals Sa, Sb respectively, is out of order (Step 2004: NO), the microcomputer 21 writes 1 into the flag ASFLG, which indicates that the assist continuation control is being executed (Step 2006), and executes the assist continuation control (Step 2007). That is, the microcomputer 21 detects the steering torque τ, based on a sensor signal (residual sensor signal) generated by the residual sensor element which is not determined to be out of order. Then, the microcomputer 21 continues the power assist control using the residual sensor signal.

When it is detected at Step 2001 that an abnormality is not present in the sensor signals Sa, Sb, that is, all the sensor signals Sa, Sb are normal (Step 2001: NO), the microcomputer 21 writes 0 into the flag ASFLG, which indicates that the assist continuation is being executed (Step 2008), and the microcomputer 21 executes the ordinary power assist control (Step 2009).

Next, a process of detection of an abnormality in the residual sensor signal at the assist continuation control is described.

Figure 4:
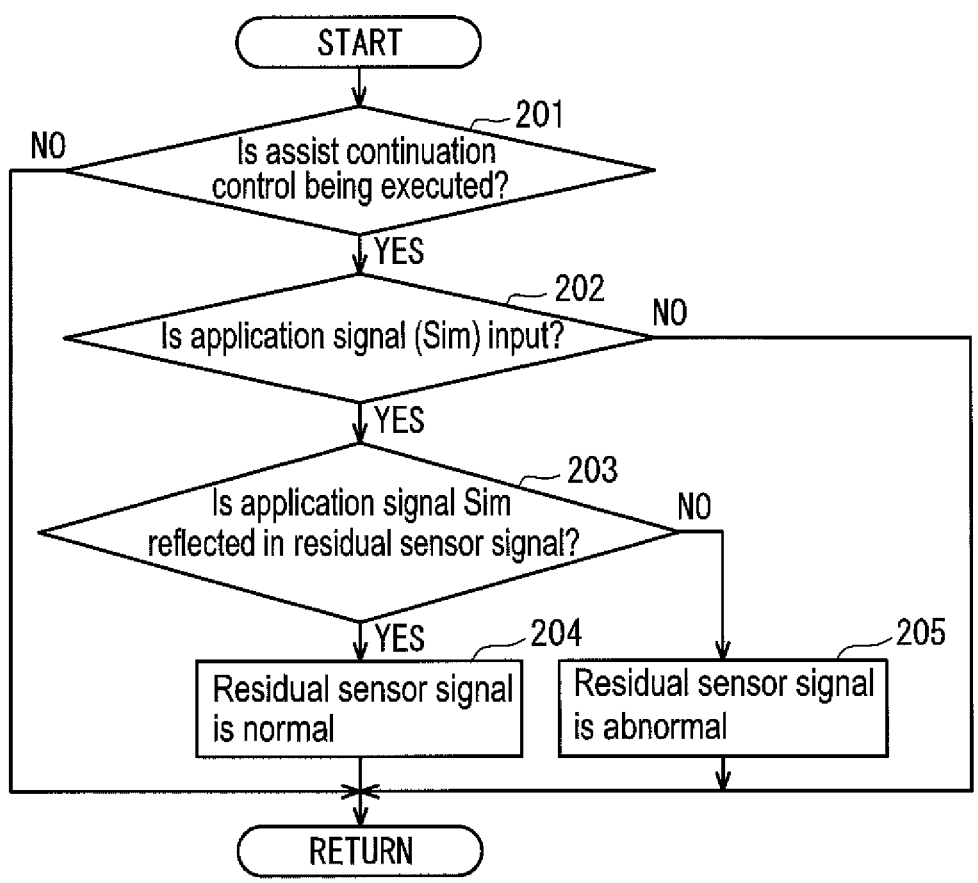
FIG. 4 is a flowchart showing a process of detection of an abnormality in a residual sensor signal.

As shown in FIG. 4, the abnormality detecting unit 30 waits for execution of the assist continuation control (Step 201: NO). When the abnormality detecting unit 30 determines that the assist continuation control is being executed (Step 201: YES), the abnormality detecting unit 30 determines presence or absence of input of the application signal Sim (Step 202).

When there is no input of the application signal Sim (Step 202: NO), the abnormality detecting unit 30 ends the process. When there is input of the application signal Sim (Step 202: YES), the abnormality detecting unit 30 determines whether application of instantaneous motor torque indicated by the application signal Sim is reflected in an input residual sensor signal (Step 203). The determination is executed based on whether the residual sensor signal changes at a suitable timing (within predetermined time) corresponding to the application of instantaneous motor torque and whether the direction and the magnitude of a change in the residual sensor signal are proper values.

When the abnormality detecting unit 30 determines that application of instantaneous motor torque is reflected in the residual sensor signal (Step 203: YES), the abnormality detecting unit 30 determines that the residual sensor signal is normal (Step 204). When application of instantaneous motor torque is not reflected in the residual sensor signal (Step 203: NO), the abnormality detecting unit 30 determines that the residual sensor signal is abnormal (Step 205).

When it is determined in the process at Step 205 that the residual sensor signal is abnormal, the abnormality detecting unit 30 executes a determination process on whether a sensor element corresponding to the sensor signal is really out of order.

Next, a process of a failure determination about a sensor element corresponding to the residual sensor signal is described.

Figure 6:
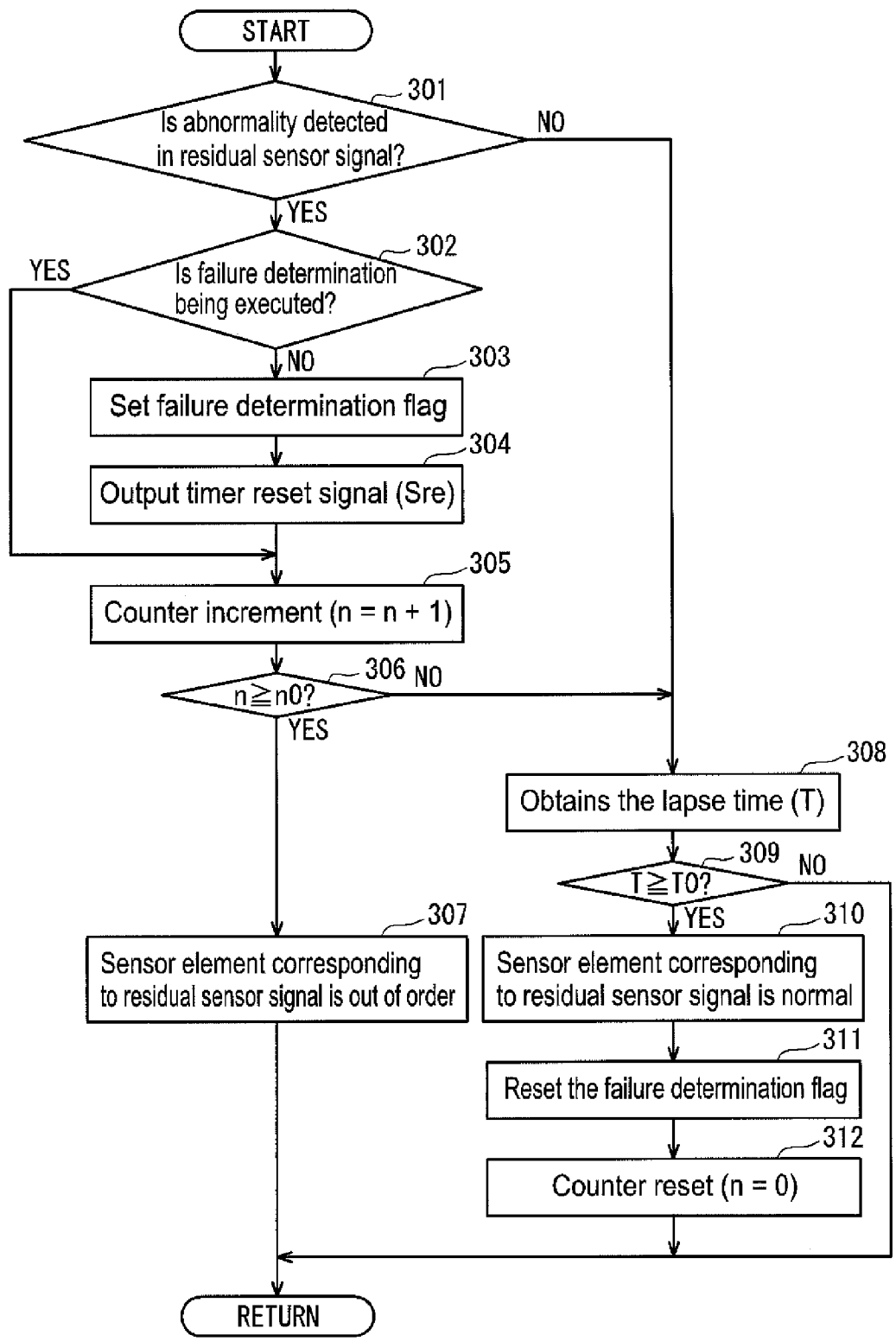
FIG. 6 is a flowchart showing a process of a failure determination about a sensor element corresponding to a residual sensor signal.

As shown in FIG. 6, when the abnormality detecting unit 30 detects an abnormality in the residual sensor signal in the process at Step 205 in a flowchart in FIG. 4 (Step 301: YES), the abnormality detecting unit 30 determines whether a failure determination about a sensor element corresponding to the residual sensor signal is already being executed (Step 302). The determination is executed based on whether a failure determination flag that indicates whether a failure determination about the sensor element is being executed is set.

When the failure determination about the sensor element is being executed, the failure determination flag is set, and when the failure determination about the sensor element is not being executed, the failure determination flag is reset.

When the failure determination is not yet executed (Step 302: NO), that is, when the abnormality detection at Step 301 is first detection of an abnormality that becomes a start point of the failure determination, the abnormality detecting unit 30 sets the failure determination flag (Step 303).

The abnormality detecting unit 30 outputs a reset signal Sre to the timer 32, after setting the failure determination flag (Step 304), and starts measuring the lapse time T since first detection of an abnormality. Accordingly, the abnormality detecting unit 30 executes a failure determination process about a sensor element corresponding to the residual sensor signal in which an abnormality has been detected.

That is, when starting the failure determination process by executing the process of Step 303 and Step 304, or when it is determined at Step 302 that the failure determination is already being executed (Step 302: YES), the abnormality detecting unit 30 increments the own counter that counts the number of tabnormality detections n (n=n+1, Step 305).

The abnormality detecting unit 30 determines whether the number of abnormality detections n is greater than or equal to the threshold number of times n0 (Step 306). When the number of abnormality detections n is greater than or equal to the threshold number of times n0 (n≥n0, Step 306: YES), the abnormality detecting unit 30 determines that a sensor element corresponding to the residual sensor signal is out of order (Step 307).

When it is determined at Step 306 that the number of times of abnormality detection n is less than the threshold number of times n0 (n<n0, Step 306: NO), or when an abnormality is not detected at Step 301 (Step 301: NO), the abnormality detecting unit 30 obtains the lapse time T from the timer 32 (Step 308). The abnormality detecting unit 30 determines whether the obtained lapse time T is greater than or equal to the threshold time T0 (Step 309). When the abnormality detecting unit 30 determines that the obtained lapse time T is greater than or equal to the threshold time T0 (T≥T0, Step 309: YES), the abnormality detecting unit 30 determines that a sensor element corresponding to the residual sensor signal is normal, when the lapse time T exceeds the threshold time T0 (over the time limit) (Step 310).

The abnormality detecting unit 30 resets the failure determination flag (Step 311), next resets the own counter (n=0, Step 312), and ends a series of the failure determination process. When it is determined at Step 309 that the lapse time T is less than the threshold time T0 (T<T0, Step 309: NO), the abnormality detecting unit 30 ends a series of the failure determination process without executing the processes of Step 310 to Step 312.

After an abnormality in the residual sensor signal is detected during the execution of the assist continuation control as described above, an output cycle of the test torque control amount Itt* is shortened. Therefore, during the failure determination about a sensor element corresponding to the residual sensor signal, the application cycle of instantaneous motor torque based on the test torque control amount Itt* also becomes short.

From the viewpoint of executing a failure determination promptly and in high precision, the application cycle of instantaneous motor torque is preferably shorter. However, shortening of the application cycle acts to aggravate the steering feeling. Therefore, in the present embodiment, during the execution of the failure determination about a sensor element corresponding to the residual sensor signal, that is, only during a period from first detection of an abnormality (YES at the first Step 301 in a flowchart in FIG. 6) to confirmation of failure in the sensor element (Step 307), or only during a period from first detection of an abnormality to confirmation of normality of the sensor element (Step 310), the application cycle of instantaneous motor torque is shortened. Accordingly, a failure determination about a sensor element corresponding to the residual sensor signal can be executed promptly and in high precision while ensuring satisfactory steering feeling at the execution of the assist continuation control.

Next, a change process of the application cycle of instantaneous motor torque by the test torque control unit 31 is described.

Figure 7:
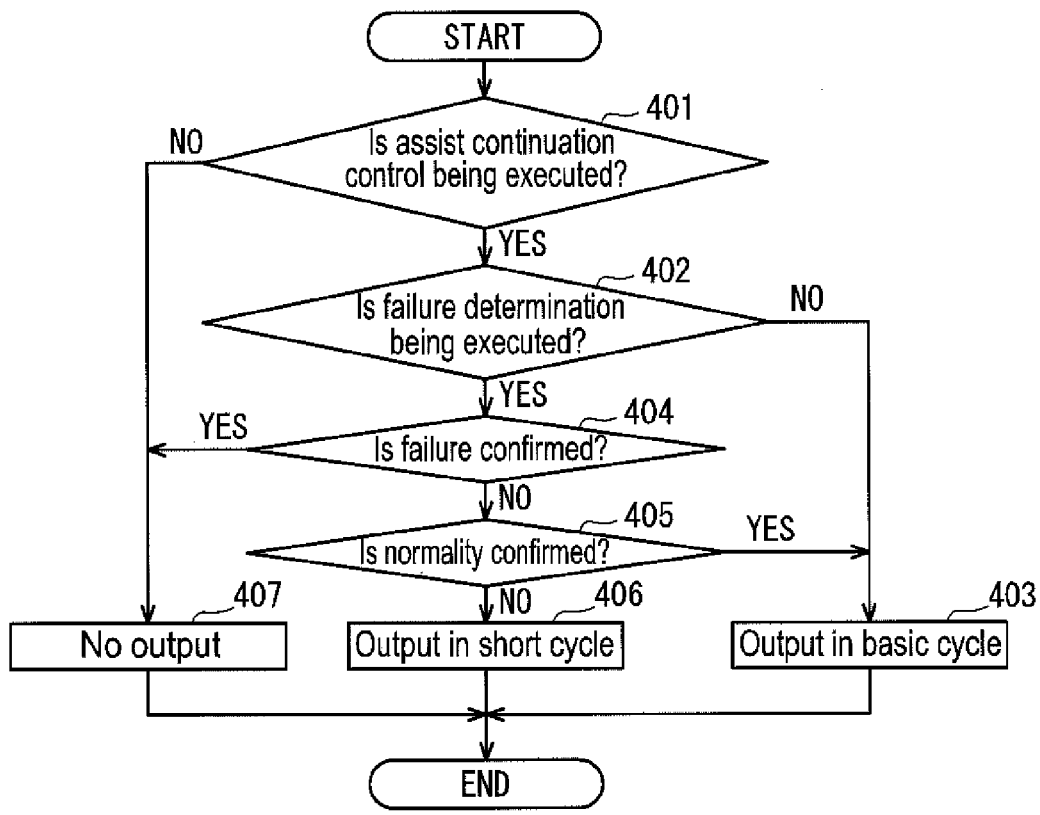
FIG. 7 is a flowchart showing a process concerning a change in an application cycle of instantaneous motor torque.

As shown in FIG. 7, the test torque control unit 31 determines whether the assist continuation control is being executed (Step 401). When it is determined that the assist continuation control is being executed (Step 401: YES), the test torque control unit 31 determines whether the failure determination about the sensor element by the abnormality detecting unit 30 is being executed (Step 402). The test torque control unit 31 obtains a result of the failure determination executed by the abnormality detecting unit 30, based on the abnormality detection signal Str, which is generated by the abnormality detecting unit 30.

When it is determined that the failure determination is not being executed (Step 402: NO), the test torque control unit 31 outputs the test torque control amount Itt* in the basic cycle, that is, in the output cycle f1 shown in FIG. 5 (Step 403). On the other hand, when it is determined that the failure determination is being executed (Step 402: YES), the test torque control unit 31 determines whether failure in a sensor element corresponding to the residual sensor signal is confirmed (Step 404). When it is determined that failure is not confirmed (Step 404: NO), the test torque control unit 31 determines whether normality of the sensor element is confirmed (Step 405). When normality of the sensor element is not confirmed (Step 405: NO), the test torque control unit 31 outputs the test torque control amount Itt* in the output cycle f2, which is shorter than the output cycle f1, which is the basic cycle (Step 406).

When normality of the sensor element is confirmed at Step 405 (Step 405: YES), the test torque control unit 31 shifts to the process of Step 403, and outputs the test torque control amount Itt* in the basic cycle (f1).

When the assist continuation control is not being executed (Step 401: NO), and when failure in the sensor element is confirmed (Step 404: YES), the test torque control amount Itt* is not output.

According to the first embodiment, the following advantages are achieved.

(1) When failure in one of the sensor elements 14a, 14b, which constitute the torque sensor 14, is detected, the ECU 11 continues the power assist control (assist continuation control) by detecting the steering torque τ using the sensor signal (residual sensor signal) that is output by the other sensor element in which failure is not detected. Further, at the execution of the assist continuation control, the ECU 11 controls the operation of the EPS actuator 10 so as to periodically apply instantaneous motor torque to the steering system, regardless of application of the assist force. Then, the ECU 11 detects an abnormality in the residual sensor signal based on whether application of instantaneous motor torque is reflected in the residual sensor signal that becomes the basis of the assist continuation control.

According to the present configuration, based on application of instantaneous motor torque, torsion is generated in the torsion bar 16 provided in the steering shaft 3, which constitutes the steering system. Accordingly, a situation is created in which a timing change and a direction change of a residual sensor signal can be naturally forecast. Then, in this situation, by monitoring a change in the residual sensor signal, an abnormality is promptly detected, at a stage before the residual sensor signal indicates a clearly abnormal value. As a result, application of the assist force is more stably continued, at the execution of the assist control using the residual sensor signal.

(2) The ECU 11 periodically applies instantaneous motor torque to the steering system. When an abnormality is detected in the residual sensor signal by the threshold number of times (n0) within the threshold time (T0), the ECU 11 determines that a sensor element corresponding to the residual sensor signal is out of order. According to the present configuration, failure in the sensor element is more accurately determined. As a result, application of an assist force is more stably continued by suppressing the occurrence of an erroneous determination.

(3) The ECU 11 shortens the application cycle of instantaneous motor torque, during a period of executing a failure determination about a sensor element corresponding to the residual sensor signal. That is, from the viewpoint of executing a failure determination promptly and in high precision, the application cycle of instantaneous motor torque is preferably shorter. However, shortening of the application cycle acts to aggravate steering feeling. In this respect, according to the above configuration, a failure determination about a sensor element corresponding to the residual sensor signal is executed promptly and in high precision while ensuring satisfactory steering feeling at the execution of the assist continuation control. As a result, application of the assist force is more stably continued.

(4) The ECU 11 alternately changes the application direction of instantaneous motor torque. That is, even when the application is executed for an extremely short time to such an extent that the steering wheel 2 is moved very little by inertia, the steering (steering angle) may be deflected to the application direction when the application is executed repeatedly in the same direction. In this respect, according to the above configuration, the occurrence of such a deflection is suppressed, and, as a result, application of the assist force is more stably continued.

The first embodiment may be modified as follows.

Figure 17:
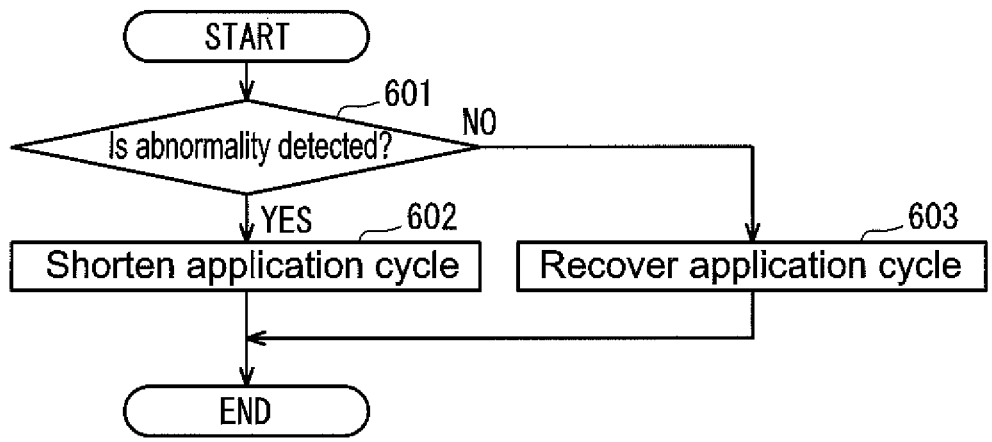
FIG. 17 is a flowchart showing a process for changing an application cycle based on detection of an abnormality in a residual sensor signal.

In the first embodiment, a change process of the application cycle of instantaneous motor torque may be simplified. That is, as shown in FIG. 17, when an abnormality in the residual sensor signal is detected (Step 601: YES), the test torque control unit 31 shortens the application cycle of instantaneous motor torque (Step 602). When an abnormality in the residual sensor signal is not detected (Step 601: NO), the test torque control unit 31 sets the application cycle long so as to recover the application cycle of instantaneous motor torque (Step 603). When the application cycle is not shortened at Step 603, the test torque control unit 31 maintains the current application cycle. In this case, regarding the shortening of the application cycle of instantaneous motor torque, the application cycle may be transited between the two states of the basic cycle (f1) and the short cycle (f2) like in the first embodiment, or the application cycle may be discretely shortened or extended at each time of detecting an abnormality in the residual sensor signal.

Second Embodiment

Next, a second embodiment of the present invention is described. The present embodiment includes a configuration basically similar to that in the first embodiment. Therefore, members and configurations that are the same as those in the first embodiment are given the same reference numerals, and explanation thereof is omitted.

In the present embodiment, after detecting an abnormality in the residual sensor signal by the abnormality detecting unit 30, the ECU 11 (the microcomputer 21) controls the operation of the EPS actuator 10 so as to reduce the assist force to be applied to the steering system.

Figure 8:
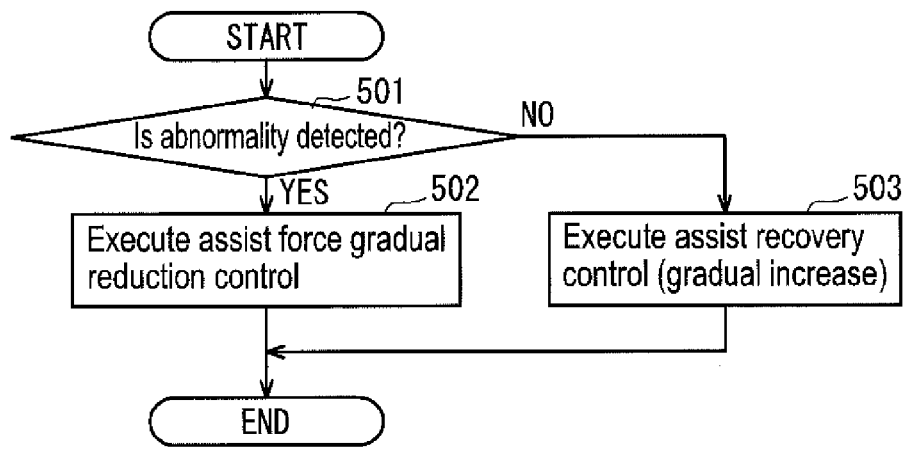
FIG. 8 is a flowchart showing a process for changing an assist force based on detection of an abnormality in a residual sensor signal according to a second embodiment.

As shown in FIG. 8, the assist control unit 26 determines whether an abnormality in the residual sensor signal is detected based on the abnormality detecting signal Str generated by the abnormality detecting unit 30 (Step 501). When an abnormality in the residual sensor signal is detected (Step 501: YES), the assist control unit 26 executes assist force gradual reduction control. That is, the assist control unit 26 gradually reduces the basic assist control amount Ias* to be output (Step 502).

When it is detected that the residual sensor signal is normal (Step 501: NO) at Step 501, the assist control unit 26 executes assist recovery control. That is, the assist control unit 26 gradually increases (gradual increase) the basic assist control amount Ias* to be output (Step 503) in order to recover the assist force that is gradually reduced by execution of Step 502.

Figure 9:
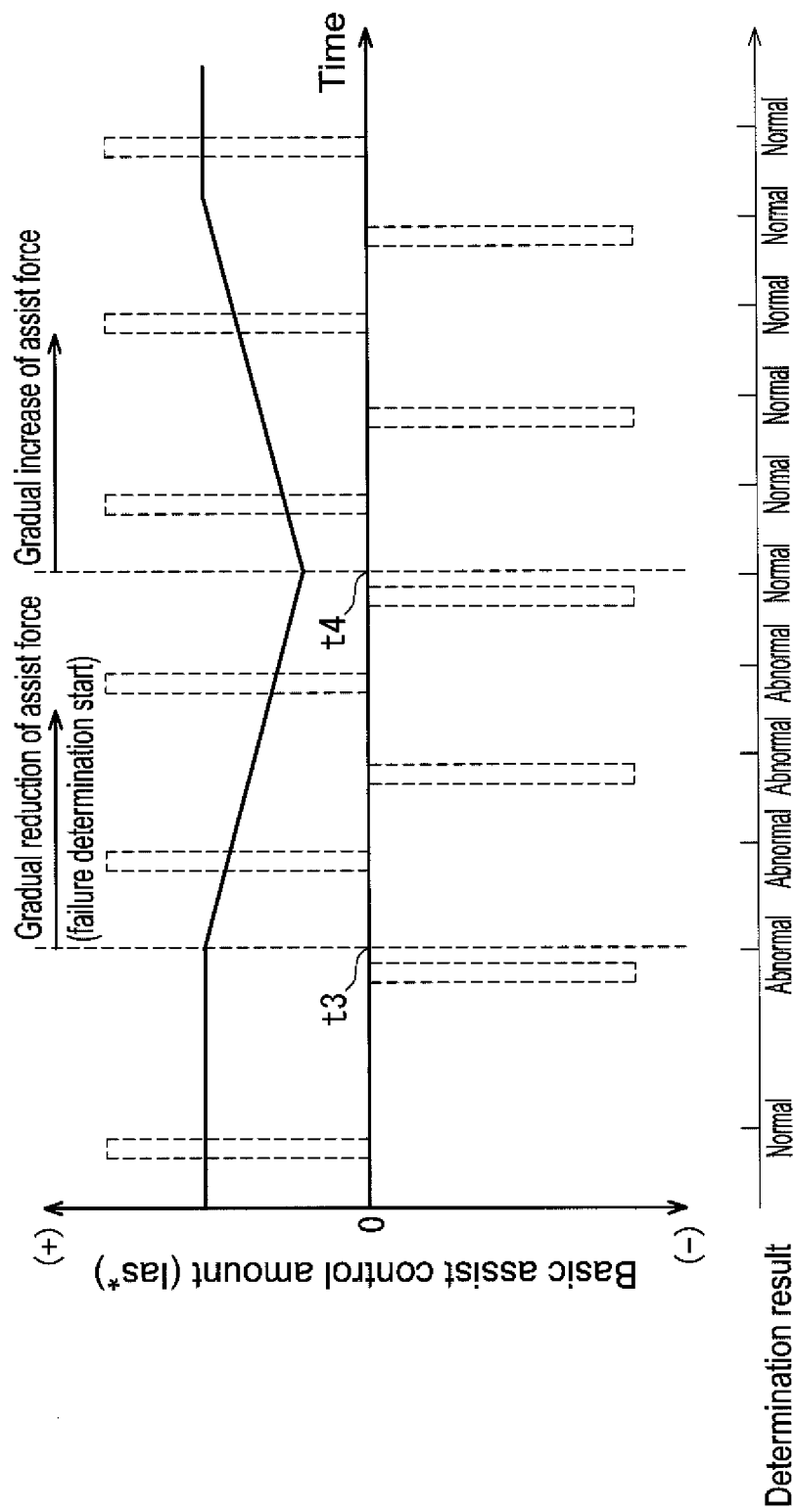
FIG. 9 is an explanatory diagram showing a manner for changing an assist force based on detection of an abnormality in a residual sensor signal.

In an example shown in FIG. 9, when an abnormality is detected in the residual sensor signal and when the failure determination process of a sensor element corresponding to the residual sensor signal is started at a time point t3, the assist control unit 26 gradually reduces the basic assist control amount Ias*. In accordance with the gradual reduction of the basic assist control amount Ias*, the assist force applied to the steering system becomes gradually small. After a time point t4, when it is detected again that the residual sensor signal is normal, the assist control unit 26 gradually increases the basic assist control amount Ias*. In accordance with the gradual increase of the basic assist control amount Ias*, the assist force to be applied to the steering system gradually recovers.

According to the second embodiment, the following advantages are achieved, in addition to the advantages (1) to (4) of the first embodiment.

(5) When detection of the steering torque τ based on a normal sensor signal becomes impossible, it is preferable to promptly stop application of the assist force. However, in determining failure in a sensor element corresponding to the sensor signal by detecting an abnormality at multiple times in a sensor signal (residual sensor signal) like in the first embodiment so as to ensure high precision of a determination about presence or absence of an abnormality in the sensor element, the timing at which failure in the sensor element is confirmed is delayed. In this respect, by gradually reducing the assist force before failure in the sensor element is confirmed like in the present embodiment, application of the assist force can be promptly stopped without producing discomfort.

(6) Further, after gradual reduction of the assist force, when it is detected that the residual sensor signal is normal, the application of the assist force is prevented from being stopped before failure in the sensor element is confirmed by recovering the assist force by gradually increasing the gradually-reduced assist force. As a result, application of the assist force is more stably continued.

Third Embodiment

Next, a third embodiment of the present invention is described. The present embodiment also includes a configuration basically similar to that of the first embodiment.

In the present embodiment, at the execution of the assist continuation control, the ECU 11 (the microcomputer 21) changes the application cycle of instantaneous motor torque in accordance with the magnitude of the assist force to be applied to the steering system and the vehicle speed V.

Figure 10:
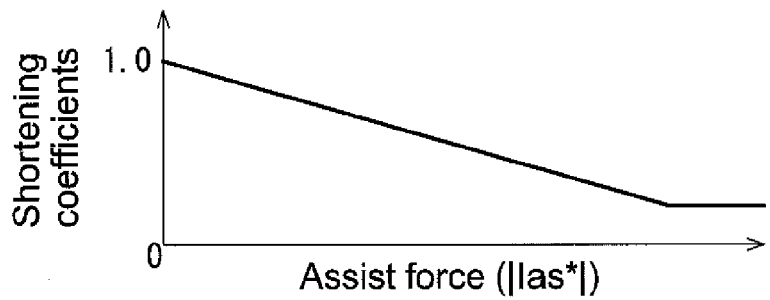
FIG. 10 is a graph showing a manner for changing an application cycle in accordance with an assist force in a third embodiment.
Figure 11:
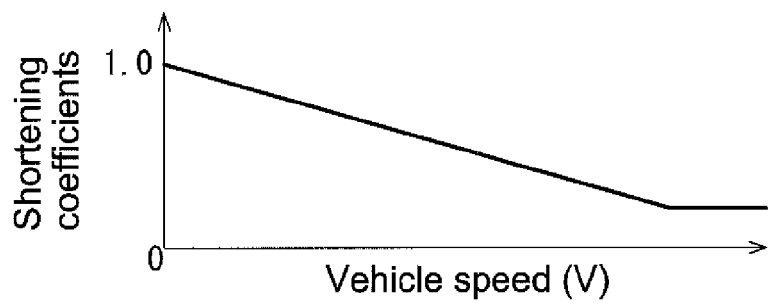
FIG. 11 is a graph showing a manner for changing an application cycle in accordance with a vehicle speed.

As shown in FIG. 10, when the absolute value of the basic assist control amount Ias*, which is output by the assist control unit 26, become greater, the test torque control unit 31 shortens the output cycle of the test torque control amount Itt*. Further, as shown in the graph of FIG. 11, when the vehicle speed detected by the vehicle speed sensor 15 becomes higher, the test torque control unit 31 shortens the output cycle of the test torque control amount Itt*. In the graphs of FIGS. 10 and 11, "shortening coefficients", which are set in a vertical axis are coefficients that indicate degrees of shortening when the basic output cycle f1 at the execution of the assist continuation control shown in FIG. 5 is 1. The test torque control unit 31 shortens the output cycle of the test torque control amount Itt* by multiplexing these shortening, coefficients to the output cycle f1. A lower limit is set in advance to the shortening of the output cycle.

According to the third embodiment, the following advantages are achieved in addition to the advantages (1) to (4) of the first embodiment.

(7) When the assist force to be applied to the steering system is greater, and also when the vehicle speed is higher, influence that a detection failure in the steering torque gives is large. In this respect, according to the present embodiment, the application cycle of instantaneous motor torque is more properly shortened in accordance with the assist force and the vehicle speed. As a result, a failure determination about a sensor element corresponding to the residual sensor signal is executed promptly and in high precision while ensuring satisfactory steering feeling at the execution of the assist continuation control.

(8) Further, based on provision of a lower limit to the shortening of the output cycle, satisfactory steering feeling is ensured by suppressing the occurrence of oscillation due to the application of continuous motor torque. As a result, application of the assist force is more stably continued.

The third embodiment may be modified as follows.

In the third embodiment, although the basic assist control amount Ias* is used as a parameter that indicates the magnitude of the assist force to be applied to the steering system, an actual current value I of the motor 12 may be also used.

In the third embodiment, at the execution of the assist continuation control, the application cycle of instantaneous motor torque (output cycle of the test torque control amount Itt*) is changed in accordance with the magnitude of the assist force to be applied to the steering system (the basic assist control amount Ias*) and the vehicle speed V. However, the application cycle of instantaneous motor torque may be also changed based on a turn state of the vehicle based on the steering operation.

Figure 12:
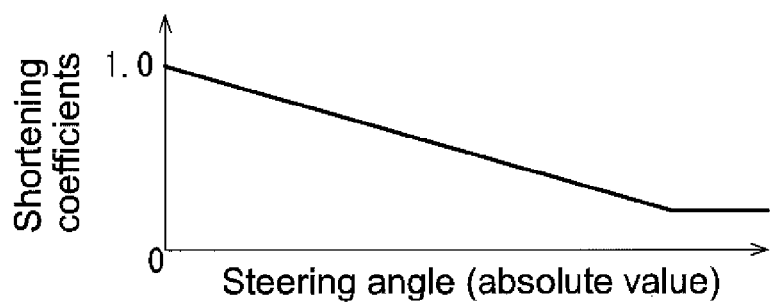
FIG. 12 is a graph showing a manner for changing an application cycle in accordance with a steering angle in a modification of the third embodiment.
Figure 13:
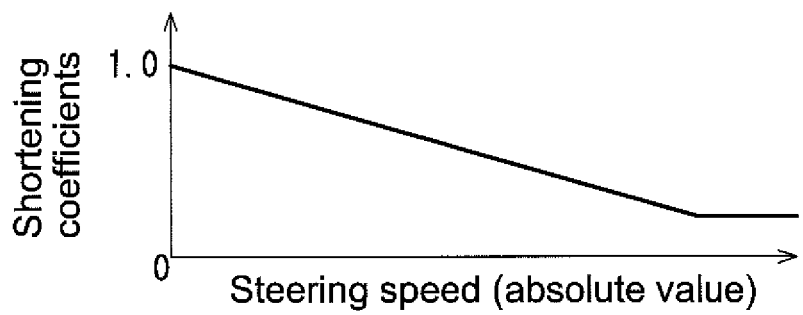
FIG. 13 is a graph showing a manner for changing an application cycle in accordance with a steering speed.
Figure 14:
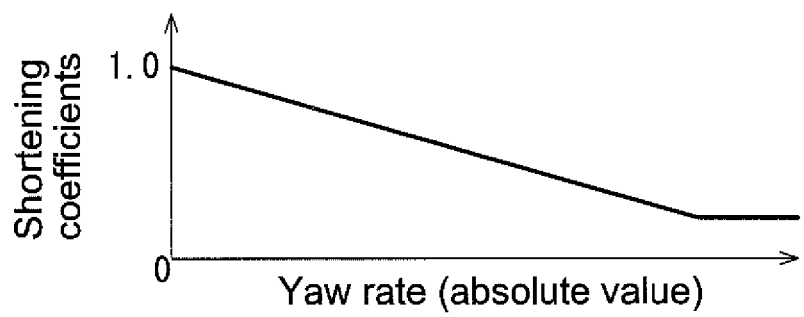
FIG. 14 is a graph showing a manner for changing an application cycle in accordance with a yaw rate of the vehicle.
Figure 15:
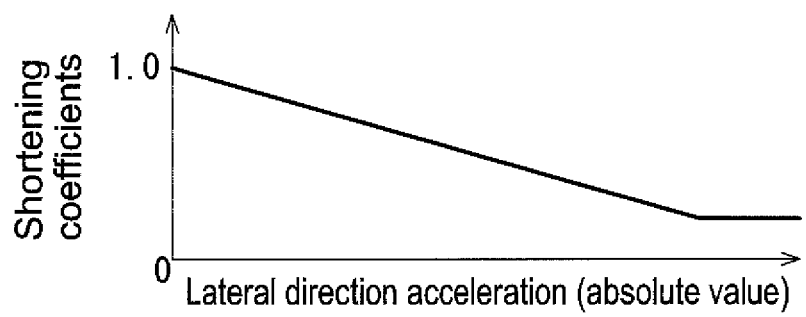
FIG. 15 is a graph showing a manner for changing an application cycle in accordance with lateral direction acceleration (lateral G) of the vehicle.

As shown in FIG. 12, the application cycle of instantaneous motor torque may be shortened as a steer angle (steering angle) of the steering wheel 2 becomes greater. Also as shown in FIG. 13, the application cycle of instantaneous motor torque may be shortened as a steering speed becomes higher. Further, as shown in FIG. 14, the application cycle of instantaneous motor torque may be shortened as a yaw rate of the vehicle becomes greater. Also as shown in FIG. 15, the application cycle of instantaneous motor torque may be shortened as lateral direction acceleration (lateral G) of the vehicle is greater.

That is, the influence that detection failure in the steering torque τ gives is noticeable when the vehicle is in a turning state. This influence becomes large as the vehicle makes a larger turn and also as the vehicle makes a sharper turn. As examples of a parameter that indicates a turning state of the vehicle, there are a steering angle, a steering speed, a yaw rate, and a lateral direction speed. Therefore, according to the above configuration, the application cycle of instantaneous motor torque is more properly shortened. As a result, a failure determination about a sensor element corresponding to the residual signal is executed promptly and in high precision while ensuring satisfactory steering feeling at the execution of the assist continuation control.

A change in the application cycle of instantaneous motor torque may be executed based on each single parameter or based on an arbitrary combination of parameters, including the magnitude of the assist force and the vehicle speed V.

Fourth Embodiment

Next, a fourth embodiment of the present invention is described. The present embodiment is mainly different from the first embodiment in that at the execution of the assist continuation control, instantaneous motor torque is periodically applied to the steering system in the same direction as that of the assist force. Therefore, members and configurations similar to those in the first embodiment are given the same reference numerals, and explanation thereof is omitted.

In the present embodiment, the ECU 11 controls the operation of the EPS actuator 10 so as to periodically apply instantaneous motor torque to the steering system in the same direction as that of the assist force.

Figure 18:
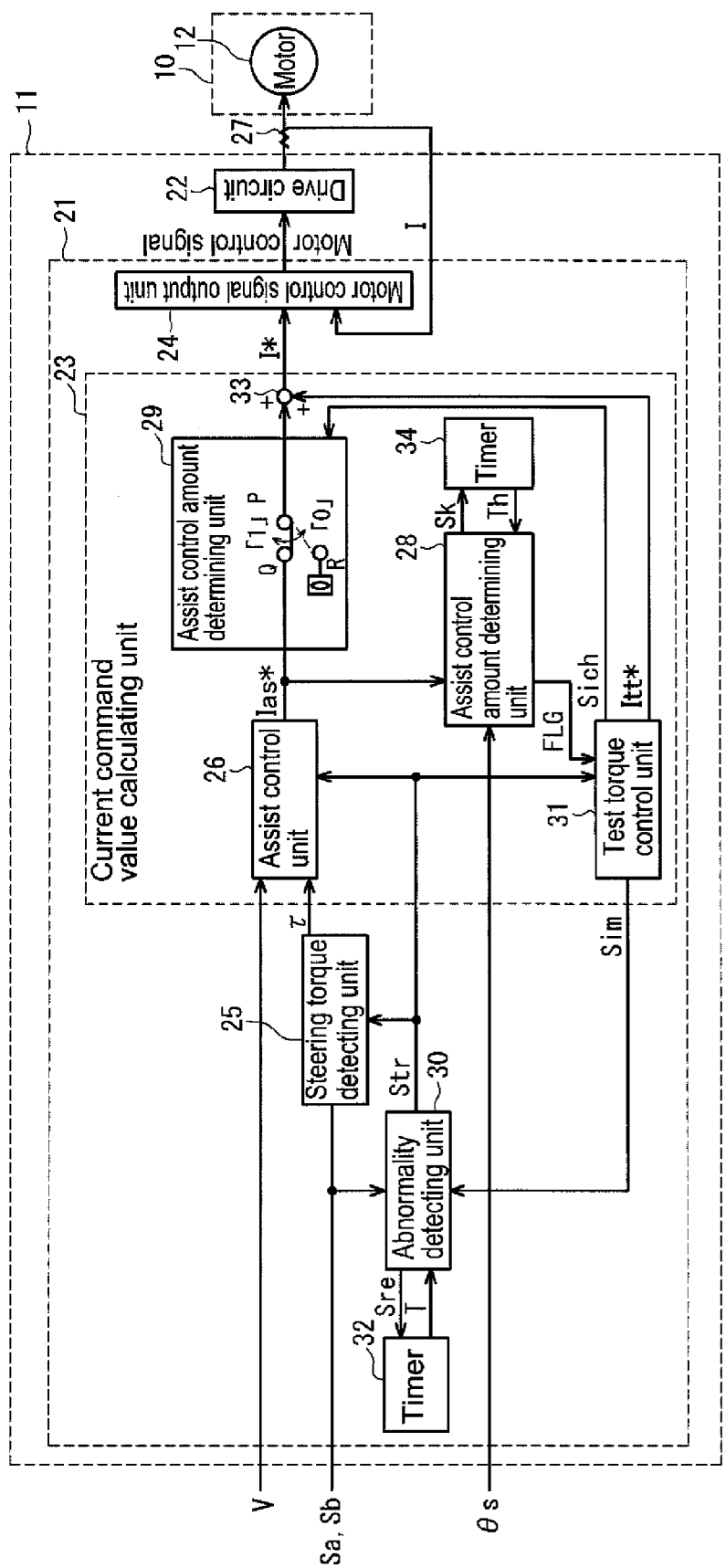
FIG. 18 is a control block diagram of an EPS according to a fourth embodiment.

As shown in FIG. 18, the current command value calculating unit 23 of the ECU 11 includes an assist control amount determining unit 28, an assist current switching unit 29, and a timer 34, in addition to the assist control unit 26 and the test torque control unit 31. The assist control amount determining unit 28 generates the FLG signal (one of 0, 1, 2, in the present embodiment), which indicates the steering state of the vehicle based on the basic assist control amount Ias* and the steering angle θs. The timer 34 measures a lapse time Th since the vehicle shifted to a straight-line traveling state.

The test torque control unit 31 generates the application signal Sim in a similar manner to that in the first embodiment. Further, the test torque control unit 31 generates the test torque control amount Itt* as a basic component of instantaneous motor torque based on the FLG signal that is generated by the assist control amount determining unit 28, and outputs the test torque control amount Itt* to the adder 33. Further, the test torque control unit 31 generates an assist current switch signal Sich, based on the FLG signal that is input from the assist control amount determining unit 28. In the present embodiment, output time of the test torque control amount Itt* per one time is set to 1 ms.

The assist current switching unit 29 switches the basic assist control amount Ias*, by switching a contact P to one of a contact Q and a contact R based on the assist current switch signal Sich generated by the test torque control unit 31. That is, when the assist current switch signal Sich is "1", the assist current switching unit 29 connects the contact P to the contact Q, and outputs the basic assist control amount Ias* generated by the assist control unit 26 directly to the adder 33. When the assist current switch signal Sich is "0", the assist current switching unit 29 connects the contact P to the contact R, and outputs a "0 value" as the basic assist control amount Ias*, in place of the basic assist control amount Ias* generated by the assist control unit 26, to the adder 33.

The ECU 11 (the microcomputer 21) executes the power assist control in accordance with an abnormality occurrence mode of the torque sensor 14 that is detected by the abnormality detecting unit 30, in a similar manner to that in the first embodiment. That is, the ECU 11 executes the processes of Step 2001 to Step 2009 in a flowchart in FIG. 3. The ECU 11 executes the ordinary control when there is no abnormality in the sensor signals Sa, Sb, executes the assist stop control when both sensor elements 14a, 14b are out of order, and executes the assist continuation control when only one of the sensor elements 14a, 14b is out of order.

Further, at the execution of the assist continuation control, the ECU 11 periodically applies instantaneous motor torque to the steering system, in association with the application of the assist force as the original function of the EPS, and executes detection of an abnormality in the residual sensor signal, based on whether torsion attributable to instantaneous motor torque is reflected in the residual sensor signal.

Figure 28:
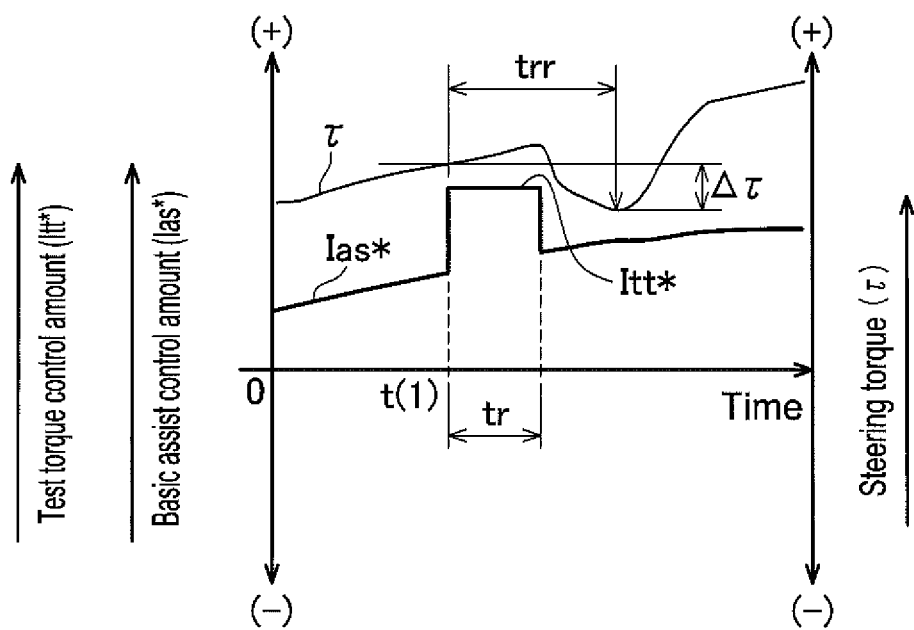
FIG. 28 is an explanatory diagram of the torque sensor at the application of instantaneous motor torque in the first hypothetical steering state of the vehicle.

For example, as shown in FIG. 28, the ECU 11 (the test torque control unit 31) outputs the test torque control amount Itt* as a control component for applying instantaneous motor torque, by a predetermined time tr (1 ms, in the present embodiment) from the time point t(1). Accordingly, instantaneous motor torque is applied to the steering system.

When instantaneous motor torque is applied to the steering system, the torsion attributable to instantaneous motor torque occurs in the torsion bar 16, after a predetermined time trr (10 ms, in the present embodiment) from the time point t(1) of the output of the test torque control amount Itt*. The ECU 11 measures a change amount $\Delta\tau$ of the steering torque $\tau$ during the predetermined time trr from the time point t(1) of the output of the test torque control amount Itt*. Then, the ECU 11 determines that a sensor element corresponding to the residual signal is abnormal, under a condition that the change amount $\Delta\tau$ is less than or equal to a predetermined value (0.5 Nm, in the present embodiment).

Next, a method for applying instantaneous motor torque is described.

In the present embodiment, the magnitude and the application direction of instantaneous motor torque to be applied to the steering system change in accordance with the steering state of the vehicle. Therefore, the method for applying instantaneous motor torque is described, based on a hypothetical steering state by assuming a specific steering state of the vehicle. A hypothetical steering state, a generation process of the FLG signal, which indicates the steering state, and a method for calculating the test torque control amount based on the FLG signal are described below in this order.

First, the hypothetical steering state is described.

Figure 19:
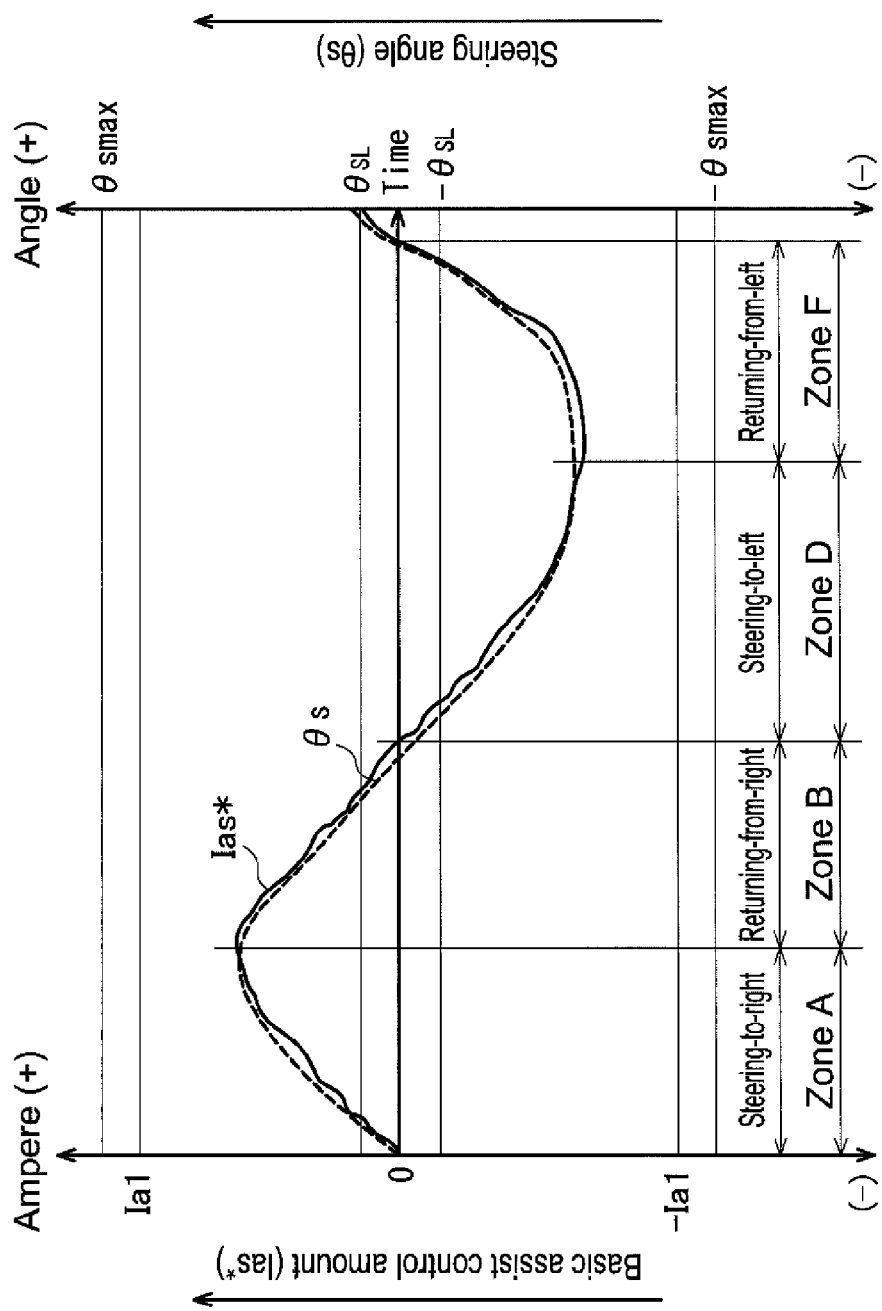
FIG. 19 is an explanatory diagram of a basic assist control amount and a steering angle in a first hypothetical steering state of the vehicle.
Figure 20:
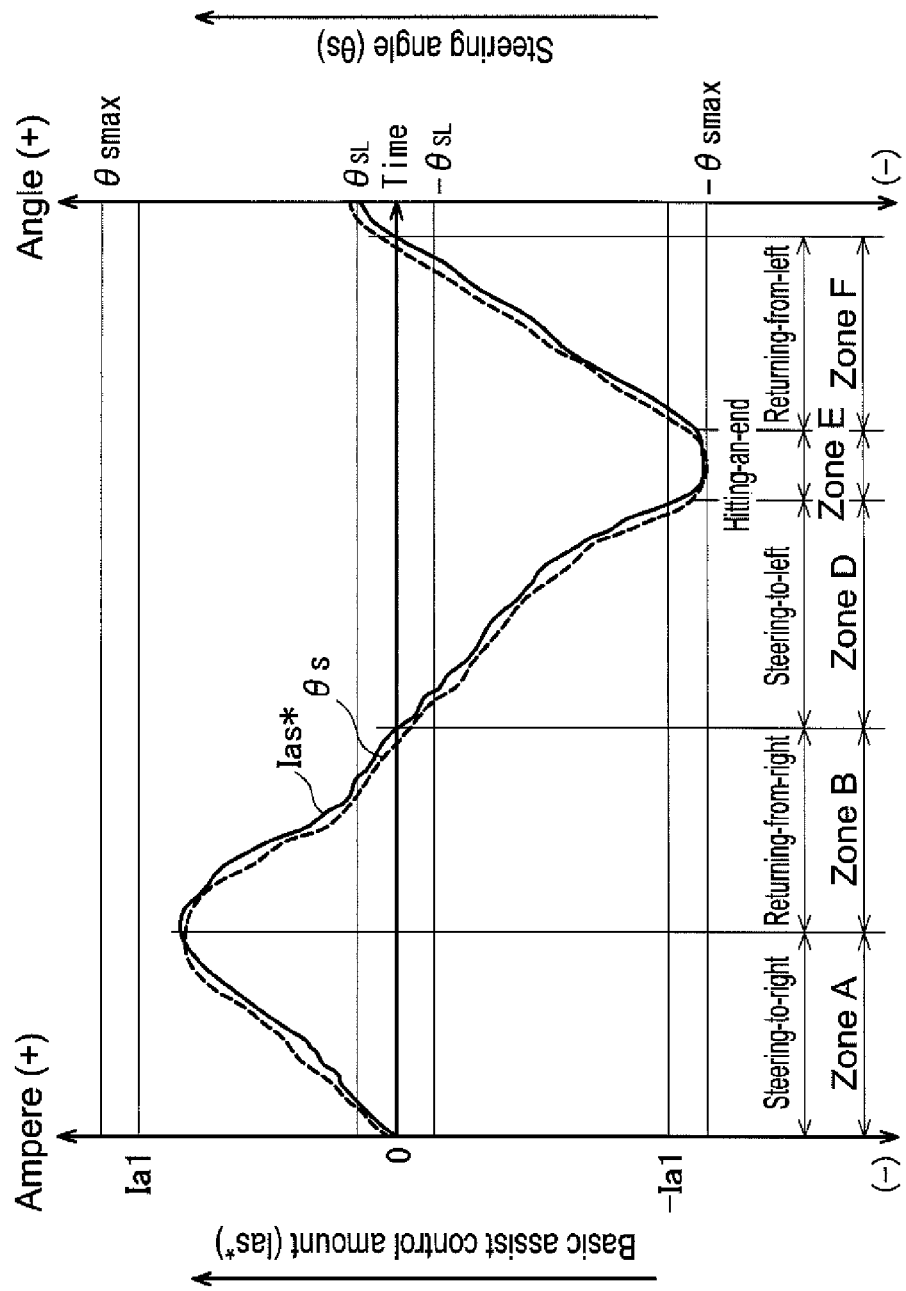
FIG. 20 is an explanatory diagram of a basic assist control amount and a steering angle in a second hypothetical steering state of the vehicle.
Figure 21:
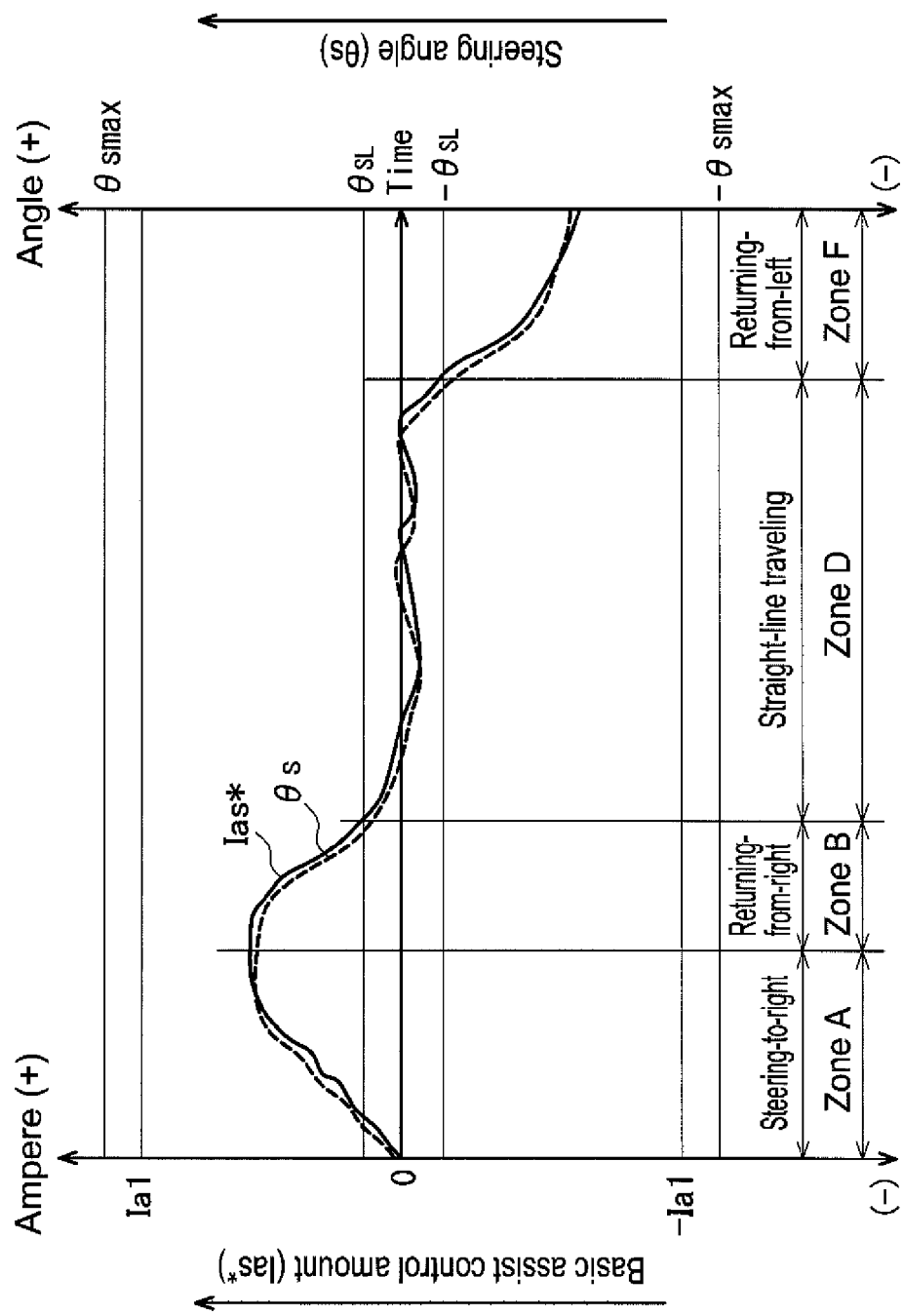
FIG. 21 is an explanatory diagram of a basic assist control amount and a steering angle in a third hypothetical steering state of the vehicle.

FIGS. 19 to 21 are explanatory diagrams of the basic assist control amount Ias* and the steering angle $\theta$s when a certain steering state of the vehicle is assumed. Left vertical axes in FIGS. 19 to 21 express the basic assist control amount Ias*, right vertical axes express the steering angle $\theta$s, and the horizontal axes express a time axis. In the left vertical axes in FIGS. 19 to 21, a first predetermined current value Ia1 as a positive (+) side test torque control amount Itt*, and a second predetermined current value −Ia1 as a negative (−) side test torque control amount Itt* are set, respectively. The first predetermined current value Ia1 and the second predetermined current value −Ia1 are values of the test torque control amount Itt* as a basic component that generates instantaneous motor torque, and are appropriately set in accordance with a vehicle system or an environment. The first predetermined current value Ia1 and the second predetermined current value −Ia1 are set to the magnitude (60 A, in the present embodiment) at which the steering wheel 2 is moved very little by inertia of instantaneous motor torque, and at which the driver notices that one of the sensor elements 14a, 14b of the torque sensor 14 is out of order.

In the right vertical axes in FIGS. 19 to 21, a first predetermined steering angle $\theta$sL on the positive (+) side of and near the neutral position, a second predetermined steering angle $\theta$smax as the positive (+) side maximum steering angle, a third predetermined steering angle −$\theta$sL on the negative (−) side of and the near the neutral position, and a fourth predetermined steering angle −$\theta$smax as the negative (−) side maximum steering angle are set, respectively. The first predetermined steering angle $\theta$sL and the third predetermined steering angle −$\theta$sL are basic values for determining whether a running state of the vehicle is the straight-line traveling state. The second predetermined steering angle $\theta$smax is a right end angle of the steering wheel 2, and the fourth predetermined steering angle −$\theta$smax is a left end angle of the steering wheel 2.

The horizontal axes in FIGS. 19 to 21 are divided into multiple zones (six kinds of the zones A to F, in the present embodiment) in accordance with the steering state of the vehicle. The zone A corresponds to a steering state in which the steering wheel 2 is being steered to right, the zone B corresponds to a returning state in which the steering wheel 2 is being returned toward the neutral position after being steered to right, and the zone C corresponds to the straight-line traveling state in which the steering wheel 2 is returned to the neutral position. The zone D corresponds to a steering state in which the steering wheel 2 is being steered to left, the zone E is what is called a contacting-an-end state, in which the steering wheel 2 is fully turned to the left end, and the zone F corresponds to a returning state in which the steering wheel 2 is being returned to the neutral position after being steered to left.

A first steering state shown in FIG. 19 is divided into four zones (the zones A, B, D, F). In the first steering state, in all steering regions, the steering angle $\theta$s is less than or equal to the second predetermined steering angle $\theta$smax, and is greater than or equal to the fourth predetermined steering angle −$\theta$smax. In all the steering regions, the basic assist control amount Ias* is less than or equal to the first predetermined current value Ia1, and is greater than or equal to the second predetermined current value −Ia1.

A second steering state shown in FIG. 20 is divided into five zones (the zones A, B, D, E, F). In the second steering state, the steering angle $\theta$s in a steering region of the zone E reaches the fourth predetermined steering angle −$\theta$smax. The basic assist control amount Ias* becomes a numerical value smaller than the second predetermined current value −Ia1, in a steering region of the zone E. That is, the second steering state has a greater steering angle $\theta$s than that in the first steering state, and has the contacting-an-end state.

A third steering state shown in FIG. 21 is divided into four zones (the zones A, B, C, D). In the third steering state, the steering angle $\theta$s in a steering region of the zone C is less than or equal to the first predetermined steering angle $\theta$sL, and is greater than or equal to the third predetermined steering angle −$\theta$sL. The basic assist control amount Ias* in all steering regions is less than or equal to the first predetermined current value Ia1, and is greater than or equal to the second predetermined current value −Ia1. That is, the third steering state has the straight-line traveling state.

Next, a process that the assist control amount determining unit 28 determines the steering state of the vehicle based on the vehicle steering states in FIGS. 19 to 21 and generates the FLG signal according to a result of the determination is described with reference to the flowchart in FIG. 22.

Figure 22:
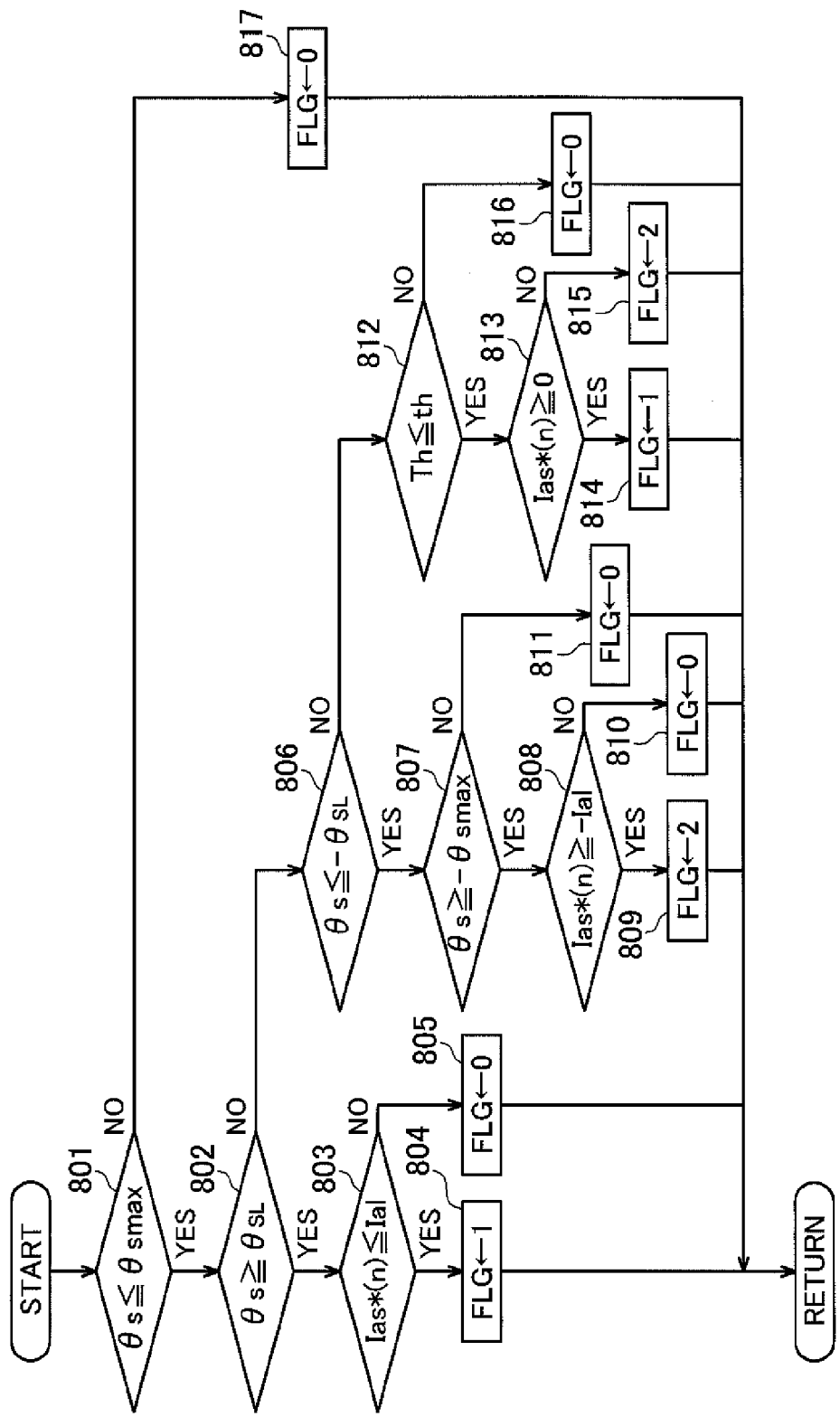
FIG. 22 is a flowchart showing a process of a state determination about a basic assist control amount.

As shown in FIG. 22, the assist control amount determining unit 28 first determines whether the steering angle θs is less than or equal to the second predetermined steering angle θsmax (Step 801). When the steering angle θs is less than or equal to the second predetermined steering angle θsmax (Step 801: YES), the assist control amount determining unit 28 determines whether the steering angle θs is greater than or equal to the first predetermined steering angle θsL (Step 802). When the steering angle θs is greater than or equal to the first predetermined steering angle θsL (Step 802: YES), the assist control amount determining unit 28 determines whether the basic assist control amount Ias*(n) is less than or equal to the first predetermined current value Ia1 (Step 803). The symbol n in the parentheses indicates the nth sampling value.

When the basic assist control amount Ias*(n) is less than or equal to the first predetermined current value Ia1 (Step 803: YES), because the steering angle θs is greater than or equal to the first predetermined steering angle θsL, the assist control amount determining unit 28 determines that the magnitude of the assist force is in a positive region (in the present embodiment, the steering-to-right state or a returning-from-right state, that is, the vehicle is in the steering state of the zone A or the zone B), writes 1 into FLG (flag that indicates a state quantity: memory) (Step 804), and ends the process.

At Step 803, when the basic assist control amount Ias*(n) is greater than the first predetermined current value Ia1 (Step 803: NO), the assist control amount determining unit 28 determines that the basic assist control amount Ias* has already reached an upper limit value, writes 0 into the FLG (Step 805), and ends the process.

At Step 802, when the steering angle θs is less than the first predetermined steering angle θsL (Step 802: NO), the assist control amount determining unit 28 determines whether the steering angle θs is less than or equal to the third predetermined steering angle −θsL (Step 806). When the steering angle θs is less than or equal to the third predetermined steering angle −θsL (Step 806: YES), the assist control amount determining unit 28 determines whether the steering angle θs is greater than or equal to the fourth predetermined steering angle −θsmax (Step 807). When the steering angle θs is greater than or equal to the fourth predetermined steering angle −θsmax (Step 807: YES), the assist control amount determining unit 28 determines whether the basic assist control amount Ias*(n) is greater than or equal to the second predetermined current value −Ia1 (Step 808).

When the basic assist control amount Ias*(n) is greater than or equal to the second predetermined current value −Ia1 (Step 808: YES), because the steering angle θs is less than or equal to the third predetermined steering angle −θsL, the assist control amount determining unit 28 determines that the magnitude of the assist force is in a negative region (in the present embodiment, the steering-to-left-c state or a returning-from-left state, that is, the vehicle is in the steering state of the zone D or the zone F), writes 2 into the FLG (Step 809), and ends the process.

At Step 808, when the basic assist control amount Ias*(n) is less than the second predetermined current value −Ia1 (Step 808: NO), the assist control amount determining unit 28 determines that the basic assist control amount Ias*(n) has already reached a lower limit value, writes 0 into the FLG (Step 810), and ends the process.

Further, at Step 807, when the steering angle θs is less than the fourth predetermined steering angle −θsmax (Step 807: NO), the assist control amount determining unit 28 determines that the vehicle is in the contacting-an-end state or near this state, writes 0 into the FLG (Step 811), and ends the process.

At Step 806, when the steering angle θs is greater than the third predetermined steering angle −θsL (Step 806: NO), the assist control amount determining unit 28 determines that the vehicle is in the straight-line traveling state. When the vehicle shifted to the straight-line traveling state, the assist control amount determining unit 28 outputs the reset signal Sk to the timer 34 (see FIG. 18) of the current command value calculating unit 23, and measures the lapse time Th since the vehicle shifted to the straight-line traveling state.

The assist control amount determining unit 28 determines whether the lapse time Th is less than or equal to the predetermined time th (1 s, in the present embodiment) (Step 812). When the lapse time Th is less than or equal to the predetermined time th (Step 812: YES), the assist control amount determining unit 28 determines whether the basic assist control amount Ias*(n) is greater than or equal to 0 (Step 813).

When the basic assist control amount Ias*(n) is greater than or equal to 0 (Step 813: YES), the assist control amount determining unit 28 determines that the magnitude of the assist force is in a positive region in the zone C, writes 1 into the FLG (Step 814), and ends the process. When, at Step 813, the basic assist control amount Ias*(n) is less than 0 (Step 813: NO), the assist control amount determining unit 28 determines that the magnitude of the assist force is in a negative region in the zone C, writes 2 into the FLG (Step 815), and ends the process.

At Step 812, when the lapse time Th is greater than the predetermined time th (Step 812: NO), the assist control amount determining unit 28 determines that the predetermined time passed since the vehicle shifted to the straight-line traveling state in the zone C, writes 0 into the FLG (Step 816), and ends the process.

At Step 801, when the steering angle θs is greater than or equal to the second predetermined steering angle θsmax (Step 801: NO), the assist control amount determining unit 28 determines that the vehicle is in the contacting-an-end state or near this state, writes 0 into the FLG (Step 817), and ends the process.

Figure 24:
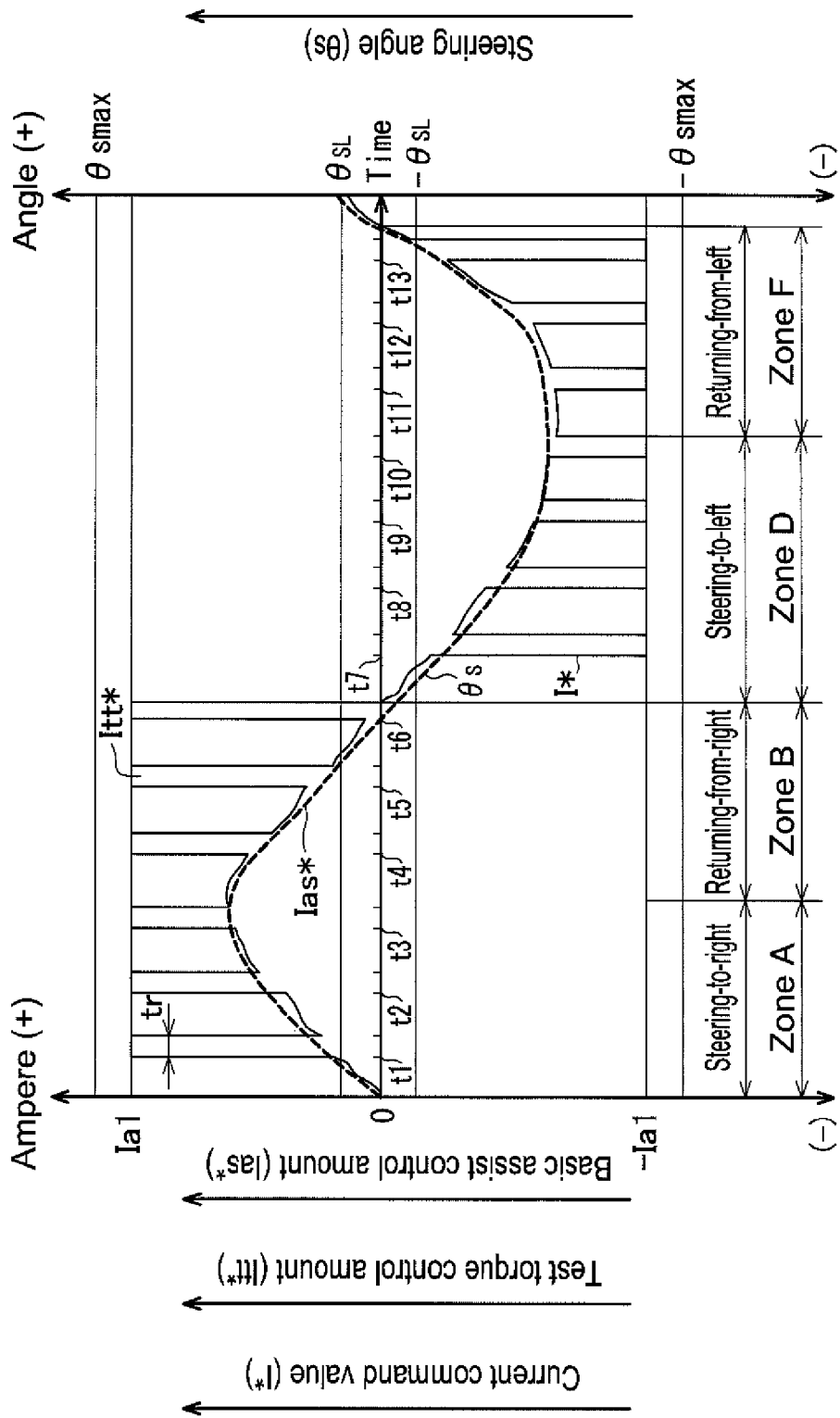
FIG. 24 is an explanatory diagram of a current command value and a steering angle in the first hypothetical steering state of the vehicle.
Figure 25:
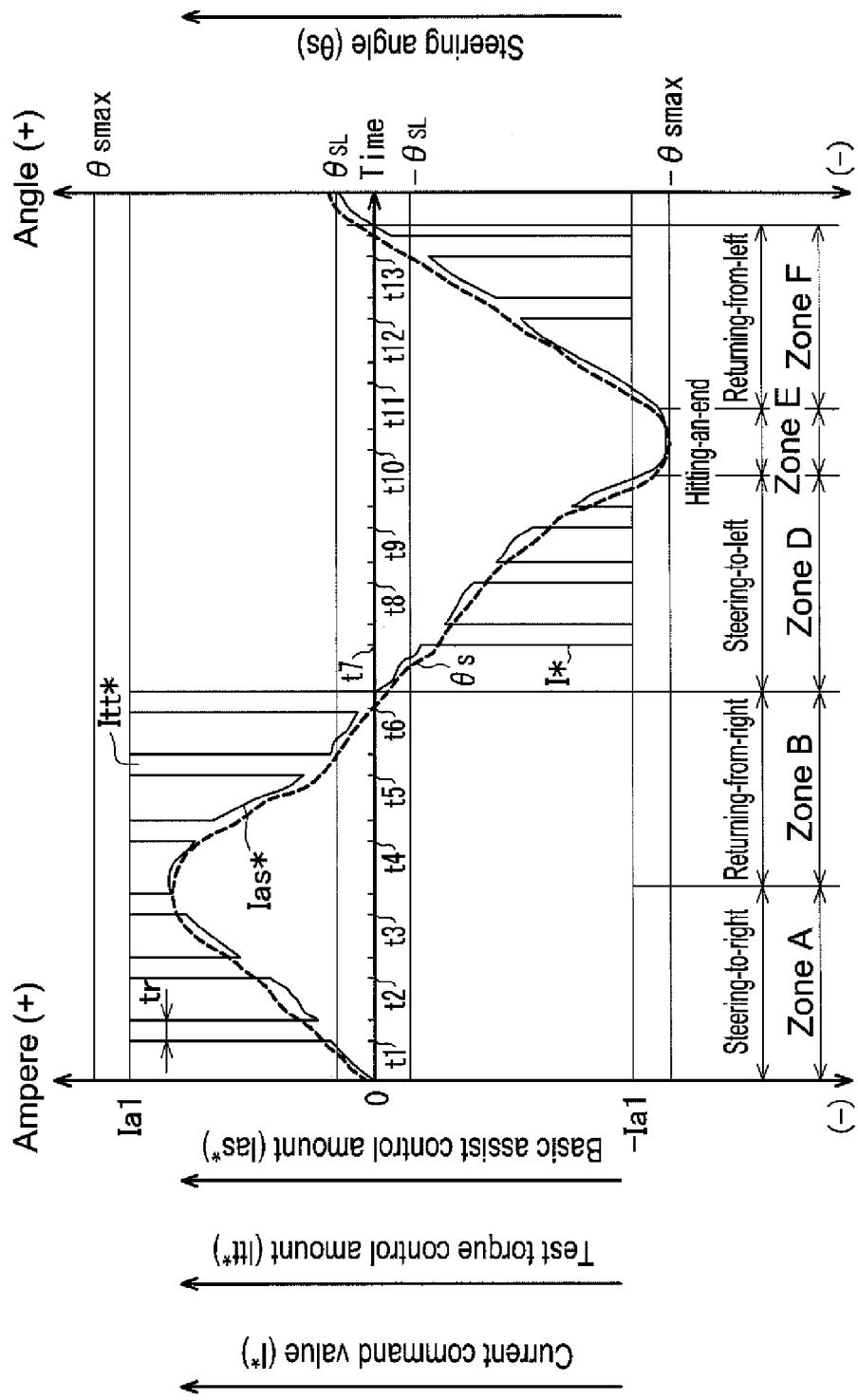
FIG. 25 is an explanatory diagram of a current command value and a steering angle in the second hypothetical steering state of the vehicle.
Figure 26:
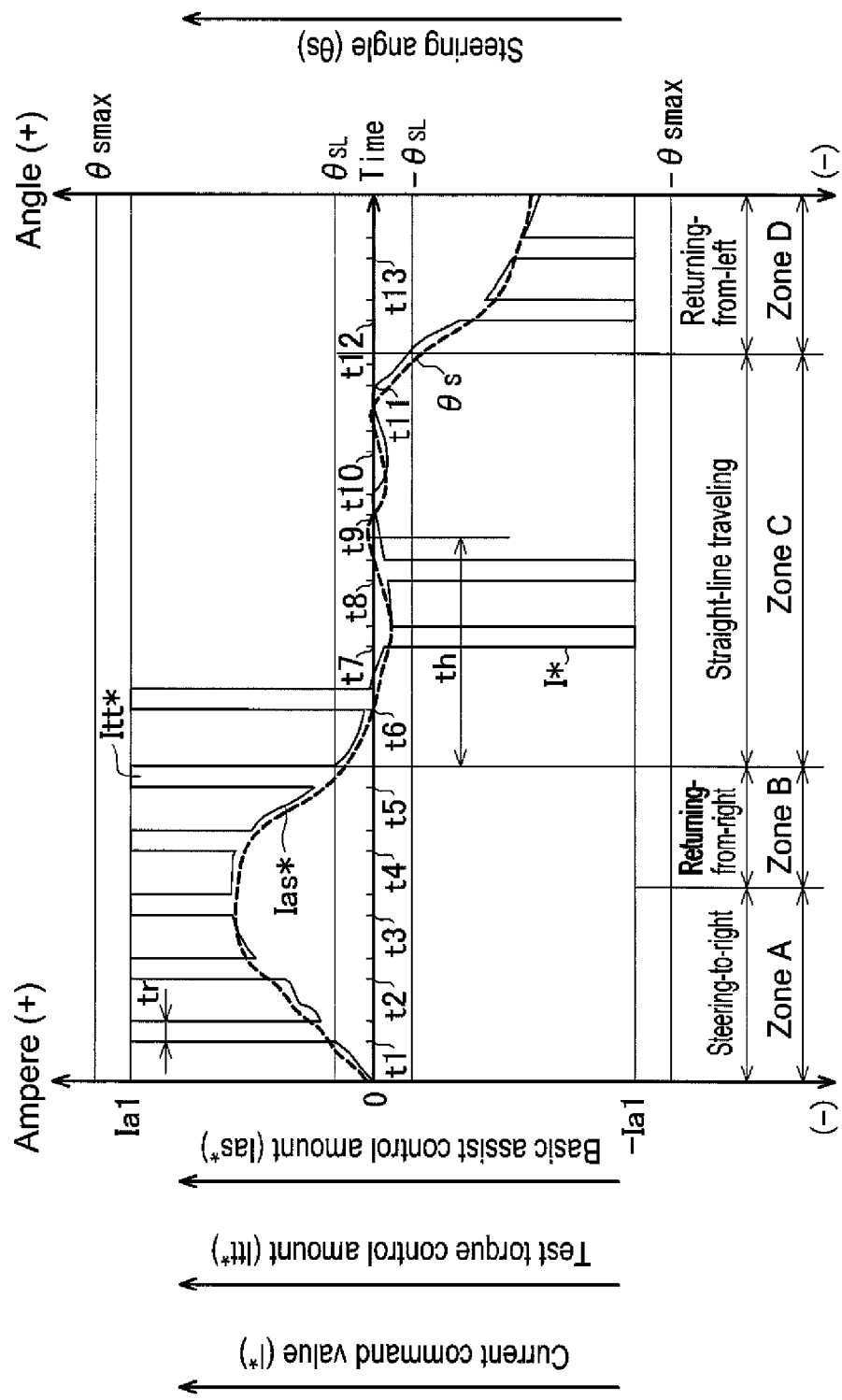
FIG. 26 is an explanatory diagram of a current command value and a steering angle in the third hypothetical steering state of the vehicle.

After the assist control amount determining unit 28 writes a determination result (0, 1, 2) of the steering state into the FLG, the assist control amount determining unit 28 generates the FLG signal that includes the determination result. As shown in FIGS. 24 to 26, the test torque control unit 31 outputs the test torque control amount Itt* (application of instantaneous motor torque) at timings of time points t1 to t13 of the time axis, based on the FLG signal received from the assist control amount determining unit 28. Intervals between time points t1, t2, t3, . . . of the output of the test torque control amount Itt* are set greater than the test torque control amount output time tr of outputting the test torque control amount Itt*.

Next, a calculation process of the test torque control amount by the test torque control unit 31 is described in detail.

Figure 23:
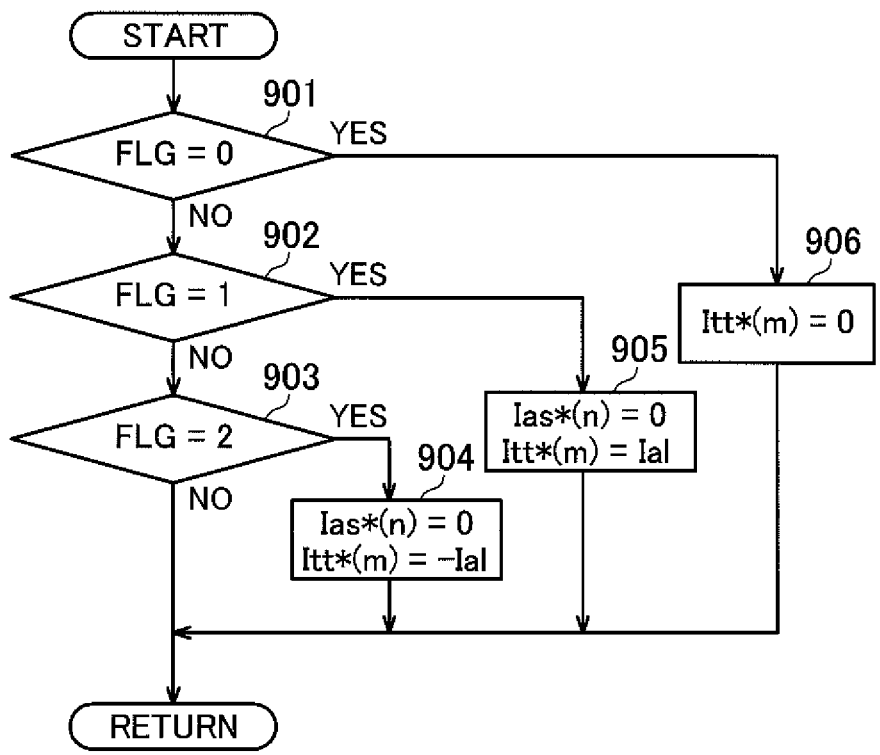
FIG. 23 is a flowchart showing a process of test torque control amount calculation.

As shown in FIG. 23, first, the test torque control unit 31 determines whether the FLG is 0 based on the FLG signal that is input from the assist control amount determining unit 28 (Step 901). When the FLG is 0 (Step 901: YES), the test torque control unit 31 writes 0 into a storage unit (memory) as a value of the test torque control amount Itt*(m) (Step 906), and ends the process.

The symbol m in the parentheses indicates that a this-time value is an mth sampling value. A sampling number of the basic assist control amount Ias* is n, and a sampling number of the test torque control amount Itt* is m. This is because, in the present embodiment, sampling cycles of the basic assist control amount Ias* and the test torque control amount Itt* are different. In the present embodiment, the following three cases are assumed, as cases where 0 is written into the memory as a value of the test torque control amount Itt*(m), that is, as cases where the FLG is 0.

The first case is that the basic assist control amount Ias* reaches the first predetermined current value Ia1 (upper limit value) or the second predetermined current value −Ia1 (lower limit value), and that even when the test torque control amount Itt* is applied to the basic assist control amount Ias*, an abnormality in the torque sensor 14 is difficult to be detected because a torque change is small (Step 803: NO, Step 808: NO, in FIG. 22). Therefore, when the basic assist control amount Ias* is greater than the upper limit value or less than the lower limit value, the test torque control unit 31 stops application of instantaneous motor torque.

The second case is a case of the zone E in FIG. 20, that is, a case of what is called the contacting-an-end (Step 801: NO, Step 807: NO, in FIG. 22). In this case, because the steering wheel 2 abuts against a mechanical end, a torque change does not occur even when the test torque control amount Itt* is applied to the basic assist control amount Ias*. Therefore, the test torque control unit 31 stops application of instantaneous motor torque.

The third case is a case where the predetermined time th passed since the vehicle shifted to the zone C in FIG. 21, what is called the straight-line traveling state (Step 812: NO, in FIG. 22). The straight-line traveling state is a state in which the steering angle θs is in an extremely narrow range between the first predetermined steering angle θsL and the third predetermined steering angle −θsL, and the basic assist control amount Ias* is a value substantially near 0. Therefore, also in this case, the test torque control unit 31 stops application of instantaneous motor torque. Accordingly, the EPS 1 can suppress heat generation in the motor 12 and the ECU 11 by reducing power.

Referring back to FIG. 23, at Step 901 of a flowchart, when the FLG is not 0 (Step 901: NO), the test torque control unit 31 determines whether the FLG is 1 (Step 902). When the FLG is 1 (Step 902: YES), the test torque control unit 31 writes 0 into the memory as a value of the basic assist control amount Ias*(n) and also writes the first predetermined current value Ia1 into the memory as a value of the test torque control amount Itt*(m) (Step 905), and ends the process.

The fact that the FLG is 1 indicates a state in which the basic assist control amount Ias* is a positive value and is less than or equal to the first predetermined current value Ia1 (the vehicle is in the steering-to-right state or the returning-from-right state: the zone A or the zone B), or a state within the predetermined time th since the vehicle shifted to the straight-line traveling state (the zone C), and also when the basic assist control amount Ias* is a positive value. When the FLG is 1, the test torque control unit 31 sets the test torque control amount Itt* to the first predetermined current value Ia1.

When the FLG is not 1 (Step 902: NO), the test torque control unit 31 determines whether the FLG is 2 (Step 903). When the FLG is 2 (Step 903: YES), the test torque control unit 31 writes 0 into the memory as a value of the basic assist control amount Ias*(n), writes the second predetermined current value −Ia1 into the memory as the test torque control amount Itt*(m) (step 904), and ends the process.

The fact that the FLG is 2 indicates a state in which the basic assist control amount Ias* is a negative value and is greater than or equal to the second predetermined current value −Ia1 (the vehicle is in the steering-to-left state or the returning-from-left state: the zone D or the zone F), or a state within the predetermined time th since the vehicle shifted to the straight-line traveling state (the zone C), and also when the basic assist control amount Ias* is a negative value. When the FLG is 2, the test torque control unit 31 sets the test torque control amount Itt* to the second predetermined current value −Ia1. When the FLG is not 2 at Step 903 (Step 903: NO), the test torque control unit 31 ends the process without executing any process.

FIGS. 24 to 26 are graphs showing the current command value I* obtained by adding the test torque control amount Itt* to the basic assist control amount Ias*, and showing a waveform of the steering angle θs, by applying algorithms shown in FIGS. 22 and 23 to the vehicle in the first to third steering states shown in FIGS. 19 to 21. In the EPS 1 of the present embodiment, as shown in FIGS. 24 to 26, the magnitude of the test torque control amount Itt* is set such that the steering angle θs is influenced very little by application of instantaneous motor torque.

The waveform in FIG. 25 has characteristics at time points t10, t11. At time points t10, t11 in FIG. 25, the steering wheel 2 of the vehicle is in a mechanical end contacting state (the zone E). In this case, as described above, because the steering torque does not change even when the test torque control amount Itt* is applied, the test torque control unit 31 stops application of the test torque control amount Itt*. Accordingly, heat generation in the motor 12 and the ECU 11 is suppressed, by restricting power to the ECU 11 (the drive circuit 22, and the motor 12, as a result).

The waveform in FIG. 26 has characteristics at time points t6 to t11. The zone of the time points t6 to t11 is in what is called the straight-line traveling state in which the steering wheel 2 is steered near neutral (the zone C). As is clear from FIG. 26, in the zone where the lapse time Th does not reach the predetermined time th after the vehicle shifts to the steering state in the zone C, the test torque control unit 31 outputs the test torque control amount Itt* according to the algorithms shown in FIGS. 22 and 23. On the other hand, in the zone (t9 to t11) where the lapse time Th passed the predetermined time th, the test torque control unit 31 stops outputting the test torque control amount Itt*. Accordingly, heat generation in the motor 12 and the ECU 11 is suppressed, by restricting power to the ECU 11 (the drive circuit 22, and the motor 12, as a result).

Next, a method for determining an abnormality in the torque sensor 14 is described in detail with reference to FIGS. 27 and 28.

Figure 27:
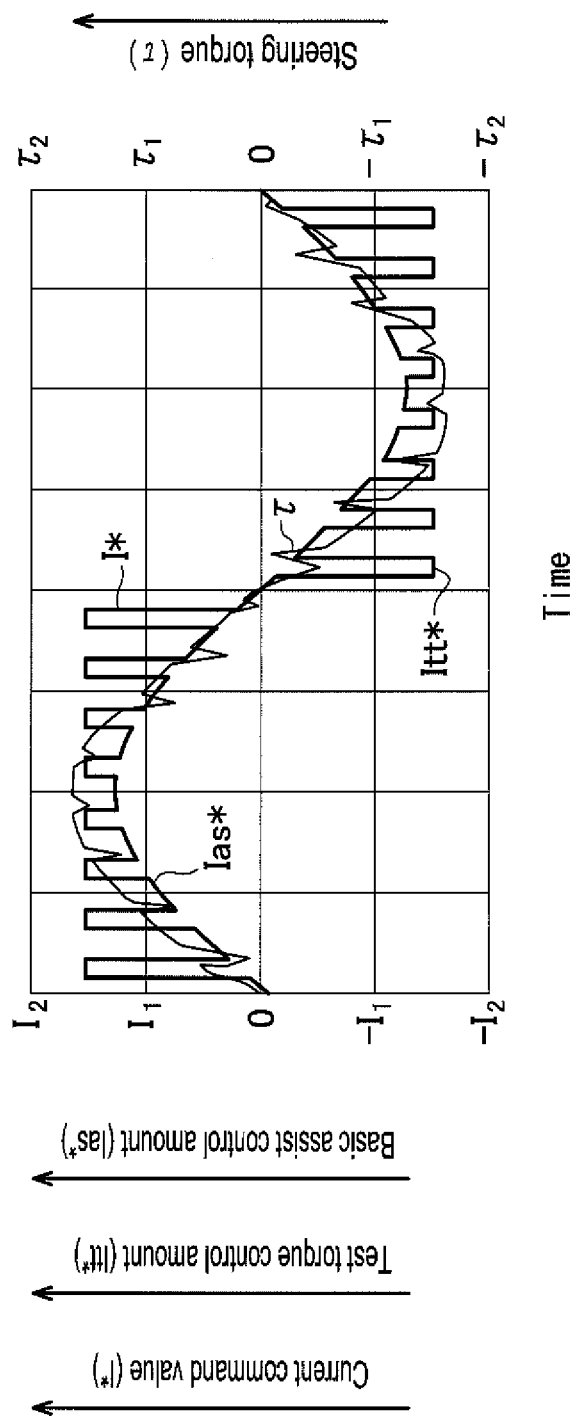
FIG. 27 is an explanatory diagram of the torque sensor at the application of instantaneous torque.

FIG. 27 is a graph showing the current command value I* and the steering torque τ when algorithms in FIGS. 22 and 23 are applied to the vehicle in the steering state in FIG. 19. FIG. 28 is a graph showing an enlarged part of FIG. 27. FIGS. 27 and 28 show a state in which the steering torque τ detected by the torque sensor varies when instantaneous motor torque is applied to the steering system. In FIGS. 27 and 28, left vertical axes express the current command value I*, which is obtained by adding the test torque control amount Itt* to the basic assist control amount Ias*. Right vertical axes express the steering torque τ, which is detected by the torque sensor 14, and horizontal axes express a time axis.

The steering state of the vehicle in FIG. 28 expresses a steering state in which the steering wheel 2 is being steered to right (the zone A in FIG. 19, for example), and the test torque control amount Itt* is output for the predetermined time tr (1 ms, in the present embodiment, for example), at the time point t(1) of increase of the basic assist control amount Ias*.

Accordingly, instantaneous motor torque is applied to the steering system, and after the predetermined time trr (10 ms, in the present embodiment, for example) from the time point t(1) of output of the test torque control amount Itt*, torsion attributable to instantaneous motor torque occurs in the torsion bar. When the change amount Δτ during the predetermined time trr from the time point of the output of the test torque control amount Itt* is less than or equal to a predetermined value (0.5 Nm, for example, in the present embodiment), the abnormality detecting unit 30 determines that a sensor element corresponding to the residual sensor signal is abnormal.

More specifically, the test torque control unit 31 outputs the application signal Sim (see FIG. 18) that indicates the application of instantaneous motor torque based on the test torque control amount Itt*, to the abnormality detecting unit 30, at each time of outputting the test torque control amount Itt*. The abnormality detecting unit 30 executes detection of an abnormality in the residual sensor signal at the assist continuation control, based on the application signal Sim.

That is, the abnormality detecting unit 30 executes the processes of Step 201 to Step 205 shown in FIG. 4, and detects presence or absence of an abnormality in the residual sensor signal. In the process of Step 205, when it is determined that the residual sensor signal is abnormal, the abnormality detecting unit 30 executes a determination process for determining whether a sensor element corresponding to the residual sensor signal is really out of order. That is, the abnormality detecting unit 30 executes the processes of Step 301 to Step 312 shown in FIG. 6, and determines presence or absence of failure in a sensor element corresponding to the residual sensor signal. In a similar manner to that in the first embodiment, when an abnormality in the residual sensor signal is detected, the abnormality detecting unit 30 measures the lapse time T since first detection of an abnormality, by using the timer 32 shown in FIG. 18. When there is detection of an abnormality at the predetermined number of times (n0) before the lapse time T exceeds the predetermined time (threshold time T0), the abnormality detecting unit 30 determines that a sensor element corresponding to the residual sensor element is out of order.

Next, the application state of instantaneous motor torque at the execution of the assist continuation control is described.

Figure 29:
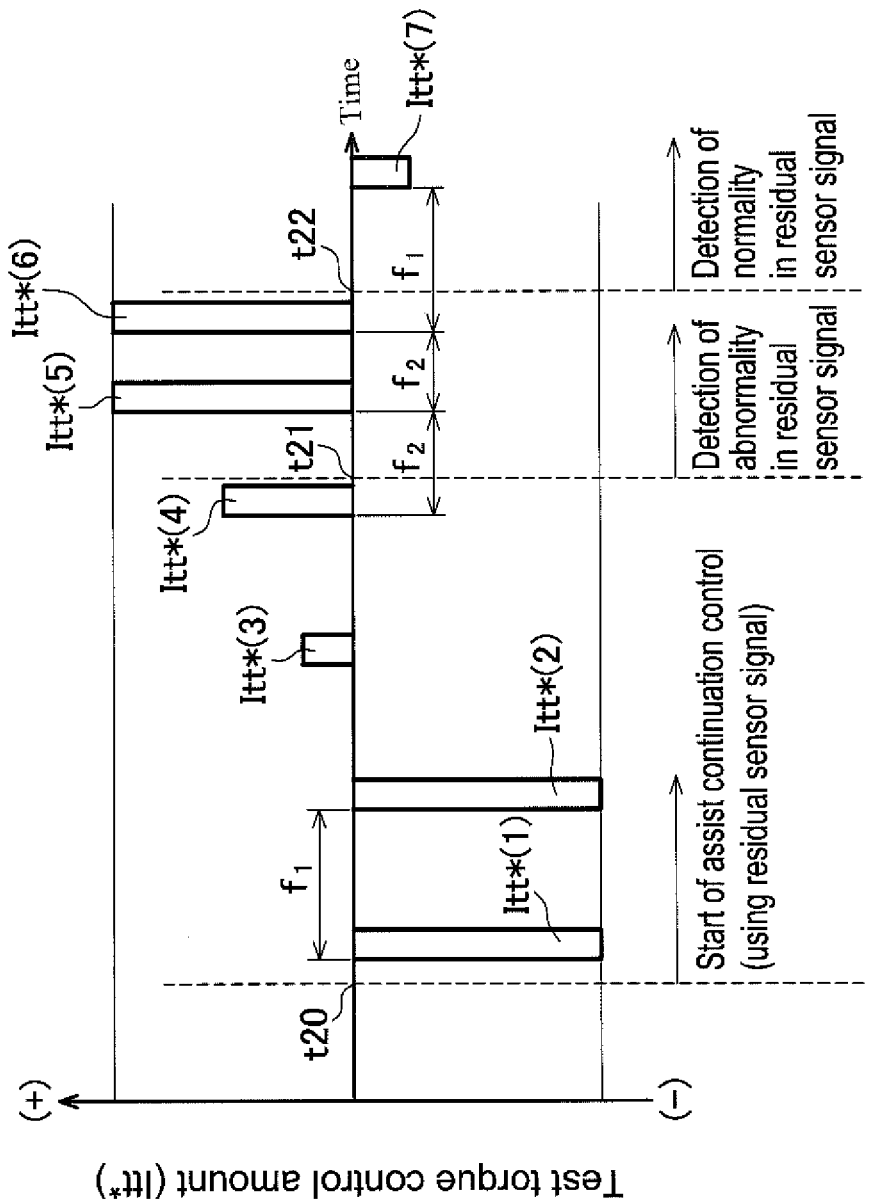
FIG. 29 is an explanatory diagram showing an application manner of instantaneous motor torque at an assist continuation control.

As shown in FIG. 29, at the assist continuation control, after a time point (a time point t21 in the drawing) of detection of an abnormality in the residual sensor signal, the test torque control unit 31 shortens the output cycle of the test torque control amount Itt* such that the output cycle f2 after the abnormality detection becomes shorter than the output cycle f1 before the abnormality detection (f1>f2). Accordingly, the application cycle of instantaneous motor torque becomes short during a period of executing a failure determination about a sensor element corresponding to the residual sensor signal.

Further, after an abnormality in the residual sensor signal is detected and after the output cycle of the test torque control amount Itt* is shortened, there is a case where the residual sensor signal returns to normal again (after a time point t22 in FIG. 29). In this case, the test torque control unit 31 returns the output cycle of the test torque control amount Itt* from the output cycle f2 to the output cycle f1 again.

In this way, the ECU 11 (the test torque control unit 31) shortens the application cycle of instantaneous motor torque, only during execution of a failure determination about the residual sensor signal, in a similar manner to that in the first embodiment. When the residual sensor signal returns to the normal value, the ECU 11 promptly returns the application cycle of instantaneous motor torque to the original cycle. The test torque control unit 31 executes the processes of Step 401 to Step 407 shown in FIG. 7, and changes the application cycle of instantaneous motor torque. Accordingly, the ECU 11 can execute, promptly and in high precision, a failure determination about a sensor element corresponding to the residual sensor signal while ensuring satisfactory steering feeling at the execution of the assist continuation control.

According to the fourth embodiment, the ECU 11, at the execution of the assist continuation control, controls the operation of the EPS actuator 10 so as to periodically apply instantaneous motor torque to the steering system, in the same direction as that of the assist force. In this case, an advantage similar to the advantage (1) of the first embodiment is achieved. Further, according to the fourth embodiment, the following advantage is achieved in addition to the advantages (1) to (3) of the first embodiment.

(9) The ECU 11 outputs the test torque control amount Itt* following algorithms of FIGS. 22 and 23, in the zone of what is called the straight-line traveling state in which the steering wheel 2 is steered near neutral where the lapse time Th does not reach the predetermined time th. On the other hand, the ECU 11 stops outputting the test torque control amount Itt*, in the zone where the lapse time Th passed the predetermined time th. Accordingly, heat generation in the motor 12 and the ECU 11 is suppressed, by restricting power to the ECU 11 (the drive circuit 22, and the motor 12, as a result).

Fifth Embodiment

Next, a fifth embodiment of the present invention is described. The present embodiment includes a configuration basically similar to that of the fourth embodiment, and is mainly different from the fourth embodiment in that instantaneous motor torque is periodically applied to the steering system in the direction opposite to the change direction of the assist force at the execution of the assist continuation control. Therefore, members and configurations that are the same as those in the fourth embodiment are given the same reference numerals, and explanation thereof is omitted.

Also in the present embodiment, the ECU 11 (the microcomputer 21) executes the power assist control according to an abnormality occurrence mode of the torque sensor 14 detected by the abnormality detecting unit 30. That is, the ECU 11 executes the processes of Step 2001 to Step 2009 shown in FIG. 3. The ECU 11 executes the ordinary control when there is no abnormality in the sensor signals Sa, Sb, executes the assist stop control when both sensor elements 14a, 14b are out of order, and executes the assist continuation control when only one of the sensor elements 14a, 14b is out of order.

Further, the ECU 11 periodically applies instantaneous motor torque to the steering system, in the assist continuation control, in association with the application of the assist force as the original function of the EPS. Then, the ECU 11 executes detection of an abnormality in the residual sensor signal, based on whether torsion of the torsion bar 16 attributable to instantaneous motor torque is reflected in the residual sensor signal in FIG. 28. That is, the EPS 1 of the present embodiment can promptly detect an abnormality at a stage before the residual sensor signal indicates a clearly abnormal value, by monitoring a change in the residual sensor signal.

Next, a method for applying instantaneous motor torque is described.

Figure 30:
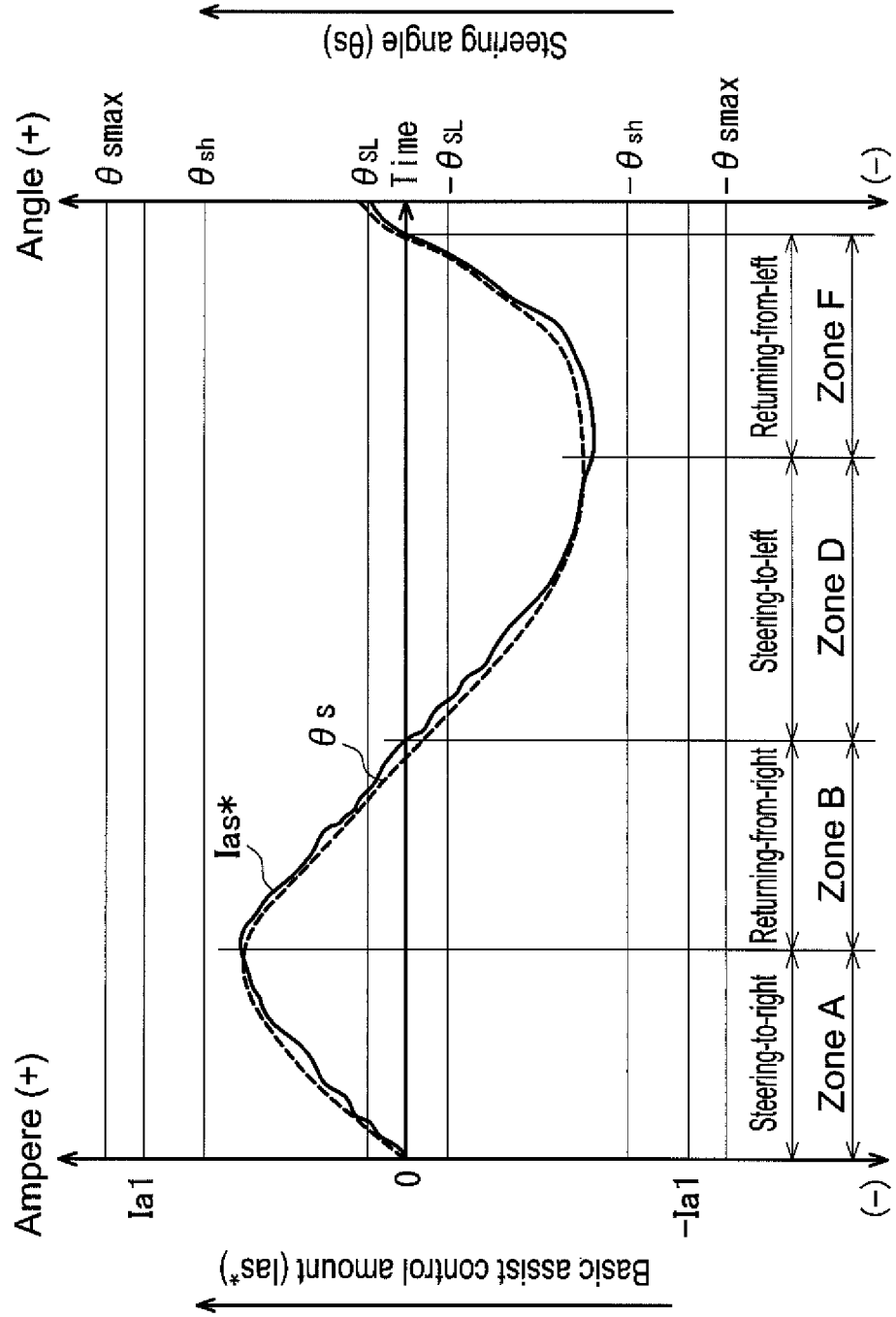
FIG. 30 is an explanatory diagram of a basic assist control amount and a steering angle in the first hypothetical steering state of the vehicle according to a fifth embodiment.
Figure 31:
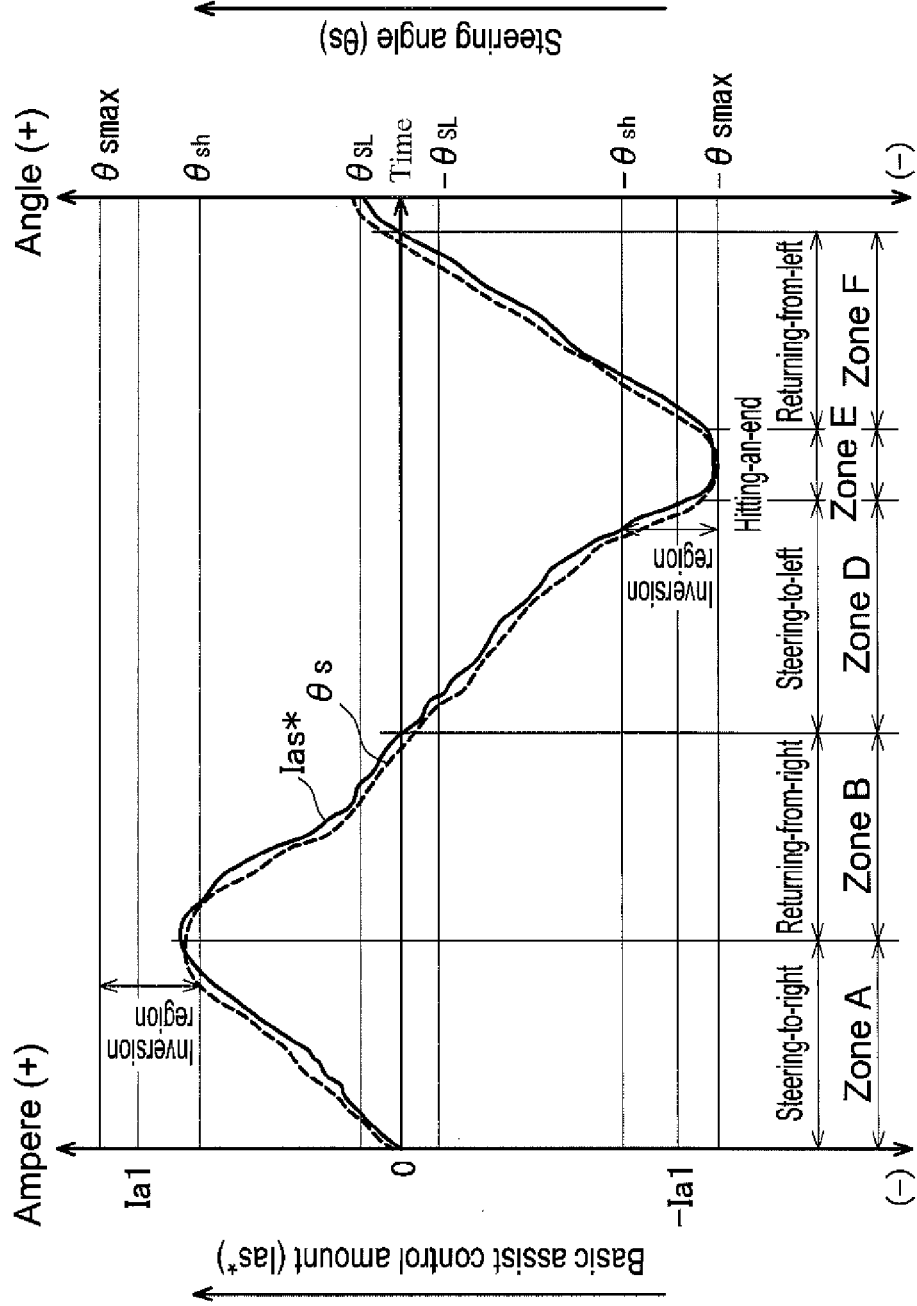
FIG. 31 is an explanatory diagram of a basic assist control amount and a steering angle in the second hypothetical steering state of the vehicle.
Figure 32:
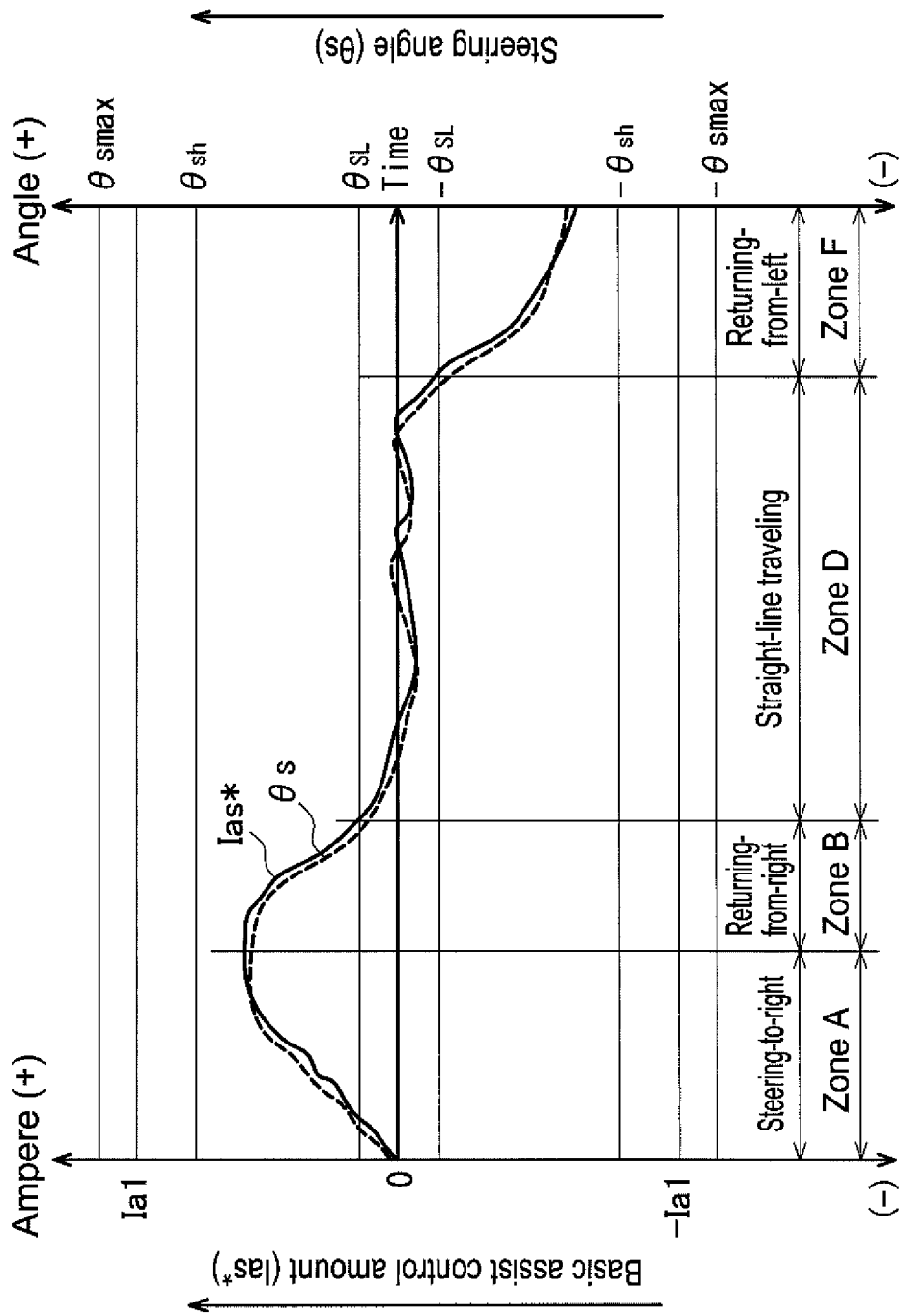
FIG. 32 is an explanatory diagram of a basic assist control amount and a steering angle in the third hypothetical steering state of the vehicle.

Also in the present embodiment, the magnitude and the application direction of instantaneous motor torque to be applied to the steering system change in accordance with the steering state of the vehicle. The first to third steering states shown in FIGS. 30 to 32 are assumed, and the method for applying instantaneous motor torque is described, based on the hypothetical steering state, in a similar manner to that in the fourth embodiment. A hypothetical steering state, a generation process of the FLG signal, which indicates the steering state, and a method for calculating the test torque control amount based on the FLG signal are described below in this order.

First, the hypothetical steering state is described. Graphs of FIGS. 30 to 32 are basically similar to the graphs of FIGS. 19 and 21, and are different in the following points. That is, in right vertical axes in FIGS. 30 to 32, a fifth predetermined steering angle θsh near the positive (+) side maximum steering angle, and a sixth predetermined steering angle −θsh near the negative (−) side maximum steering angle are set, in addition to the first predetermined steering angle θsL on the positive (+) side of and near the neutral position, the second predetermined steering angle θsmax as the positive (+) side maximum steering angle, the third predetermined steering angle −θsL on the negative (−) side of and the near neutral position, and the fourth predetermined steering angle −θsmax as the negative (−) side maximum steering angle are set, respectively. The fifth predetermined steering angle θsh and the sixth predetermined steering angle −θsh are basic values that are set near the second predetermined steering angle θsmax and the fourth predetermined steering angle −θsmax, respectively.

A first steering state shown in FIG. 30 is divided into four zones (the zones A, B, D, F). In the first steering state, in all steering regions, the steering angle θs is less than or equal to the fifth predetermined steering angle θsh, and is greater than or equal to the sixth predetermined steering angle −θsh. In all the steering regions, the basic assist control amount Ias* is less than or equal to the first predetermined current value Ia1, and is greater than or equal to the second predetermined current value −Ia1.

A second steering state shown in FIG. 31 is divided into five zones (the zones A, B, D, E, F). In the second steering state, the steering angle θs is temporarily a numerical value greater than or equal to the fifth predetermined steering angle θsh in the steering regions of the zones A, B, and is temporarily a numerical value less than or equal to the sixth predetermined steering angle −θsh in the steering regions of the zones D to F. Particularly, regarding the region where the steering angle θs is greater than or equal to the fifth predetermined steering angle θsh in the zone A, and the region where the steering angle θs is less than or equal to the sixth predetermined steering angle −θsh in the zone D, these regions become inversion regions where the direction of applied instantaneous motor torque is inverted. Further, in the second steering state, the steering angle θs in the steering region of the zone E reaches the fourth predetermined steering angle −θsmax. The basic assist control amount Ias* becomes a numerical value less than the second predetermined current value −Ia1, in the steering region of the zone E. That is, the second steering state has a greater steering angle θs than that in the first steering state, and has the contacting-an-end state.

A third steering state shown in FIG. 32 is divided into four zones (the zones A, B, C, D). In the third steering state, the steering angle θs in the steering region of the zone C is less than or equal to the first predetermined steering angle θsL, and is greater than or equal to the third predetermined steering angle −θsL. The basic assist control amount Ias* in all steering regions is less than or equal to the first predetermined current value Ia1, and is greater than or equal to the second predetermined current value −Ia1. That is, the third steering state has the straight-line traveling state.

Next, a process that the assist control amount determining unit 28 determines the steering state of the vehicle based on the vehicle steering states in FIGS. 30 to 32 and generates the FLG signal is described with reference to the flowcharts of FIGS. 33 to 35.

Figure 33:
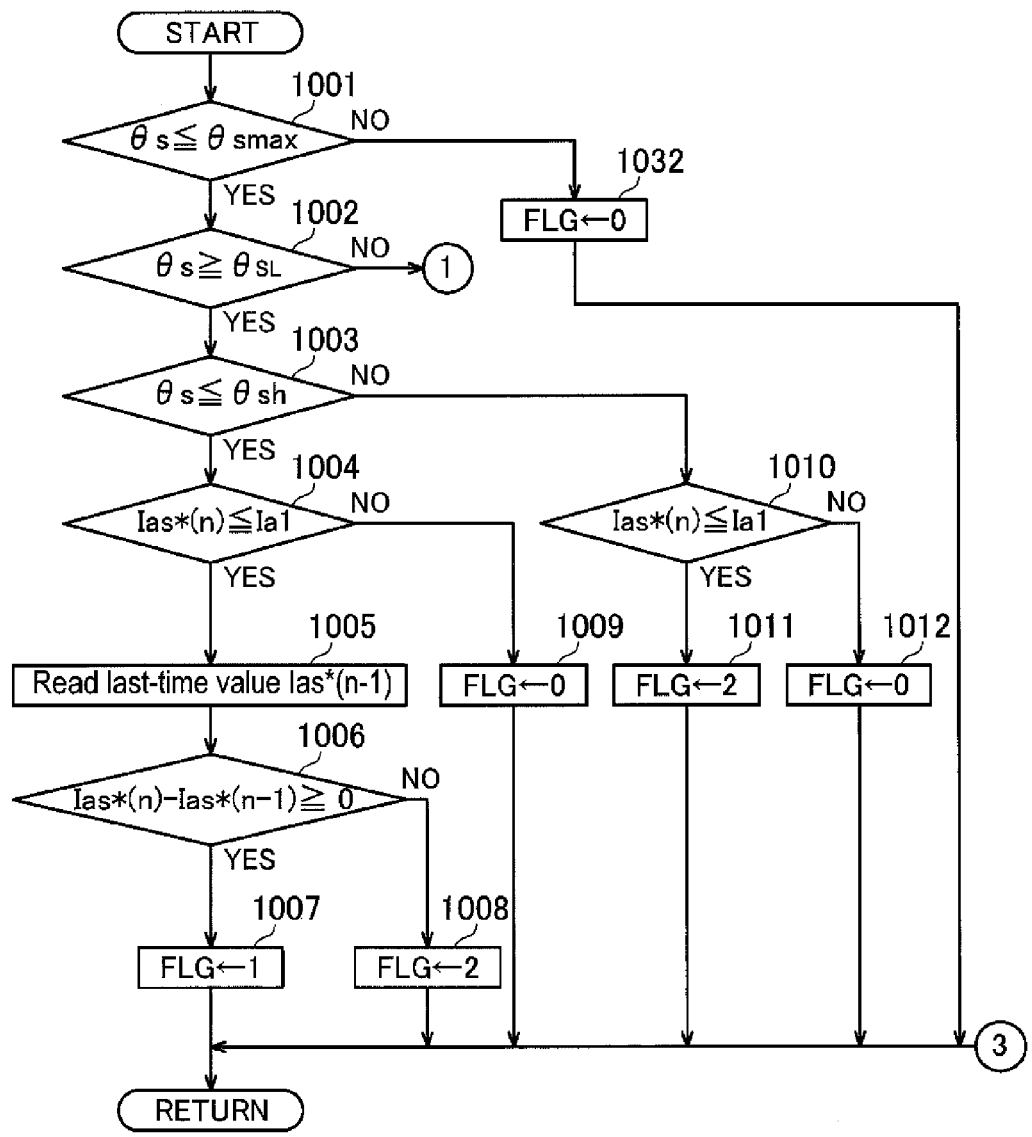
FIG. 33 is a flowchart showing a process of a state determination about a basic assist control amount.

As shown in FIG. 33, the assist control amount determining unit 28 first determines whether the steering angle θs is less than or equal to the second predetermined steering angle θsmax (Step 1001). When the steering angle θs is less than or equal to the second predetermined steering angle θsmax (Step 1001: YES), the assist control amount determining unit 28 determines whether the steering angle θs is greater than or equal to the first predetermined steering angle θsL (Step 1002). When the steering angle θs is greater than or equal to the first predetermined steering angle θsL (Step 1002: YES), the assist control amount determining unit 28 determines whether the steering angle θs is less than or equal to the fifth predetermined steering angle θsh (Step 1003).

When the steering angle θs is less than or equal to the fifth predetermined steering angle θsh (Step 1003: YES), the assist control amount determining unit 28 determines whether the basic assist control amount Ias*(n) as the this-time value is less than or equal to the first predetermined current value Ia1 (Step 1004). When the basic assist control amount Ias*(n) is less than or equal to the first predetermined current value Ia1 (Step 1004: YES), the assist control amount determining unit 28 reads a last-time value Ias*(n−1) of the basic assist control amount from the storage unit (memory) (Step 1005). Then, the assist control amount determining unit 28 compares the this-time value Ias*(n) of the basic assist control amount with the last-time value Ias*(n−1), and determines whether the this-time value Ias*(n) of the basic assist control amount is greater than or equal to the last-time value Ias*(n−1) (Step 1006).

When the this-time value Ias*(n) of the basic assist control amount is greater than or equal to the last-time value Ias*(n−1) (Step 1006: YES), the assist control amount determining unit 28 determines that the vehicle is in the steering state of the zone A, because the magnitude of the assist force is in an increase trend in the positive region (the steering-to-right state, in the present embodiment). Then, the assist control amount determining unit 28 writes 1 into the FLG (flag that indicates a state quantity: memory) (Step 1007), and ends the process.

At Step 1006, when the this-time value Ias*(n) of the basic assist control amount is less than the last-time value Ias*(n−1) (Step 1006: NO), the assist control amount determining unit 28 determines that the vehicle is in the steering state of the zone B, because the assist force is in a reduction trend in the positive region (the retuning-from-right state, in the present embodiment). Then, the assist control amount determining unit 28 writes 2 into the FLG (Step 1008), and ends the process.

At Step 1004, when the basic assist control amount Ias*(n) is greater than the first predetermined current value Ia1 (Step 1004: NO), the assist control amount determining unit 28 determines that the basic assist control amount Ias* has already reached the upper limit value. Then, the assist control amount determining unit 28 writes 0 into the FLG (Step 1009), and ends the process.

At Step 1003, when the steering angle θs is greater than the fifth predetermined steering angle θsh (Step 1003: NO), the assist control amount determining unit 28 determines whether the basic assist control amount Ias*(n) as the this-time value is less than or equal to the first predetermined current value Ia1 (Step 1010). When the basic assist control amount Ias*(n) is less than or equal to the first predetermined current value Ia1 (Step 1010: YES), the assist control amount determining unit 28 determines that the vehicle is in the inversion region of the zone A shown in FIG. 31 or in the steering region of the zone B, and that the basic assist control amount Ias*(n) does not yet reach the upper limit value. Then, the assist control amount determining unit 28 writes 2 into the FLG (Step 1011), and ends the process.

At Step 1010, when the basic assist control amount Ias*(n) is greater than the first predetermined current value Ia1 (Step 1010: NO), the assist control amount determining unit 28 determines that the basic assist control amount Ias* has already reached the upper limit value. Then, the assist control amount determining unit 28 writes 0 into the FLG (Step 1012), and ends the process. At Step 1002, when the steering angle θs is less than the first predetermined steering angle θsL (Step 1002: NO), the assist control amount determining unit 28 shifts the process to the flowchart in FIG. 34.

Figure 34:
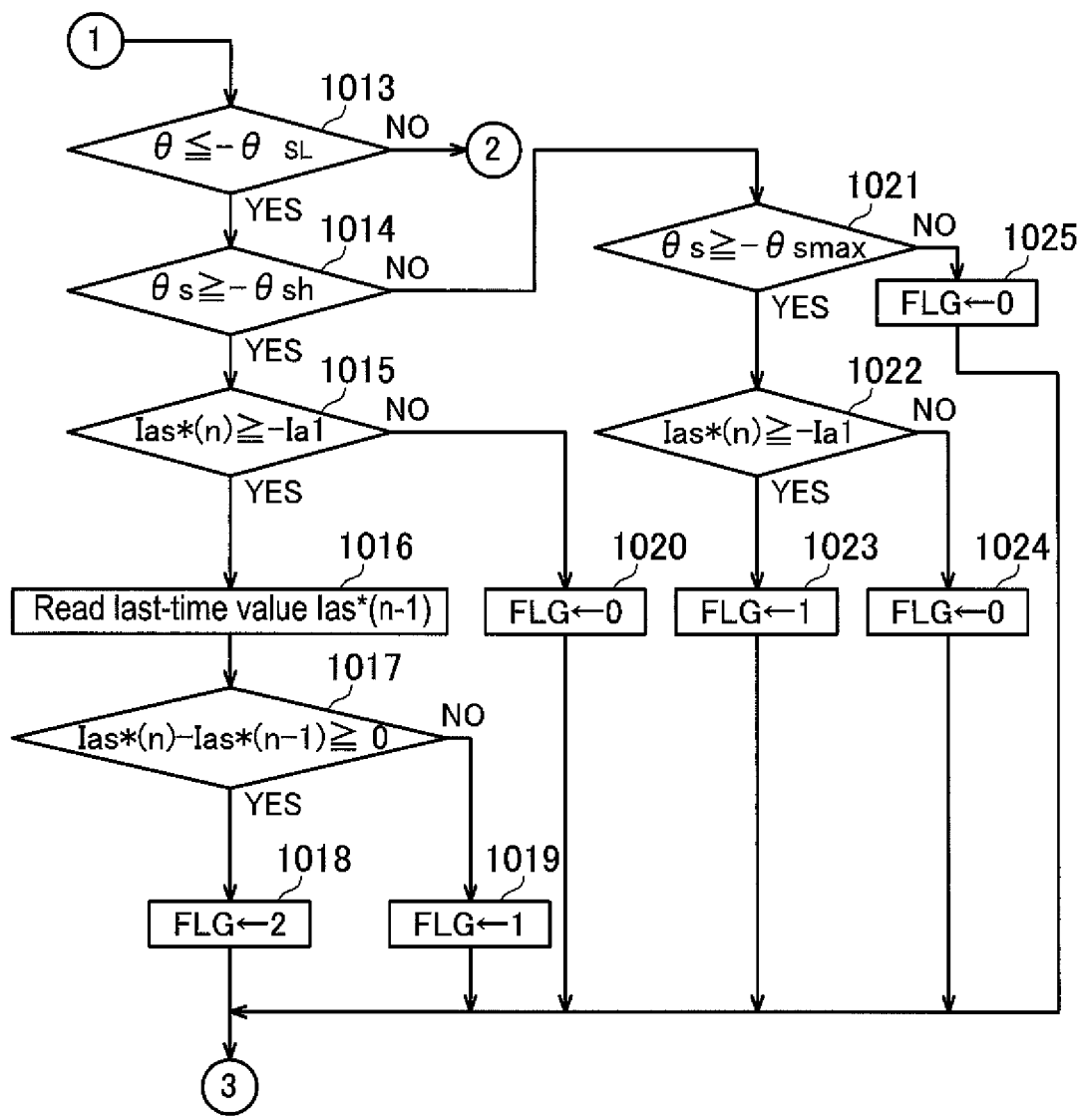
FIG. 34 is a flowchart showing a process of a state determination about a basic assist control amount.

In the flowchart in FIG. 34, the assist control amount determining unit 28 determines whether the steering angle θs is less than or equal to the third predetermined steering angle −θsL (Step 1013). When the steering angle θs is less than or equal to the third predetermined steering angle −θsL (Step 1013: YES), the assist control amount determining unit 28 determines whether the steering angle θs is greater than or equal to the sixth predetermined steering angle −θsh (Step 1014). When the steering angle θs is greater than or equal to the sixth predetermined steering angle −θsh (Step 1014: YES), the assist control amount determining unit 28 determines whether the basic assist control amount Ias*(n) is greater than or equal to the second predetermined current value −Ia1 (Step 1015).

When the basic assist control amount Ias*(n) is greater than or equal to the second predetermined current value −Ia1 (Step 1015: YES), the assist control amount determining unit 28 reads the last-time value Ias*(n−1) of the basic assist control amount from the storage unit (memory) (Step 816). Then, the assist control amount determining unit 28 determines whether the this-time value Ias*(n) of the basic assist control amount is less than or equal to the last-time value Ias*(n−1) (Step 1017).

When the this-time value Ias*(n) of the basic assist control amount is less than or equal to the last-time value Ias*(n−1) (Step 1017: YES), the assist control amount determining unit 28 determines that the vehicle is in the steering state of the zone D, because the magnitude of the assist force is in an increase trend in the negative region (the steering-to-left state, in the present embodiment). Then, the assist control amount determining unit 28 writes 2 into the FLG (Step 1018), and ends the process.

At Step 1017, when the this-time value Ias*(n) of the basic assist control amount is greater than or equal to the last-time value Ias*(n−1) (Step 1017: NO), the assist control amount determining unit 28 determines that the vehicle is in the steering state of the zone F, because the magnitude of the assist force is in reduction trend in the negative region (the returning-from-left state, in the present embodiment). Then, the assist control amount determining unit 28 writes 1 into the FLG (Step 1019), and ends the process.

At Step 1015, when the basic assist control amount Ias*(n) is less than the second predetermined current value −Ia1 (Step 1015: NO), the assist control amount determining unit 28 determines that the basic assist control amount Ias* has already reached the lower limit value, writes 0 into the FLG (Step 1020), and ends the process.

At Step 1014, when the steering angle θs is less than the sixth predetermined steering angle −θsh (Step 1014: NO), the assist control amount determining unit 28 determines whether the steering angle θs is greater than or equal to the fourth predetermined steering angle −θsmax (Step 1021).

When the steering angle θs is greater than or equal to the fourth predetermined steering angle −θsmax (Step 1021: YES), the assist control amount determining unit 28 determines whether the basic assist control amount Ias*(n) is greater than or equal to the second predetermined current value −Ia1 (Step 1022).

When the basic assist control amount Ias*(n) is greater than or equal to the second predetermined current value −Ia1 (Step 1022: YES), the assist control amount determining unit 28 determines that the vehicle is in the inversion region of the zone D or in the steering region of the zone F shown in FIG. 31, and that the basic assist control amount Ias* does not yet reach the lower limit value, writes 1 into the FLG (Step 1023), and ends the process.

At Step 1022, when the basic assist control amount Ias*(n) is less than the second predetermined current value −Ia1 (Step 1022: NO), the assist control amount determining unit 28 determines that the basic assist control amount Ias* has already reached the lower limit value, writes 0 into the FLG (Step 1024), and ends the process.

Further, at Step 1021, when the steering angle θs is less than the fourth predetermined steering angle −θsmax (Step 1021: NO), the assist control amount determining unit 28 determines that the vehicle is in the contacting-an-end state or near this state, writes 0 into the FLG (Step 1025), and ends the process.

At Step 1013, when the steering angle θs is greater than the third predetermined steering angle −θsL (Step 1013: NO), the assist control amount determining unit 28 determines that the vehicle is in the straight-line traveling state, and shifts the process to the flowchart shown in FIG. 35. When the vehicle shifted to the straight-line traveling state, the assist control amount determining unit 28 outputs the reset signal Sk to the timer 34 (see FIG. 18) provided in the current command value calculating unit 23, and measures the lapse time Th since the vehicle shifted to the straight-line traveling state.

Figure 35:
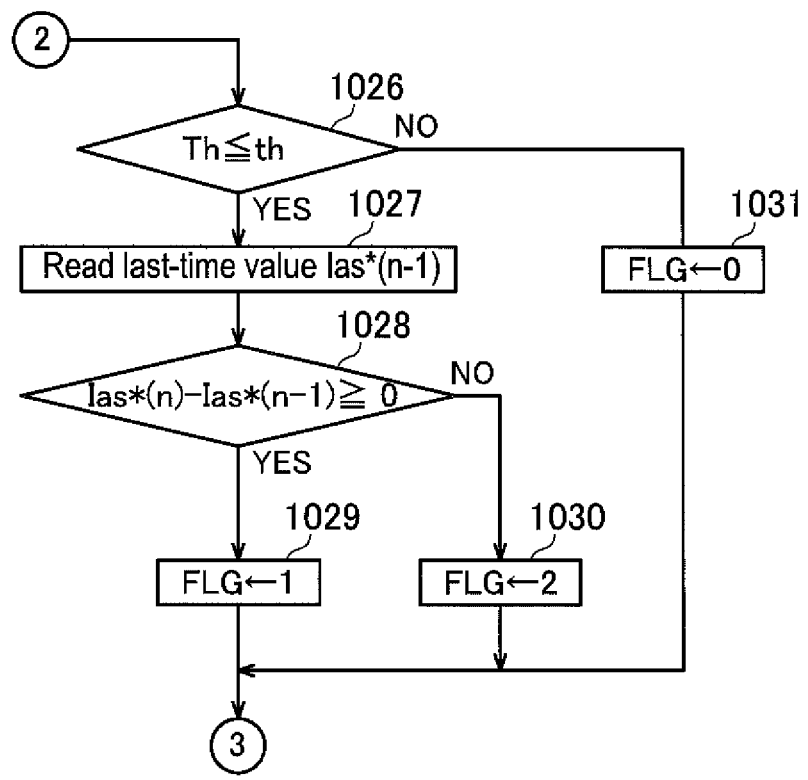
FIG. 35 is a flowchart showing a process of a state determination about a basic assist control amount.

In the flowchart in FIG. 35, the assist control amount determining unit 28 determines whether the lapse time Th is less than or equal to the predetermined time th (1 s, in the present embodiment) (Step 1026). When the lapse time Th is less than or equal to the predetermined time th (Step 1026: YES), the assist control amount determining unit 28 reads the last-time value Ias*(n−1) of the basic assist control amount from the storage unit (memory) (Step 1027), and determines whether the this-time value Ias*(n) of the basic assist control amount is greater than or equal to the last-time value Ias*(n−1) (Step 1028).

When the this-time value Ias*(n) of the basic assist control amount is greater than or equal to the last-time value Ias*(n−1) (Step 1028: YES), the assist control amount determining unit 28 determines that the magnitude of the assist force is in an increase trend in the zone C, writes 1 into the FLG (Step 1029), and ends the process. At Step 1028, when the this-time value Ias*(n) of the basic assist control amount is less than the last-time value Ias*(n−1) (Step 1028: NO), the assist control amount determining unit 28 determines that the magnitude of the assist force is in a reduction trend in the zone C, writes 2 into the FLG (Step 1030), and ends the process.

At Step 1026, when the lapse time Th is greater than the predetermined time th (Step 1026: NO), the assist control amount determining unit 28 determines that the predetermined time passed since the vehicle shifted to the straight-line traveling state in the zone C, writes 0 into the FLG (Step 1031), and ends the process.

Further, at Step 1001 in the flowchart in FIG. 33, when the steering angle θs is greater than the second predetermined steering angle θsmax (Step 1001: NO), the assist control amount determining unit 28 determines that the vehicle is in the contacting-an-end state or near this state, writes 0 into the FLG (Step 1032), and ends the process.

Figure 37:
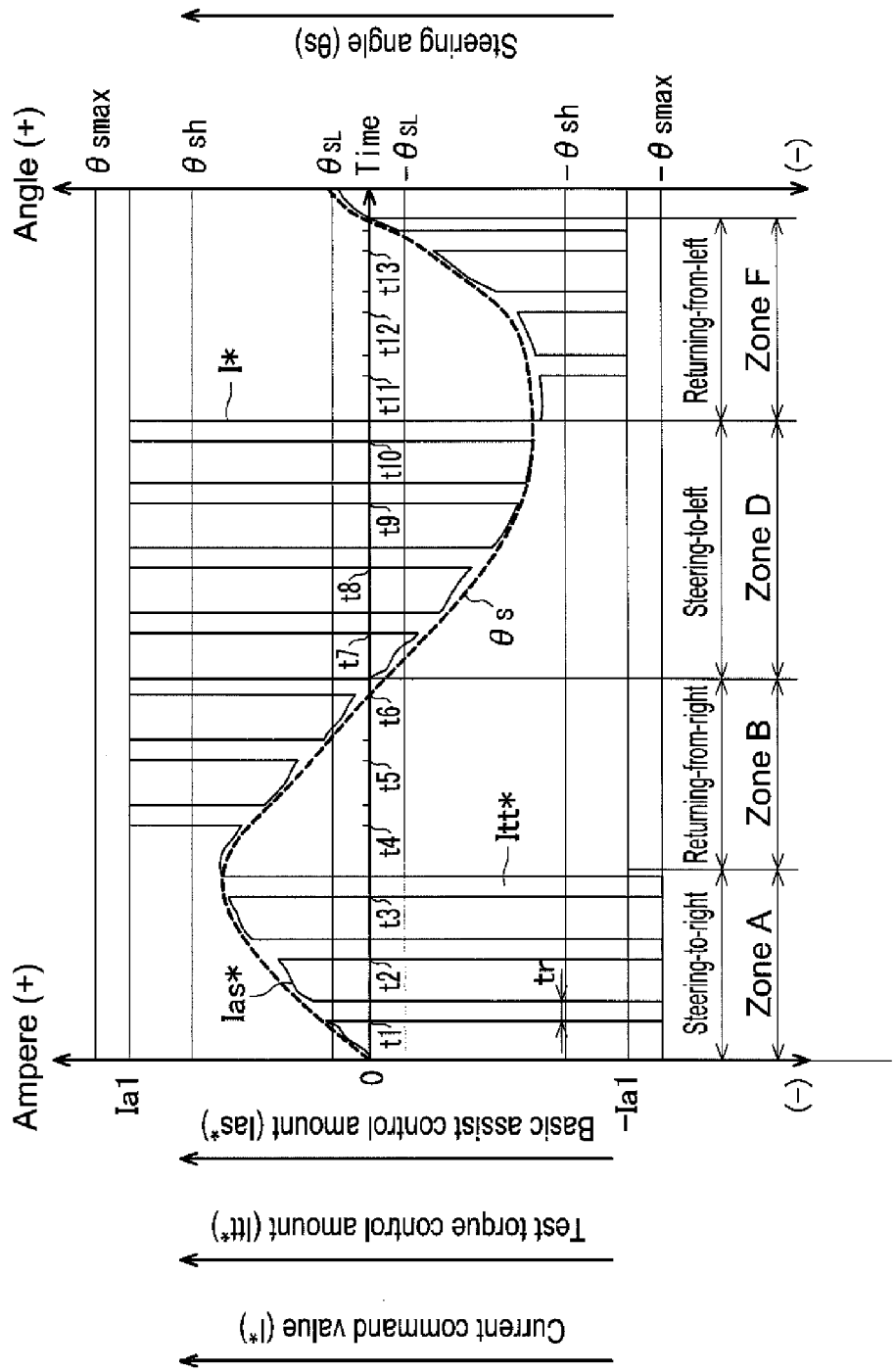
FIG. 37 is an explanatory diagram of a current command value and a steering angle in the first hypothetical steering state of the vehicle.
Figure 38:
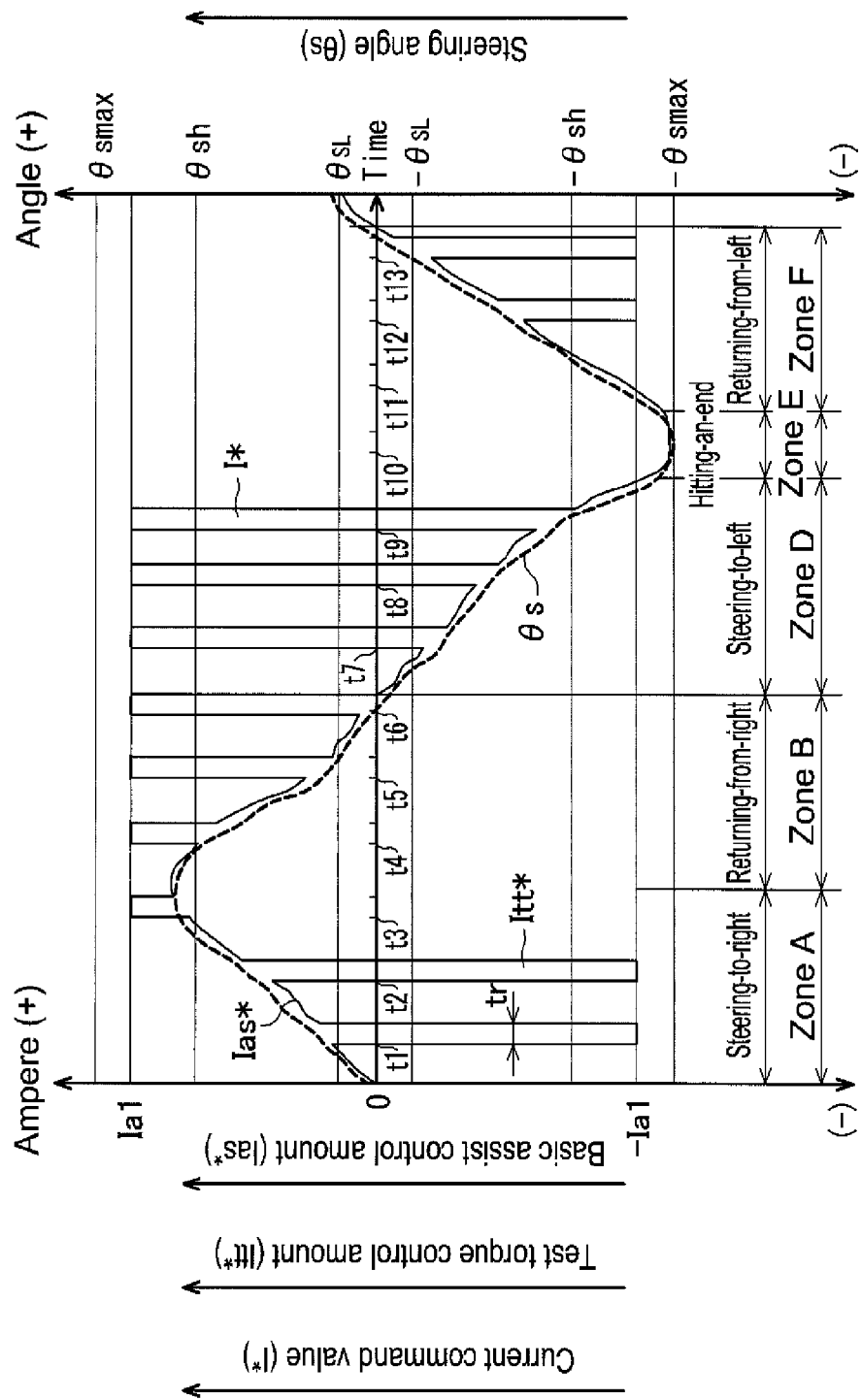
FIG. 38 is an explanatory diagram of a current command value and a steering angle in the second hypothetical steering state of the vehicle.
Figure 39:
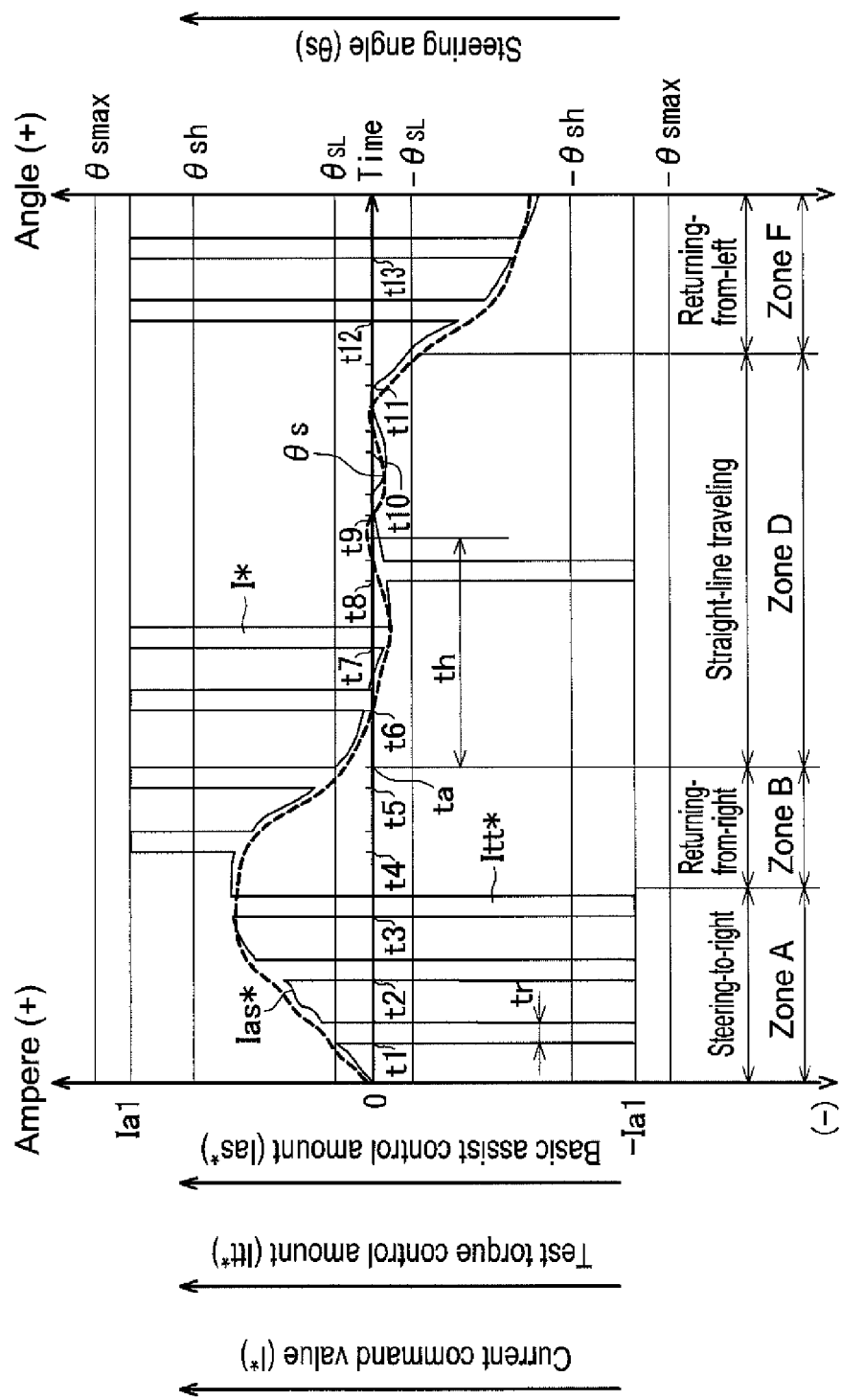
FIG. 39 is an explanatory diagram of a current command value and a steering angle in the third hypothetical steering state of the vehicle.

In a similar manner to that in the fourth embodiment, after the assist control amount determining unit 28 writes a determination result (0, 1, 2) of the steering state into the FLG, the assist control amount determining unit 28 generates the FLG signal that includes the determination result. As shown in FIGS. 37 to 39, the test torque control unit 31 outputs the test torque control amount Itt* (application of instantaneous motor torque) at timings of time points t1 to t13 of the time axis, based on the FLG signal received from the assist control amount determining unit 28. Intervals between time points t1, t2, t3, . . . of the output of the test torque control amount Itt* are set greater than the test torque control amount output time tr when the test torque control amount Itt* is output.

Next, a calculation process of the test torque control amount by the test torque control unit 31 is described in detail.

Figure 36:
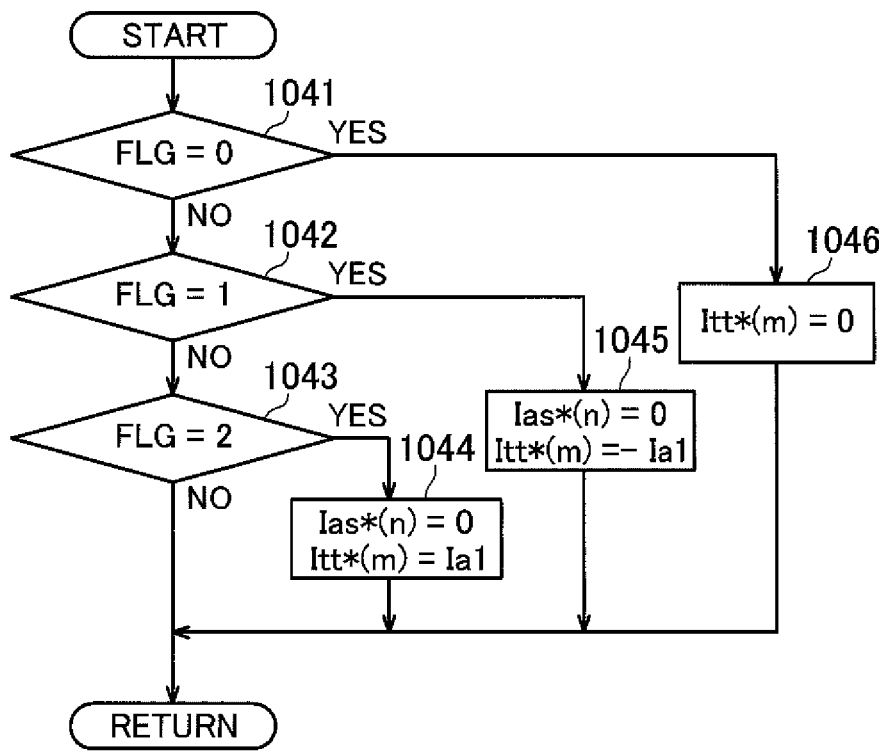
FIG. 36 is a flowchart showing a process of test torque control amount calculation.

As shown in FIG. 36, first, the test torque control unit 31 determines whether the FLG is 0 based on the FLG signal that is input from the assist control amount determining unit 28 (Step 1041). When the FLG is 0 (Step 1041: YES), the test torque control unit 31 writes 0 into the storage unit (memory) as a value of the test torque control amount Itt*(m) (Step 1046), and ends the process.

As cases where 0 is written into the storage unit as a value of the test torque control amount Itt*(m), that is, as cases where the FLG is 0, the following three cases are assumed, in a similar manner to the fourth embodiment. The first case is that the basic assist control amount Ias* reaches the first predetermined current value Ia1 (upper limit value) or the second predetermined current value −Ia1 (lower limit value), and that even when the test torque control amount Itt* is applied to the basic assist control amount Ias*, an abnormality in the torque sensor is difficult to be detected because a torque change is small (Step 1004: NO, Step 1010: NO, in FIG. 33, and Step 1015: NO, Step 1022: NO, in FIG. 34). The second case is a case of the zone E in FIG. 31, that is, a case of what is called the contacting-an-end (Step 1001: NO in FIG. 33, Step 1021: NO in FIG. 34). The third case is a case where the predetermined time Th passed since the vehicle shifted to the zone C in FIG. 32, what is called the straight-line traveling state (Step 1026: NO, in FIG. 35).

Referring back to FIG. 36, at Step 1041, when the FLG is not 0 (Step 1041: NO), the test torque control unit 31 determines whether the FLG is 1 (Step 1042). When the FLG is 1 (Step 1042: YES), the test torque control unit 31 writes 0 into the storage unit as a value of Ias*(n) and also writes the second predetermined current value −Ia1 into the storage unit as a value of the test torque control amount Itt*(m) (Step 1045), and ends the process.

The fact that the FLG is 1 indicates one of the following states A to D.

A: A state in which the basic assist control amount Ias* is a positive value and gradually increases, and the steering angle θs is less than the fifth predetermined steering angle θsh (the vehicle is in the steering-to-right state: the zone A).

B: A state in which the basic assist control amount Ias* is a negative value and gradually increase (the vehicle is in the returning-from-left state: the zone F).

C: A state in which the basic assist control amount Ias* is a negative value and gradually reduces, and the steering angle θs is less than the sixth predetermined steering angle −θsh (the inversion region of the zone D).

D: A state in which the basic assist control amount Ias* gradually increases, and also the predetermined time th does not pass, when the vehicle is in the straight-line traveling state (the zone C).

As described above, when the FLG is 1, the test torque control unit 31 sets the test torque control amount Itt* to the second predetermined current value −Ia1.

When the FLG is not 1 (Step 1042: NO), the test torque control unit 31 determines whether the FLG is 2 (Step 1043). When the FLG is 2 (Step 1043: YES), the test torque control unit 31 writes 0 into the storage unit as a value of Ias*(n) and also writes the first predetermined current value Ia1 into the storage unit as a value of the test torque control amount Itt*(m) (Step 1044), and ends the process.

The fact that the FLG is 2 indicates one of the following states E to H.

E: A state in which the basic assist control amount Ias* is a positive value and is gradually reducing (the vehicle is in the returning-from-right state: the zone B).

F: A state in which the basic assist control amount Ias* is a negative value, and the steering angle θs is greater than the sixth predetermined steering angle −θsh (the vehicle is in the steering-to-left state: the zone D).

G: A state in which the basic assist control amount Ias* is a positive value and is gradually increasing, and the steering angle θs is greater than the fifth predetermined steering angle θsh (the inversion region of the zone A).

H: A state in which the basic assist control amount Ias* is gradually reducing, and also the predetermined time th does not pass, when the vehicle is in the straight-line traveling state (the zone C).

As described above, when the FLG is 2, the test torque control unit 31 sets the test torque control amount Itt* to the first predetermined current value Ia1. At Step 1043, when the FLG is not 2 (Step 1043: NO), the test torque control unit 31 ends the process without executing any process.

FIGS. 37 to 39 are graphs showing the current command value I* obtained by adding the test torque control amount Itt* to the basic assist control amount Ias*, and showing a waveform of the steering angle θs, by applying algorithms shown in FIGS. 33 to 36 to the vehicle in the steering states shown in FIGS. 30 to 32. In the EPS 1 of the present embodiment, as shown in FIGS. 37 to 39, the magnitude of the test torque control amount Itt* is set such that the steering angle θs is influenced very little by application of instantaneous motor torque.

The waveform in FIG. 38 has characteristics at time points t3, t10, t11. At the time point t3, the test torque control amount Itt* is the first predetermined current value Ia1, according to the algorithm shown in the flowchart in FIG. 36.

As shown in FIG. 37, when the vehicle is in the steering-to-right state (the zone A) and when the steering angle θs is less than or equal to the fifth predetermined steering angle θsh, the test torque control amount Itt* is set to the second predetermined current value −Ia1. However, as shown at the time point t3 in FIG. 38, when the steering angle θs is greater than the fifth predetermined steering angle θsh in the zone A, the test torque control amount Itt* is set to the first predetermined current value Ia1.

When the steering angle θs is greater than the fifth predetermined steering angle θsh and is near the second predetermined steering angle θsmax, the steering torque τ detected by the torque sensor 14 reaches near a critical value that a sensor element of the torque sensor 14 can detect. When the test torque control amount Itt* is set to the second predetermined current value −Ia1 in this situation, the assist force rapidly reduces from a positive direction to a negative direction, and the torsion bar 16 is greatly twisted. Therefore, the steering torque τ that the torque sensor 14 detects increases. However, even when the steering torque τ is increased near the critical value of the sensor element, the steering torque τ may exceed a detection range of the sensor element and the torque sensor 14 is erroneously detected as abnormal although the torque sensor 14 is normal.

On the other hand, the microcomputer 21 (the test torque control unit 31) of the present embodiment reduces the torsion of the torsion bar 16, by setting the test torque control amount Itt* to the first predetermined current value Ia1 and by increasing the assist force. As a result, the steering torque τ that the torque sensor 14 detects changes within a detectable range of a sensor element. Therefore, the microcomputer 21 can reliably detect an abnormality in the sensor element, and can prevent erroneous detection. This applies to a case in which the steering angle θs is less than the sixth predetermined steering angle −θsh.

Further, at the time points t10, t11 in FIG. 38, the steering wheel 2 of the vehicle is in the mechanical end contacting state (the zone E). In this case, as described above, because the steering torque τ does not change even when the test torque control amount Itt* is applied, the test torque control unit 31 stops application of the test torque control amount Itt*. Accordingly, erroneous detection is prevented. Further, because power to the ECU 11 (the drive circuit 22, and the motor 12, as a result) is suppressed, heat generation in the motor 12 and the ECU 11 is suppressed.

The waveform in FIG. 39 has characteristics at time points t6 to t11. The zone of the time points t6 to t11 is in what is called the straight-line traveling state in which the steering wheel 2 is steered near neutral (the zone C). In the zone where the lapse time Th does not reach the predetermined time th after the vehicle shifts to the steering state in the zone C, the test torque control unit 31 outputs the test torque control amount Itt* according to the algorithms shown in FIGS. 35 and 36, and determines an abnormality in the torque sensor 14.

On the other hand, in the zone (t9 to t11) where the lapse time Th passed the predetermined time th, the test torque control unit 31 stops outputting the test torque control amount Itt*, by determining that the torque sensor 14 is normal. Accordingly, heat generation in the motor 12 and the ECU 11 is suppressed, by restricting power to the ECU 11 (the drive circuit 22, and the motor 12, as a result).

Also in the present embodiment, the microcomputer 21 (the test torque control unit 31) executes a determination about an abnormality in the torque sensor 14 according to the flowcharts in FIGS. 4 and 6, in a similar manner to that in the above embodiment. Further, the microcomputer 21 executes the processes of Step 401 to Step 407 shown in FIG. 7, and changes the application cycle of instantaneous motor torque.

According to the fifth embodiment, the ECU 11, at the execution of the assist continuation control, controls the operation of the EPS actuator 10 so as to periodically apply instantaneous motor torque to the steering system, in the direction opposite to the change direction of the assist force. In this way, an advantage similar to the advantage (1) of the first embodiment is achieved. Further, according to the fifth embodiment, advantages similar to the advantages (2), (3) of the first embodiment and the advantage (9) of the fourth embodiment are also achieved.

Sixth Embodiment

Next, a sixth embodiment of the present invention is described. The present embodiment includes a configuration basically similar to that of the fourth embodiment. In the present embodiment, in a similar manner to that in the fourth embodiment, at the execution of the assist continuation control, instantaneous motor torque is periodically applied to the steering system in the same direction as the direction of the assist force. Therefore, members and configurations that are the same as those in the fourth embodiment are given the same reference numerals, and explanation thereof is omitted.

Figure 40:
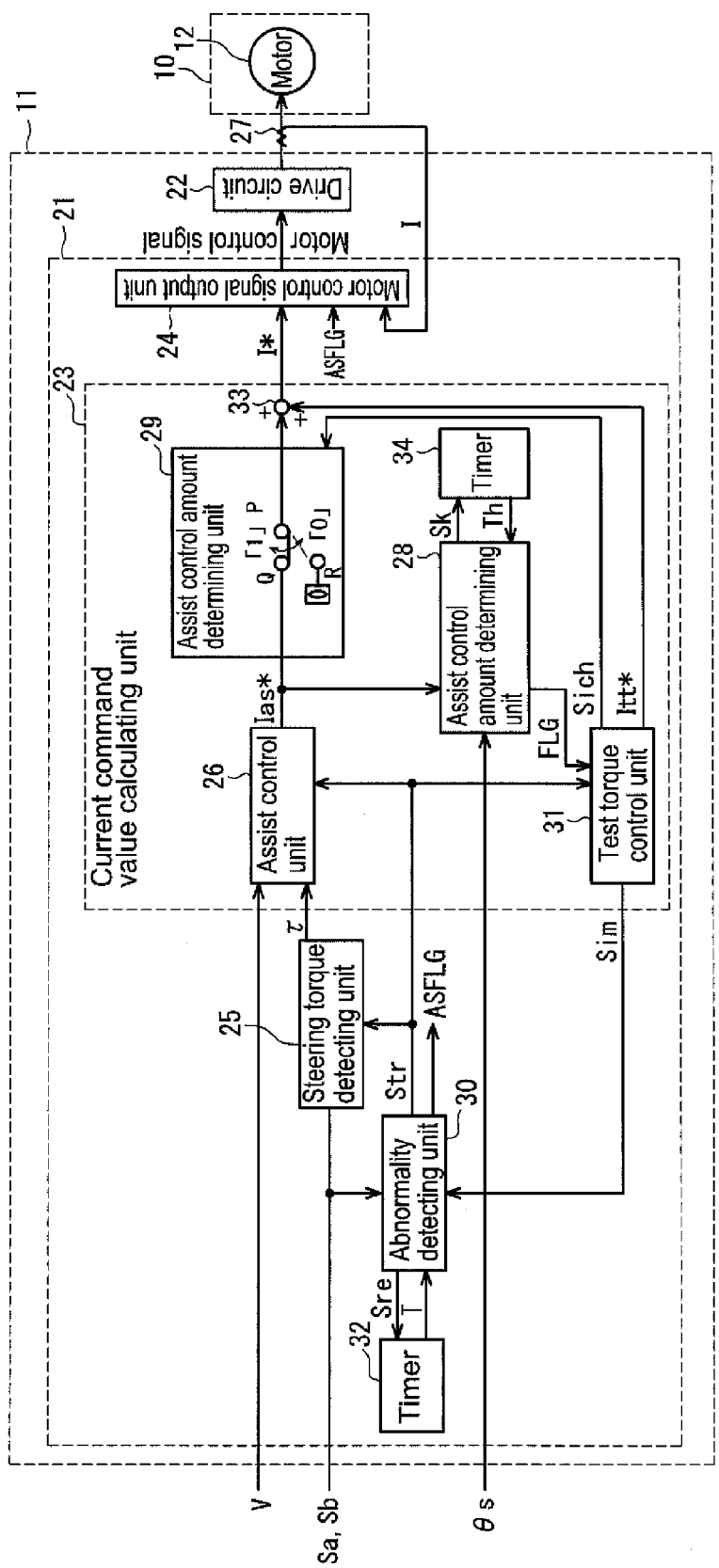
FIG. 40 is a control block diagram of the EPS according to a sixth embodiment.

As shown in FIG. 40, the abnormality detecting unit 30 in the present embodiment writes 0 into the flag ASFLG during the assist continuation control, and writes 1 into the flag ASFLG when the assist continuation control is not being executed. The abnormality detecting unit 30 also supplies a value of the flag ASFLG, which indicates whether the assist continuation control is being executed, to the motor control signal output unit 24.

Next, the motor control signal output unit 24 is described in detail.

Figure 41:
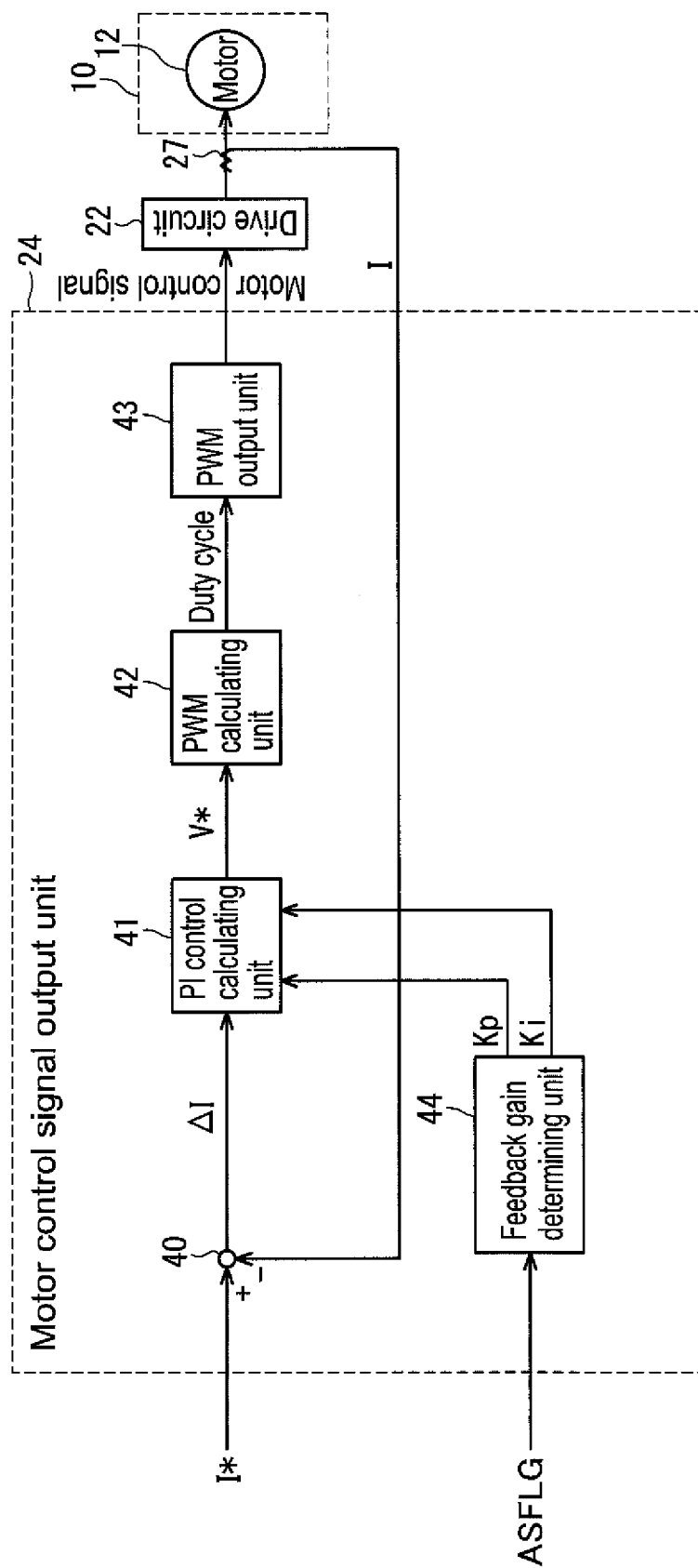
FIG. 41 is a control block diagram of a motor control signal output unit of the EPS.

As shown in FIG. 41, the motor control signal output unit 24 has a subtracting unit 40, a PI control calculating unit 41, a PWM calculating unit 42, a PWM output unit 43, and a feedback gain determining unit 44. The subtracting unit 40 calculates a difference between a current command value I* and an actual current value I. The PI control calculating unit 41 generates a voltage command value V* by amplifying a current deviation value ΔI as an output of the subtracting unit 40. The PWM calculating unit 42 calculates a duty cycle based on the voltage command value V* generated by the PI control calculating unit 41. The PWM output unit 43 generates a motor control signal based on the duty cycle calculated by the PWM calculating unit 42.

Figure 43A:
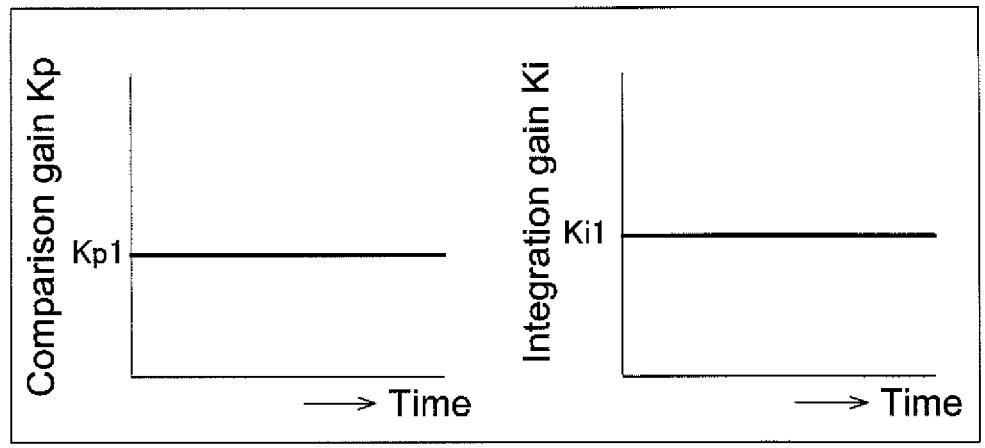
FIGS. 43(a) and 43(b) are schematic configuration diagrams of a gain map.
Figure 43B:
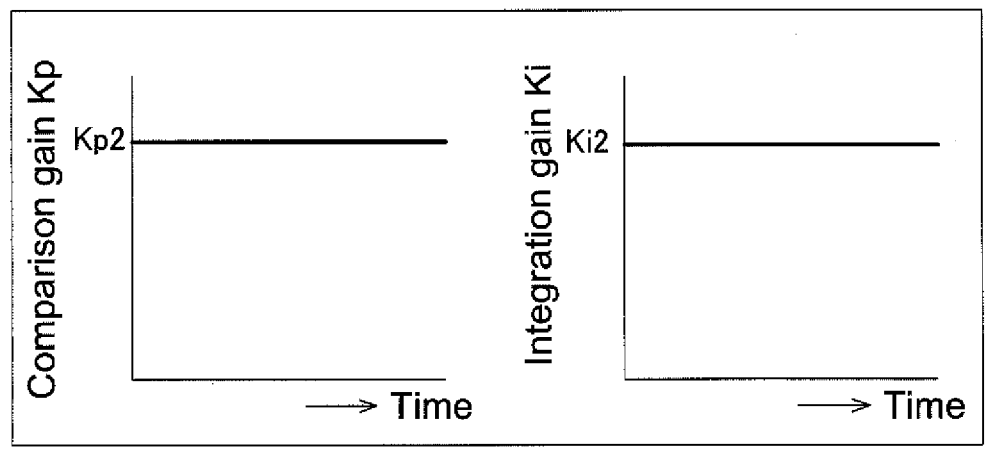

The feedback gain determining unit 44 determines values of a proportional gain Kp of the PI control calculating unit 41 and an integration gain Ki. The feedback gain determining unit 44 also has two kinds of gain maps shown in FIGS. 43(a) and 43(b). One is a first gain map (ordinary control gain map), which is used during the ordinary control, that is, when ASFLG=0. The other is a second gain map (assist continuation control gain map), which is used when the assist continuation control is being executed, that is, when ASFLG=1. Further, the first gain map shown in FIG. 43(a) prescribes a proportional gain Kp1 and an integration gain Ki1. The second gain map shown in FIG. 43(b) prescribes a proportional gain Kp2 and an integration gain Ki2. The size relationships between the proportional gains Kp1 and Kp2 and between the integration gains Ki1 and Ki2 are as follows.

$$Kp1 < Kp2$$

$$Ki1 < Ki2$$

Based on a setting in this way, a sensor signal is output in good response from the residual output element, when application of instantaneous motor torque occurs during execution of the assist continuation control. Also in the present embodiment, the ECU 11 executes power assist control according to an abnormality occurrence mode of the torque sensor 14, according to the flowchart in FIG. 3, in a similar manner to that in the first embodiment.

Further, in a similar manner to that in the fourth embodiment, the ECU 11 in the present embodiment also periodically applies instantaneous motor torque to the steering system, in association with the application of the assist force as the original function of the EPS, and executes detection of an abnormality in the residual sensor signal based on whether torsion attributable to instantaneous motor torque is reflected in the residual sensor signal.

A method for applying instantaneous motor torque is similar to that in the fourth embodiment. Also in the present embodiment, the magnitude and the application direction of instantaneous motor torque to the steering system change in accordance with the steering state of the vehicle. The microcomputer 21 (the assist control amount determining unit 28) determines the steering state of the vehicle by the processes of Step 801 to Step 817 shown in FIG. 22, and generates the FLG signal, which indicates the steering state, in a similar manner to that in the fourth embodiment. Then, the microcomputer 21 (the test torque control unit 31) calculates the test torque control amount Itt* by the processes of Step 901 to Step 906 shown in FIG. 23.

Figure 42:
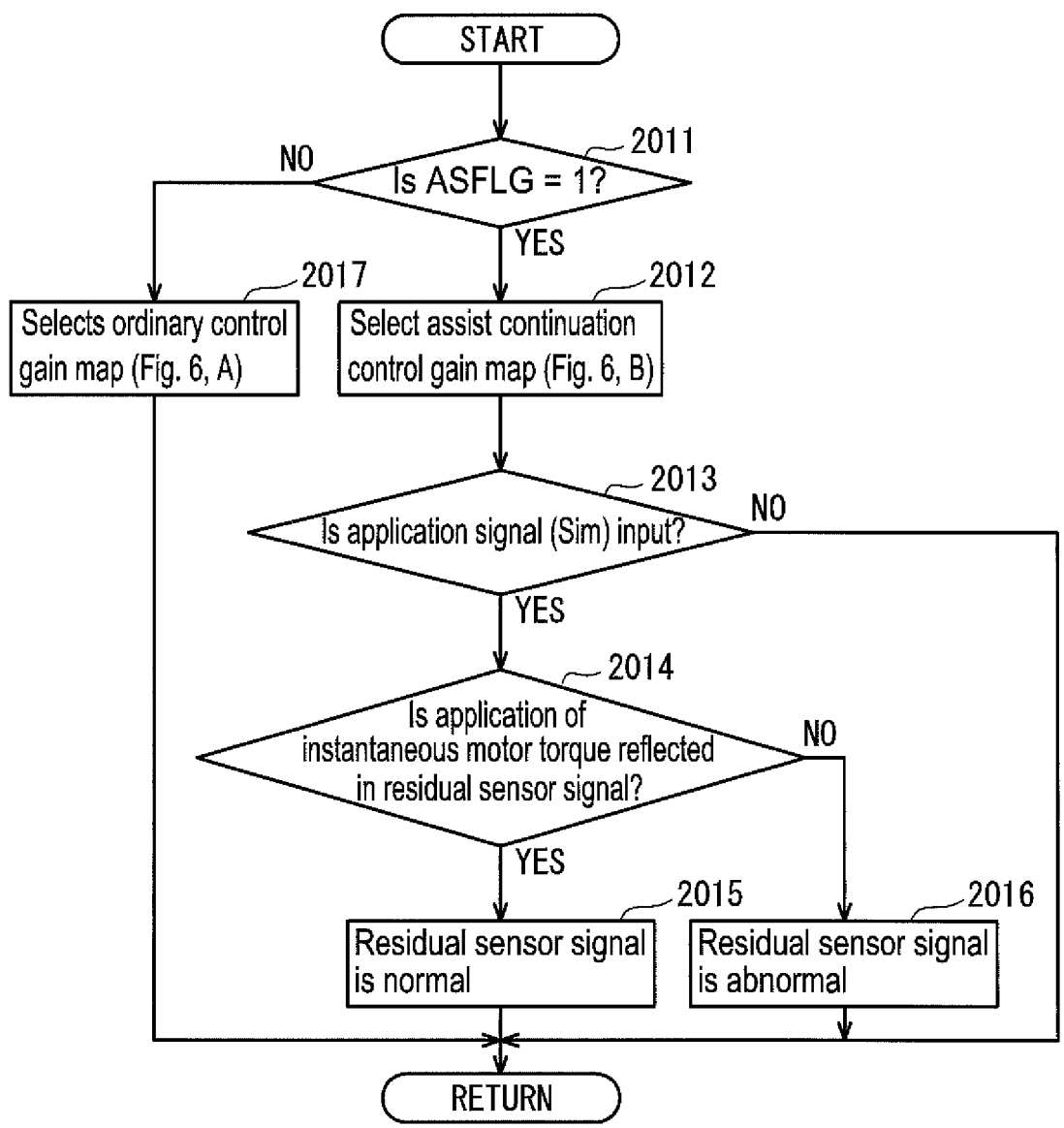
FIG. 42 is a flowchart showing a process of detection of an abnormality in a residual sensor signal.

The abnormality detecting unit 30 in the present embodiment also executes detection of an abnormality in the residual sensor signal at the assist continuation control, based on the application signal Sim generated by the test torque control unit 31. That is, as shown in FIG. 42, the abnormality detecting unit 30 determines whether the flag ASFLG, which indicates that the assist continuation control is being executed, is 1 (Step 2011). When ASFLG is 1 (Step 2011: YES), the abnormality detecting unit 30 selects the assist continuation control gain map shown in FIG. 43(b) (Step 2012). Then, the abnormality detecting unit 30 determines presence or absence of input of the application signal Sim (Step 2013). When there is input of the application signal Sim (Step 2013: YES), the abnormality detecting unit 30 determines whether the application of instantaneous motor torque indicated by the application signal Sim is reflected in an input residual sensor signal (Step 2014). As shown in FIG. 28, also in the present embodiment, the above determination is executed based on whether the residual sensor signal changes at a proper timing (within the predetermined time trr) corresponding to the application of instantaneous motor torque, and based on whether a change direction and the magnitude are proper values.

When the application of instantaneous motor torque is reflected in the residual sensor signal (Step 2014: YES), the abnormality detecting unit 30 determines that the residual sensor signal is normal (Step 2015). When the application of instantaneous motor torque is not reflected in the residual sensor signal (Step 2014: NO), the abnormality detecting unit 30 determines that the residual sensor signal is abnormal (Step 2016). When ASFLG is not 1 at the preceding Step 2011 (Step 2011: NO), the abnormality detecting unit 30 selects the ordinary control gain map shown in FIG. 43(a) (Step 2017), and ends the process.

When it is determined that the residual sensor signal is abnormal (Step 2016 in FIG. 42), the abnormality detecting unit 30 executes a determination process for determining whether a sensor element corresponding to the residual sensor signal is really out of order. That is, the abnormality detecting unit 30 executes the processes of Step 301 to Step 312 shown in FIG. 6, and determines presence or absence of failure in a sensor element corresponding to the residual sensor signal. In a similar manner to that in the fourth embodiment, when an abnormality in the residual sensor signal is detected, the abnormality detecting unit 30 measures the lapse time T since first detection of an abnormality, by using the timer 32 shown in FIG. 40. When there is detection of an abnormality at the predetermined number of times (n0) before the lapse time T exceeds the predetermined time (threshold time T0), the abnormality detecting unit 30 determines that a sensor element corresponding to the residual sensor element is out of order.

Further, also in the present embodiment, the test torque control unit 31 shortens the application cycle of instantaneous motor torque, only during execution of a failure determination about the residual sensor signals, shown in FIG. 29. When the residual sensor signal returns to the normal value, the application cycle of instantaneous motor torque is promptly returned to the original cycle. The test torque control unit 31 changes the application cycle of instantaneous motor torque according to the flowchart in FIG. 7, in a similar manner to that in the first embodiment. A determination on whether the assist continuation control is being executed (Step 401) is executed based on whether the flag ASFLG is 1.

According to the sixth embodiment, the following advantage is achieved in addition to the advantages (1) to (3) of the first embodiment and the advantage (9) of the fourth embodiment.

(10) The ECU 11 (the microcomputer 21) has the motor control signal output unit 24. The motor control signal output unit 24, which functions as a feedback control means, executes feedback control of the motor 12 based on the deviation between the current command value I* for generating an assist force corresponding to the steering torque τ and the actual current I that flows in the motor 12.

Further, the ECU 11 (the motor control signal output unit 24) includes the feedback gain determining unit 44. The feedback gain determining unit 44 determines the feedback gains (the proportional gain Kp and the integration gain Ki) of the motor control signal output unit 24 (the PI control calculating unit 41), based on a value of the flag ASFLG, which indicates that the assist continuation control is being executed and is output from the abnormality detecting unit 30.

That is, after only one output element (sensor element) remains in which failure is not detected, when continuing application of the assist force by using a sensor signal that is output by the residual output element, the feedback gain determining unit 44 sets a greater feedback gain than that when two or more residual output elements remain in which failure is not detected. Accordingly, after there remains only one output element in which failure is not detected, application of the assist force is continued by using a sensor signal that is output by the residual output element. When application of instantaneous motor torque occurs for improving reliability of the residual torque sensor, a sensor signal is output in good response from the residual output element.

The sixth embodiment may be modified as follows.

In the sixth embodiment, a calculation cycle of steering torque is set the same at the ordinary control when both torque sensors are normal and at the assist continuation control when one of the torque sensors is abnormal. However, the calculation cycle may be set as follows. That is, at the assist continuation control, to reflect application of instantaneous motor torque to a sensor signal, the calculation cycle of steering torque at the assist continuation control may be set longer than the calculation cycle of steering torque at the ordinary control.

In the sixth embodiment, at the assist continuation control, an abnormality in one of the torque sensors is determined by reflecting application of instantaneous motor torque in a sensor signal. However, when a reflected sensor signal rapidly changes, the assist continuation control may be stopped.

Seventh Embodiment

Next, a seventh embodiment of the present invention is described. The present embodiment also includes a configuration basically similar to that of the fourth embodiment. In the present embodiment, in a similar manner to that in the fourth embodiment, at the execution of the assist continuation control, instantaneous motor torque is periodically applied to the steering system in the same direction as the direction of the assist force. Therefore, members and configurations that are the same as those in the fourth embodiment are the same reference numerals, and explanation thereof is omitted.

Figure 44:
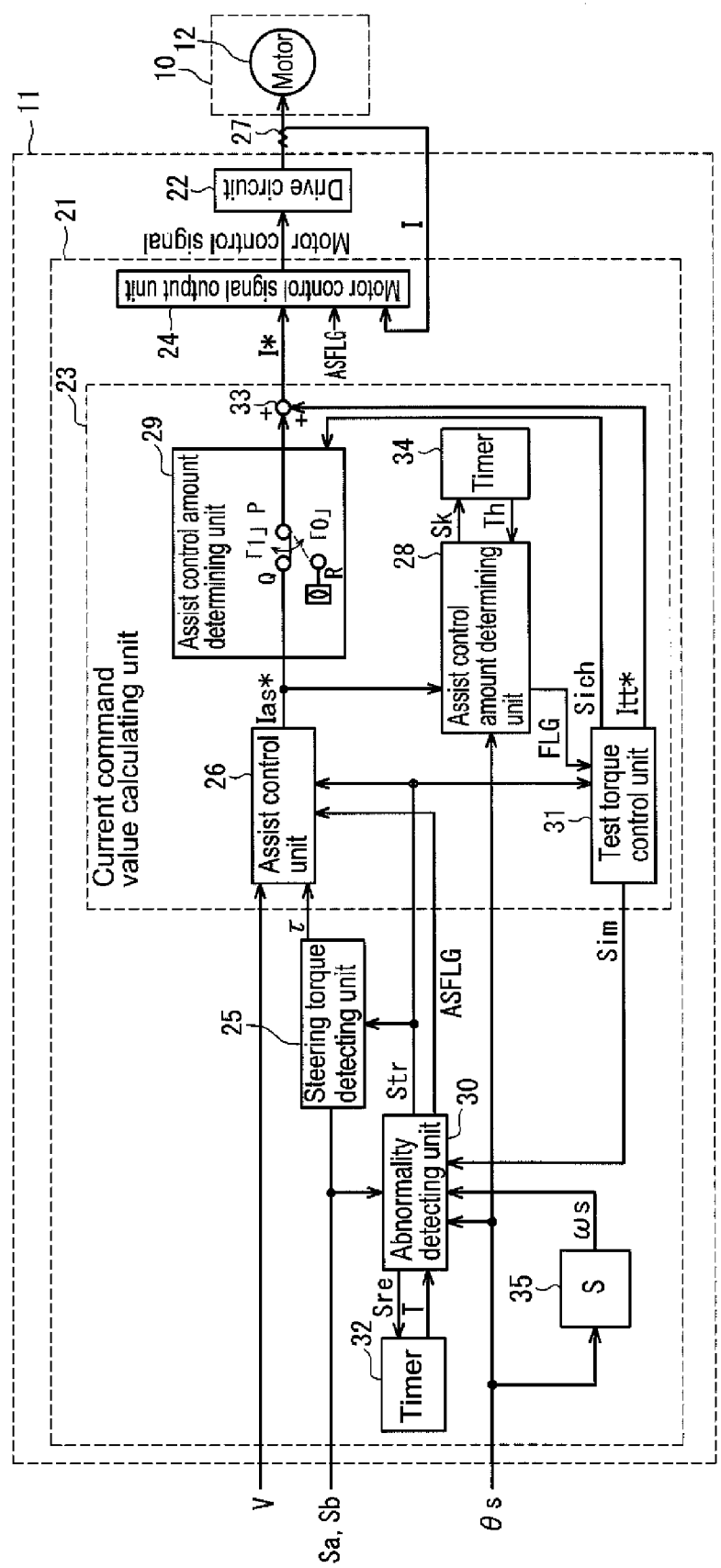
FIG. 44 is a control block diagram of the EPS according to a seventh embodiment.

As shown in FIG. 44, the microcomputer 21 includes a differentiator 35 as a steering angular velocity detecting means. The differentiator 35 fetches the steering angle θs, and generates a steering angular velocity ωs by differentiating the steering angle θs. The abnormality detecting unit 30 fetches the steering angle θs and the steering angular velocity ωs. The abnormality detecting unit 30 also writes 0 into the flag ASFLG when the assist continuation control is not being executed, and writes 1 or 2 into the flag ASFLG when the assist continuation control is being executed. The abnormality detecting unit 30 supplies a value of the ASFLG indicating whether the assist continuation control is being executed, to the assist control unit 26.

Also in the present embodiment, the ECU 11 executes the power assist control in accordance with an abnormality occurrence mode of the torque sensor 14 detected by the abnormality detecting unit 30.

Figure 45:
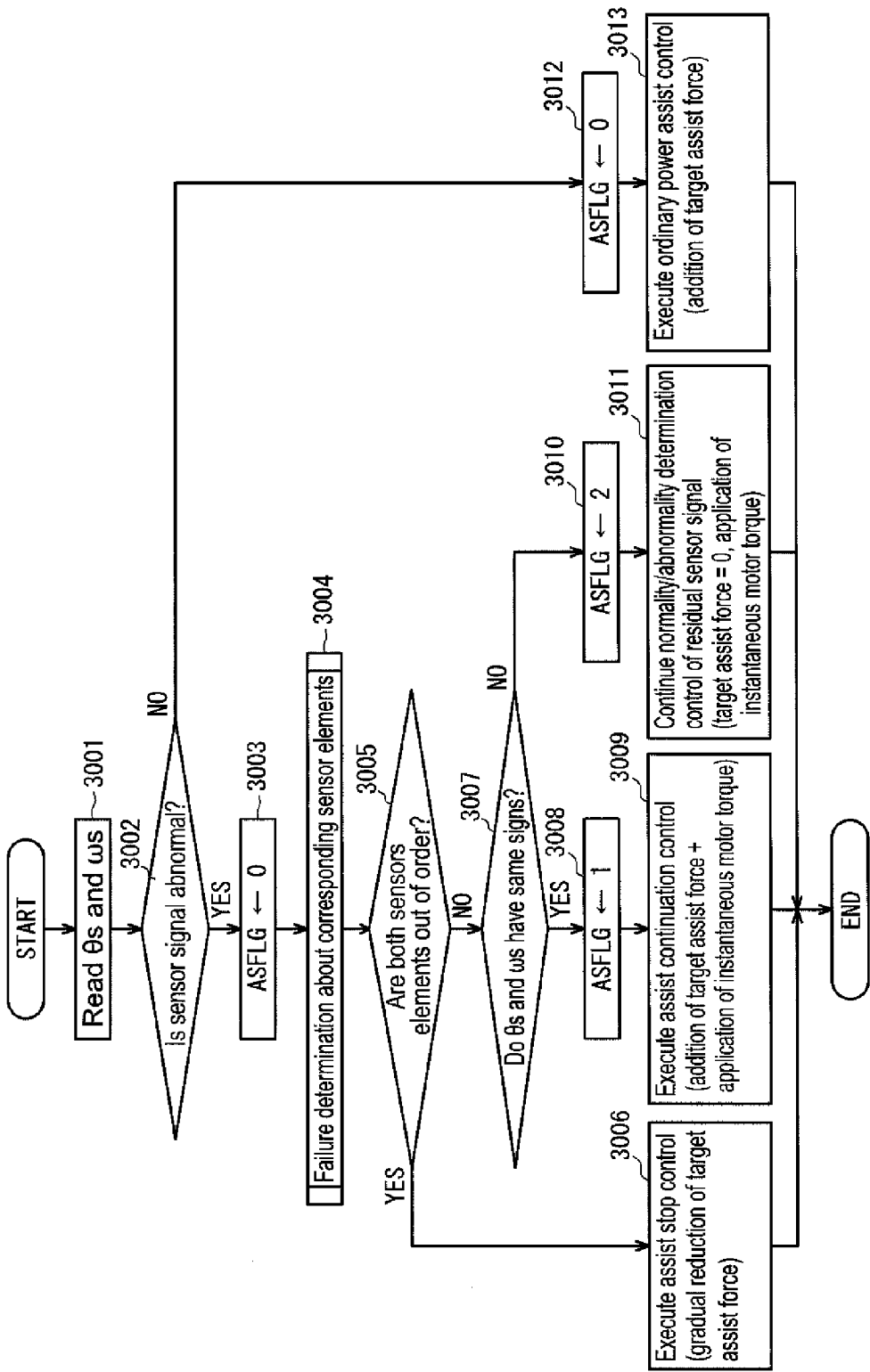
FIG. 45 is a flowchart showing a process of power assist control in accordance with an abnormality occurrence mode of the torque sensor.

As shown in FIG. 45, the microcomputer 21 first reads the steering angle θs and the steering angular velocity ωs (Step 3001). The microcomputer 21 determines presence or absence of an abnormality in the sensor signals Sa, Sb by the abnormality detecting unit 30 (Step 3002). Detection of an abnormality in the sensor signals Sa, Sb is executed based on a determination on whether values of the sensor signals Sa, Sb are deviated from values that the sensor signals Sa, Sb can take at normal times and a comparison determination about values of the sensor signals Sa, Sb and a change amount per unit time and the like.

When the abnormality detecting unit 30 detects abnormalities in the sensor signals Sa, Sb (Step 3002: YES), the microcomputer 21 writes 0 into the flag ASFLG (flag that indicates a state quantity: memory), which indicates that the assist continuation control is being executed (Step 3003). Next, the microcomputer 21 executes a failure determination (detection) about the sensor elements 14a, 14b that are output elements of the sensor signals Sa, Sb (Step 3004), based on a result of the abnormality detection that is detected at Step 3002. When it is determined that both sensor elements 14a, 14b are out of order (Step 3005: YES), the microcomputer 21 promptly stops the power assist control and executes assist stop control so as to execute failsafe (Step 3006). By the assist stop control, the target assist force is gradually reduced. The test torque control unit 31 stops outputting the test torque control amount Itt*, based on the abnormality detection signal Str that is input from the abnormality detecting unit 30.

At Step 3001, when the sensor signals Sa, Sb are detected to be normal (Step 3002: NO), the microcomputer 21 writes 0 into the flag ASFLG, which indicates that the assist continuation control is being executed (Step 3012), and executes the ordinary power assist control (Step 3013). By the ordinary power assist control, the target assist force is added to the steering system.

At Step 3005, when it is determined that only one of the sensor elements 14a, 14b that correspond to the sensor signals Sa, Sb respectively is out of order (Step 3005: NO), the microcomputer 21 detects the steering torque τ, based on a sensor signal (residual sensor signal) output by the residual sensor element. Then, the microcomputer 21 determines whether the steering angle θs and the steering angular velocity ωs read at Step 3001 have the same signs (Step 3007).

When the steering angle θs and the steering angular velocity ωs have the same signs (Step 3007: YES), the microcomputer 21 writes 1 into the flag ASFLG, which indicates that the assist continuation control is being executed (Step 3008), and continues the power assist control using the residual sensor signal (Step 3009). By the assist continuation control, instantaneous motor torque is applied to the steering system, in addition to the target assist force.

At Step 3007, when the steering angle θs and the steering angular velocity ωs do not have the same signs (Step 3007: NO), the microcomputer 21 writes 2 into the flag ASFLG, which indicates that the assist continuation control is being executed (Step 3010). Then, the microcomputer 21 continues normality/abnormality determination control of the residual sensor signal, without applying the target assist force (Step 3011). By the normality/abnormality determination control, the target assist force is set to 0, and at the same time, instantaneous motor torque is applied to the steering system.

Further, in a similar manner to that in the fourth embodiment, the ECU 11 in the present embodiment also periodically applies instantaneous motor torque to the steering system, in association with the application of the assist force as the original function of the EPS, and executes detection of an abnormality in the residual sensor signal, based on whether torsion attributable to instantaneous motor torque is reflected in the residual sensor signal.

A method for applying instantaneous motor torque is similar to that in the fourth embodiment. Also in the present embodiment, the magnitude and the application direction of instantaneous motor torque to the steering system change in accordance with the steering state of the vehicle. The microcomputer 21 (the assist control amount determining unit 28) determines the steering state of the vehicle by the processes of Step 801 to Step 817 shown in FIG. 22, and generates the FLG signal, which indicates the steering state, in a similar manner to that in the fourth embodiment. Then, the microcomputer 21 (the test torque control unit 31) calculates the test torque control amount Itt* by the processes of Step 901 to Step 906 shown in FIG. 23.

The abnormality detecting unit 30 in the present embodiment also executes detection of an abnormality in the residual sensor signal at the assist continuation control, based on the application signal Sim generated by the test torque control unit 31. A specific application procedure follows the flowchart in FIG. 4, in a similar manner to that in the first embodiment. A determination on whether the assist continuation control is being executed (Step 201) is executed based on the flag signal ASFLG, which indicates that the assist continuation control is being executed.

As described above, when it is determined that the residual sensor signal is abnormal (Step 205 in FIG. 4), the abnormality detecting unit 30 executes a determination process for determining whether a sensor element corresponding to the residual sensor signal is really out of order. That is, the abnormality detecting unit 30 executes the processes of Step 301 to Step 312 shown in FIG. 6, and determines presence or absence of failure in a sensor element corresponding to the residual sensor signal. In a similar manner to that in the fourth embodiment, when an abnormality in the residual sensor signal is detected, the abnormality detecting unit 30 measures the lapse time T since first detection of an abnormality, by using the timer 32 shown in FIG. 44. When there is detection of an abnormality at the predetermined number of times (n0) before the lapse time T exceeds the predetermined time (threshold time T0), the abnormality detecting unit 30 determines that a sensor element corresponding to the residual sensor element is out of order.

Further, also in the present embodiment, as shown in FIG. 29, the test torque control unit 31 shortens the application cycle of instantaneous motor torque, only during execution of a failure determination about the residual sensor signal. When the residual sensor signal returns to the normal value, the application cycle of instantaneous motor torque is promptly returned to the original cycle. A specific process follows the flowchart in FIG. 7, in a similar manner to that in the first embodiment. A determination on whether the assist continuation control is being executed (Step 401) is executed based on the flag ASFLG, which indicates that the assist continuation control is being executed.

According to the seventh embodiment, the following advantage is achieved in addition to the advantages (1) to (3) of the first embodiment and the advantage (9) of the fourth embodiment.

(11) When signs of the steering angle θs and the steering angular velocity ωs are different based on the steering angle θs detected by the steering sensor 17 and the steering angular velocity ωs obtained by differentiating the steering angle θs, the assist force is not output. Accordingly, after only one output element (sensor element) remains in which failure is not detected, self-steering or reverse assist is prevented, while continuing application of the assist force by using a sensor signal that is output by the residual output element.

Eighth Embodiment

Next, an eighth embodiment of the present invention is described. The present embodiment includes a configuration basically similar to that in the first embodiment. Therefore, members and configurations that are the same as those in the first embodiment are given the same reference numerals, and explanation thereof is omitted.

Figure 46:
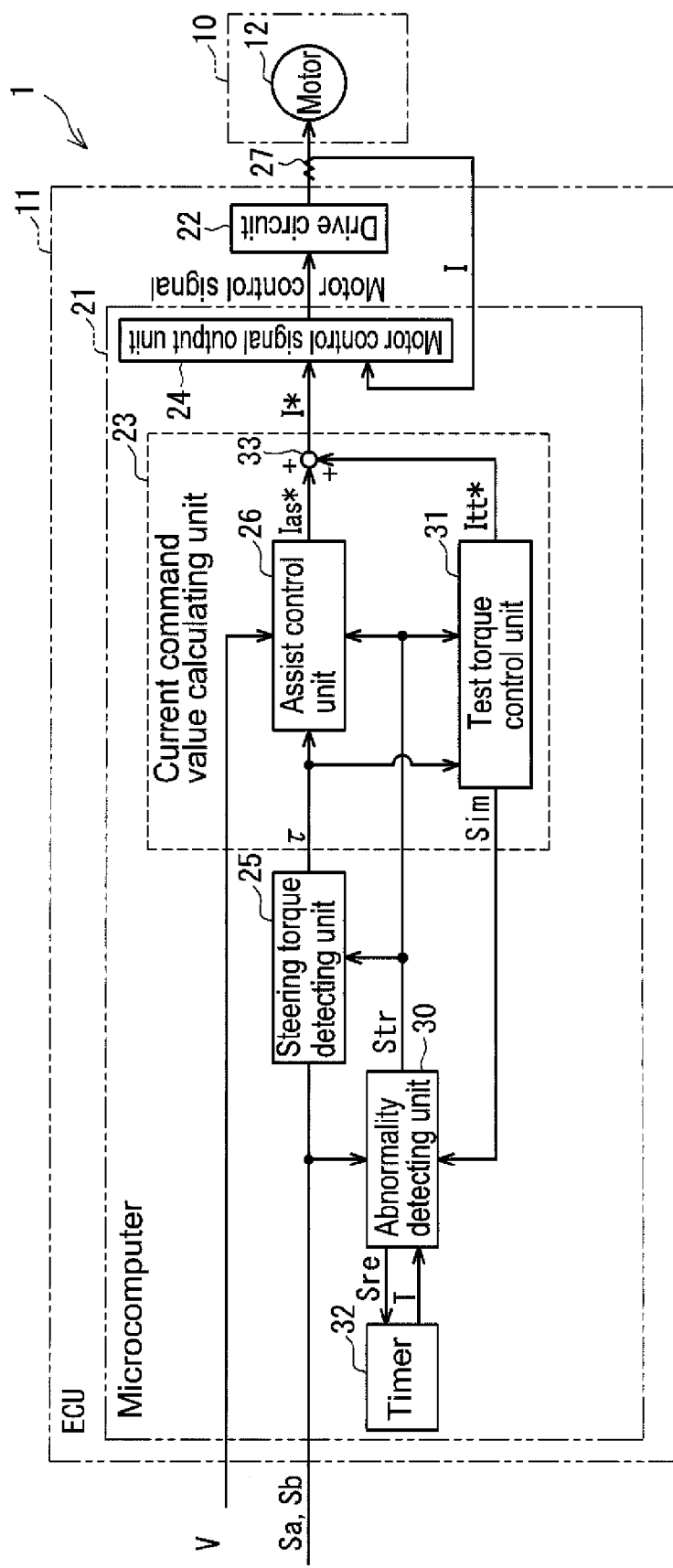
FIG. 46 is a control block diagram of the EPS according to an eighth embodiment.

As shown in FIG. 46, the test toque control unit 31 fetches the steering torque τ by the steering torque detecting unit 25.

Also in the present embodiment, the ECU 11 executes the power assist control in accordance with an abnormality occurrence mode of the torque sensor 14 detected by the abnormality detecting unit 30. That is, the ECU 11 executes the processes of Step 2001 to Step 2009 shown in FIG. 3. The ECU 11 executes the ordinary control when there is no abnormality in the sensor signals Sa, Sb, executes the assist stop control when both sensor elements 14a, 14b are out of order, and executes the assist continuation control when only one of the sensor elements 14a, 14b is out of order. By the assist stop control, a target assist force is gradually reduced. By the assist continuation control, instantaneous motor torque is applied to the steering system, in addition to the target assist force. By the ordinary power assist control, the target assist force is added to the steering system.

Also in the present embodiment, the abnormality detecting unit 30 executes detection of an abnormality in the residual sensor signal at the assist continuation control, based on the application signal Sim. That is, the abnormality detecting unit 30 executes the processes of Step 201 to Step 205 shown in FIG. 4, and detects presence or absence of an abnormality in the residual sensor signal. In the process of Step 205, when it is determined that the residual sensor signal is abnormal, the abnormality detecting unit 30 executes a determination process for determining whether a sensor element corresponding to the residual sensor signal is really out of order. That is, the abnormality detecting unit 30 executes the processes of Step 301 to Step 312 shown in FIG. 6, and determines presence or absence of failure in a sensor element corresponding to the residual sensor signal.

Further, in the present embodiment, the ECU 11, at the assist continuation control, periodically applies instantaneous motor torque to the steering system, in association with the application of the assist force as the original function of the EPS. Then, the ECU 11 executes detection of an abnormality in the residual sensor signal, based on whether torsion attributable to instantaneous motor torque is reflected in the residual sensor signal. The test torque control unit 31 in the present embodiment also periodically outputs the test torque control amount Itt* at the assist continuation control.

Figure 47:
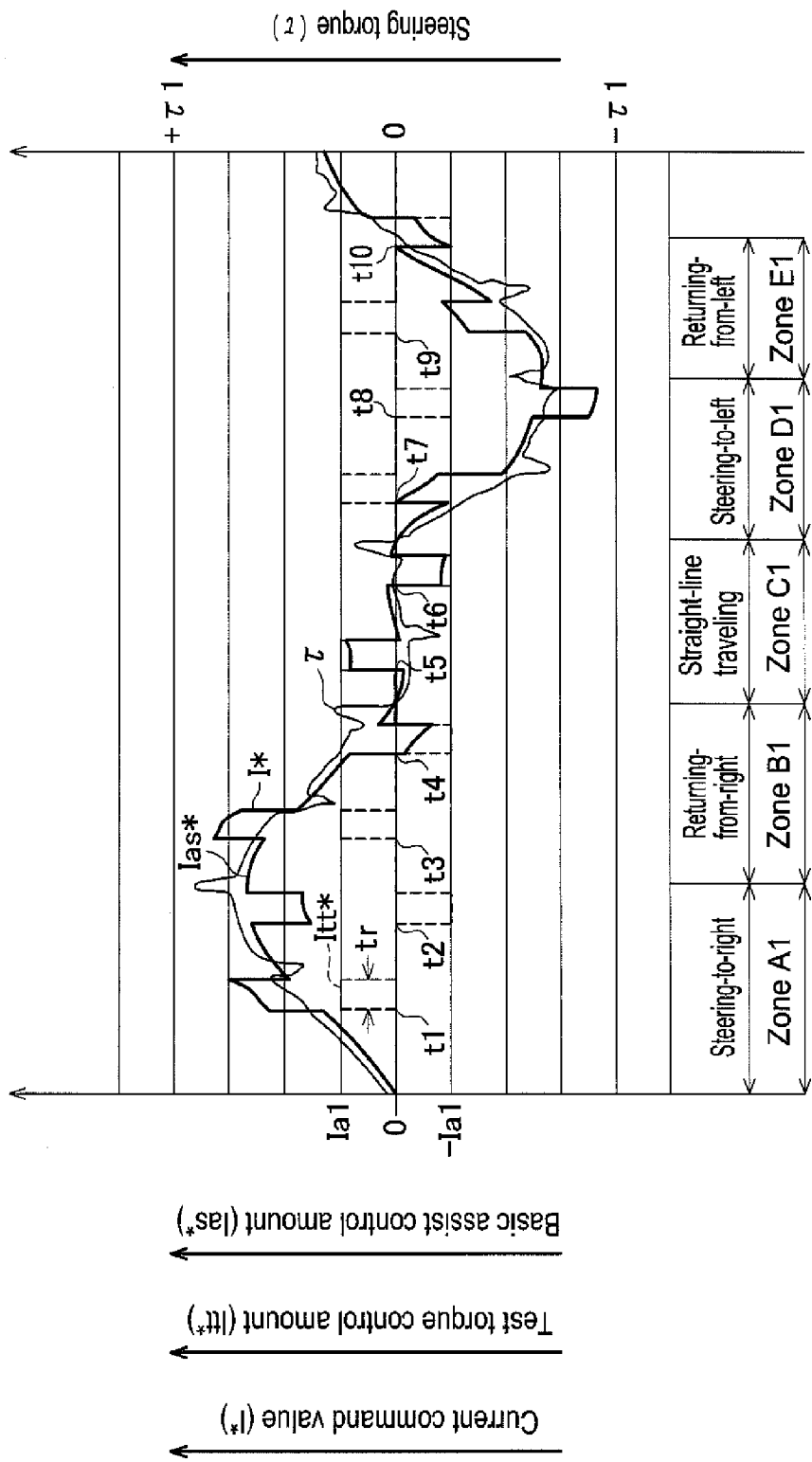
FIG. 47 is an explanatory diagram of a current command value, a basic assist control amount, a test torque control amount, and steering torque in the first hypothetical steering state of the vehicle.
Figure 48:
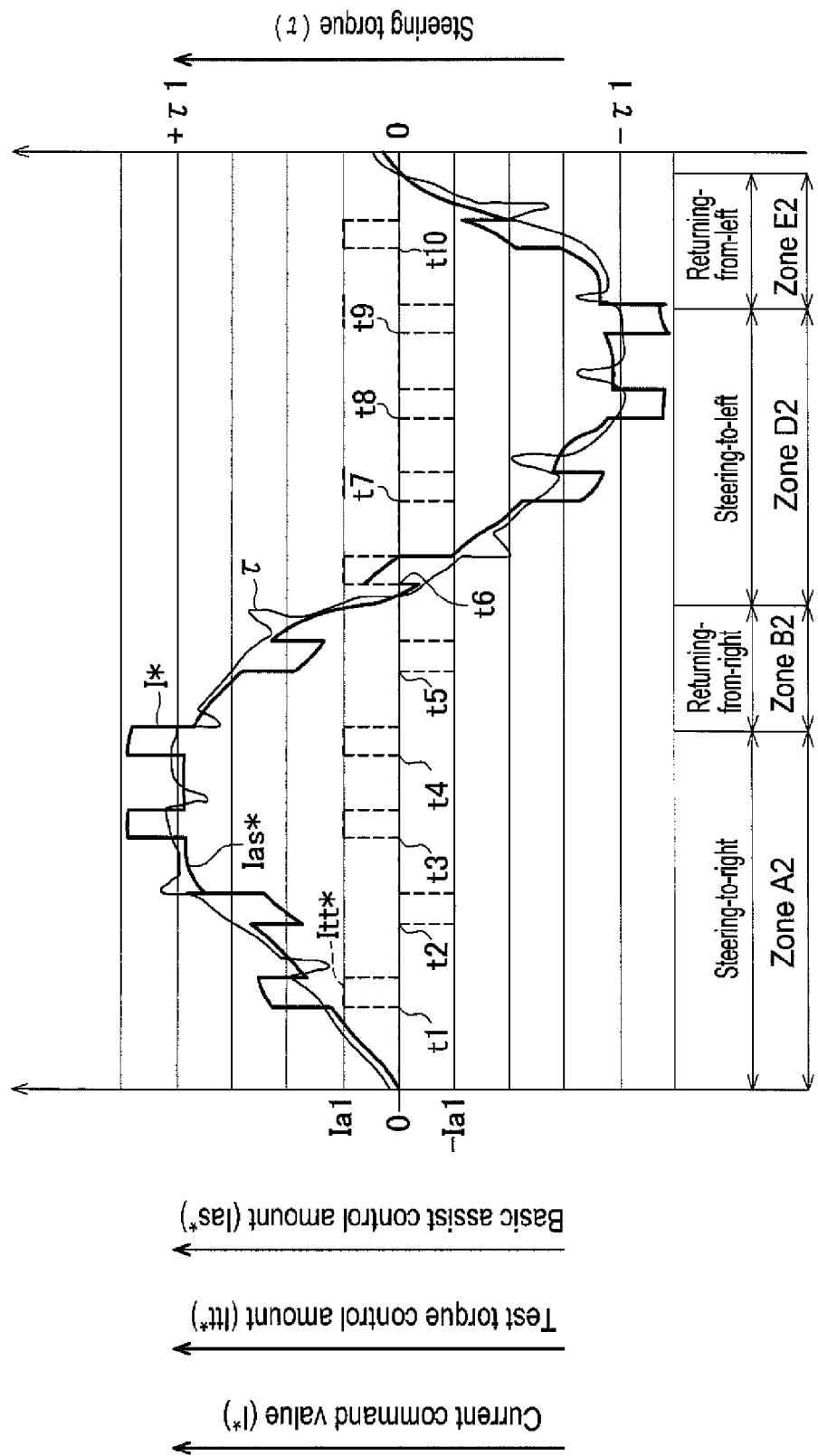
FIG. 48 is an explanatory diagram of a current command value, a basic assist control amount, a test torque control amount, and steering torque in the second hypothetical steering state of the vehicle.

First, a specific steering state of the vehicle shown in FIGS. 47 and 48 is assumed, and how instantaneous motor torque, that is, a test torque control amount, is output is described, based on the hypothetical steering state. Left vertical axes in FIGS. 47 to 48 express the current command value (I*), the basic assist control amount (Ias*), and the test torque control amount (Itt*), and right vertical axes express the steering torque (τ). The lateral axes are time axes.

A first steering state shown in FIG. 47 is divided into five zones of a steering-to-right (zone A1), a returning-from-right (zone B1), a straight-line traveling (zone C1), a steering-to-left (zone D1), and a returning-from-left (zone E1) of the steering wheel 2. The first steering state shown in FIG. 47 has a characteristic in that the absolute value of the steering torque τ expressed by a thin solid line is within a predetermined value τ1 (6 Nm, in the present embodiment) (|τ|≤τ1). The predetermined value τ1 is set based on a range (detectable range) of the torque sensor 14.

When the absolute value of the steering torque τ is within the predetermined value τ1 (|τ|≤τ1), as shown by a broken line in FIG. 47, the test torque control amount Itt* (time points t1 to t10 in FIG. 47) is alternately applied in positive and negative to the steering system, regardless of the sign of the basic assist control amount Ias*. The basic assist control amount Ias* and the test torque control amount Itt* are added together, and an added result is input to the motor control signal output unit 24 as the current command value I* expressed by a thick solid line. The steering torque τ occurs with a slight delay from the current command value I*.

A second steering state shown in FIG. 48 is divided into four zones of a steering-to-right (zone A2), a returning-from-right (zone B2), a steering-to-left (zone D2), and a returning-from-left (zone E2) of the steering wheel 2. The second steering state shown in FIG. 48 has a characteristic in that there is a case where the absolute value of the steering torque τ expressed by a thin solid line is greater than the predetermined value τ1 (|τ|>τ1).

When the absolute value of the steering torque τ is greater than the predetermined value τ1 (|τ|>τ1), the test torque control amount Itt* (time points t3, t4 and t8, t9 in FIG. 48) is applied to the steering system in the direction of the sign of the basic assist control amount Ias*. The basic assist control amount Ias* and the test torque control amount Itt* are added together, and an added result is input to the motor control signal output unit 24 as the current command value I* expressed by a thick solid line. The steering torque τ occurs with a slight delay from the current command value I*.

When the state (|τ|>τ1) in which the absolute value of the steering torque τ is greater than the predetermined value τ1 shifts to the state (|τ|≤τ1) in which the absolute value of the steering torque τ is within the predetermined value τ1, the test torque control amount Itt* (time points t5 and t10 in FIG. 48) is alternately applied in positive and negative to the steering system, regardless of the sign of the basic assist control amount Ias*.

Next, a method for outputting the test torque control amount Itt* is described in detail.

Figure 49:
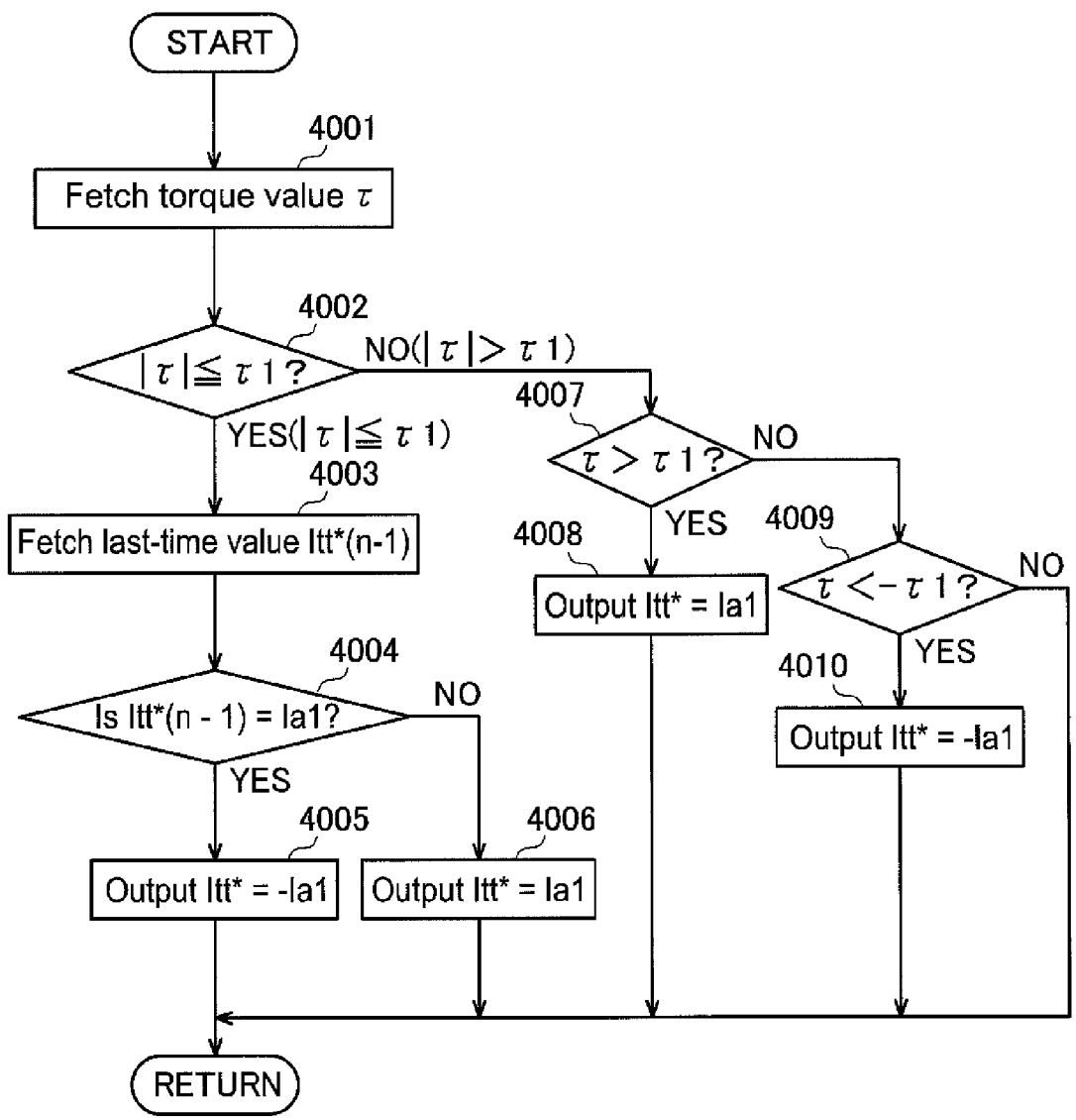
FIG. 49 is a flowchart showing a process of test torque control amount calculation.

As shown in FIG. 49, the test torque control unit 31 fetches the torque value τ (Step 4001), and determines whether the absolute value of the steering torque τ is less than or equal to the predetermined value τ1 (Step 4002). When the absolute value of the steering torque τ is less than or equal to the predetermined value τ1 (Step 4002: YES), the test torque control unit 31 fetches a last-time value Itt*(n−1) of the test torque control amount Itt* (Step 4003).

Next, the test torque control unit 31 determines whether the last-time value Itt*(n−1) of the test torque control amount Itt* is the first predetermined current value Ia1 (30 A, in the present embodiment) as a positive-side test torque control amount (Step 4004). When the last-time value Itt*(n−1) of the test torque control amount Itt* is the first predetermined current value Ia1 (Step 4004: YES), the test torque control unit 31 shifts the process to Step 4005.

At Step 4005, the test torque control unit 31 outputs the second predetermined current value −Ia1 as the test torque control amount Itt*, and ends the process. On the other hand, at Step 4004, when the last-time value Itt*(n−1) of the test torque control amount Itt* is not the first predetermined current value Ia1 (Step 4004: NO), the test torque control unit 31 outputs the first predetermined current value Ia1, which is a positive-side test torque control amount, as the test torque control amount Itt* (Step 4006), and ends the process.

At Step 4002, when the absolute value of the steering torque τ is greater than the predetermined value τ1 (Step 4002: NO), the test torque control unit 31 determines whether the steering torque τ is greater than the predetermined value τ1 (Step 4007). When the steering torque τ is greater than the predetermined value τ1 (τ>τ1, Step 4007: YES), the test torque control unit 31 outputs the first predetermined current value Ia1 as the test torque control amount Itt* (Step 4008), and ends the process.

At Step 4007, when the steering torque τ is less than the predetermined value τ1 (Step 4007: NO), the test torque control unit 31 determines whether the steering torque τ is less than the predetermined value −τ1 (Step 4009). When the steering torque τ is less than the predetermined value −τ1 (Step 4009: YES), the test torque control unit 31 outputs the second predetermined current value −Ia1 as the test torque control amount Itt* (Step 4010), and ends the process. At Step 4009, when the steering torque τ is greater than the predetermined value −τ1 (Step 4009: NO), the test torque control unit 31 ends the process.

According to the eighth embodiment, the following advantage is achieved.

(12) At the execution of the assist continuation control, when the absolute value of steering torque τ is less than or equal to a predetermined value, the microcomputer 21 controls the operation of the EPS actuator 10 so as to alternately apply positive and negative instantaneous motor torque to the steering system, regardless of application of an assist force. Accordingly, torsion is generated in the torsion bar 16 provided in the steering shaft 3, without requiring large steering torque. Further, when the absolute value of the steering torque τ is greater than the predetermined value, the microcomputer 21 controls the operation of the EPS actuator 10 so as to apply instantaneous motor torque to the steering system, in the application direction of the assist force. Accordingly, because the steering torque, which has become too large, is promptly reduced, an erroneous detection due to the excessive steering torque is prevented, and steering feeling improves. Then, the microcomputer 21 detects an abnormality in the residual sensor signal, based on whether application of instantaneous motor torque is reflected in the residual sensor signal that becomes a basis of the assist continuation control. According to the present configuration, an advantage similar to the advantage (1) of the first embodiment is achieved. Further, according to the eighth embodiment, an advantage similar to the advantage (2) of the first embodiment is also achieved.

Ninth Embodiment

Next, a ninth embodiment of the present invention is described. The present embodiment is mainly different from the eighth embodiment in the configuration of the assist control unit, and has a configuration basically similar to that in the eighth embodiment. Therefore, members and configurations that are the same as those in the eighth embodiment are given the same reference numerals, and explanation thereof is omitted.

Figure 50:
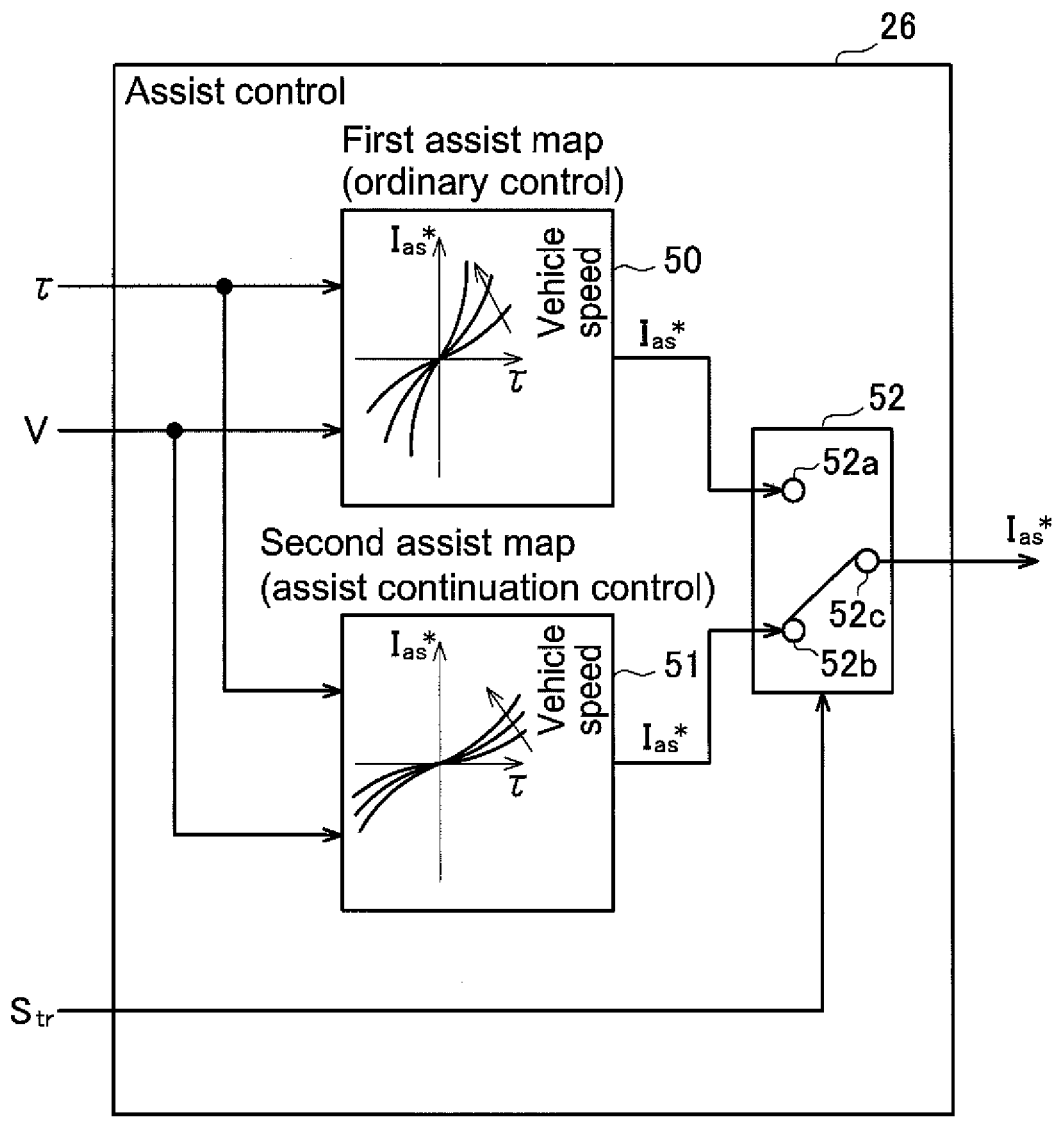
FIG. 50 is a control block diagram showing in detail an assist control unit according to a ninth embodiment.

As shown in FIG. 50, the assist control unit 26 has a first assist map 50 for ordinary control, a second assist map 51 for assist continuation control, and a basic assist control amount switching unit 52.

The first and second assist maps 50, 51 are vehicle speed responsive type three-dimensional maps for calculating the basic assist control amount Ias* based on the steering torque τ and the vehicle speed V. The first and second assist maps 50, 51 are used to calculate the basic assist control amount Ias* having a greater value (absolute value) such that a greater assist force is applied to the steering system, when the steering torque τ (absolute value) is greater or when the vehicle speed V is smaller. However, at the same steering torque τ (absolute value) and also at the same vehicle speed V, the basic assist control amount Ias* obtained by the first assist map 50 becomes greater than or equal to about two times the basic assist control amount Ias* obtained by the second assist map 51.

The basic assist control amount switching unit 52 either supplies the basic assist control amount Ias* obtained by using the first assist map 50 to the adder 33, or supplies the basic assist control amount Ias* obtained by using the second assist map 51 to the adder 33, based on the abnormality detection signal Str generated by the abnormality detecting unit 30 shown in FIG. 46. More specifically, when it is determined that both sensor elements 14a, 14b are determined (detected) as normal based on the abnormality detection signal Str, the basic assist control amount switching unit 52 connects a contact point 52c and a contact point 52a, and outputs the basic assist control amount Ias* obtained by the first assist map 50 to the adder 33. When it is determined that only one of the sensor elements 14a, 14b is out of order based on the abnormality detection signal Str, the basic assist control amount switching unit 52 connects the contact point 52c and a contact point 52b, and outputs the basic assist control amount Ias* obtained by the second assist map 51 to the adder 33.

Also in the present embodiment, the ECU 11 executes power assist control according to an abnormality occurrence mode of the torque sensor 14, according to the flowchart in FIG. 3, in a similar manner to that in the first embodiment. The abnormality detecting unit 30 determines presence or absence of failure in a sensor element, according to the flowcharts in FIGS. 4 and 6 in a similar manner to that in the first embodiment. Also in the present embodiment, at the execution of the assist continuation control, the ECU 11 periodically applies instantaneous motor torque to the steering system, in association with the application of the assist force as the original function of the EPS. The ECU 11 executes detection of an abnormality in the residual sensor signal, based on whether torsion attributable to instantaneous motor torque is reflected in the residual sensor signal. An output process of the test torque control amount is similar to that in the eighth embodiment.

According to the ninth embodiment, the following advantage is achieved in addition to the advantages (1), (2) of the first embodiment.

(13) The microcomputer 21 applies the assist force by reducing the assist force to a half or smaller by using a sensor signal that is output by the residual output element, after there remains only one output element in which failure is not detected. According to the present configuration, at the assist continuation control, the driver can promptly know failure in the torque sensor 14, because the steering torque that is greater than that at the ordinary control becomes necessary to steer the steering wheel 2. Further, a change in assist torque when the residual torque sensor becomes out of order is minimized. As a result, the driver can promptly know the failure in the torque sensor 14. Further, safe steering performance is achieved because rapid deterioration of steering feeling is prevented.

Tenth Embodiment

Next, a tenth embodiment of the present invention is described. The present embodiment is mainly different from the eighth embodiment in the configuration of the assist control unit, and has a configuration basically similar to that in the eighth embodiment. Therefore, members and configurations that are the same as those in the eighth embodiment are given the same reference numerals, and explanation thereof is omitted.

Figure 51:
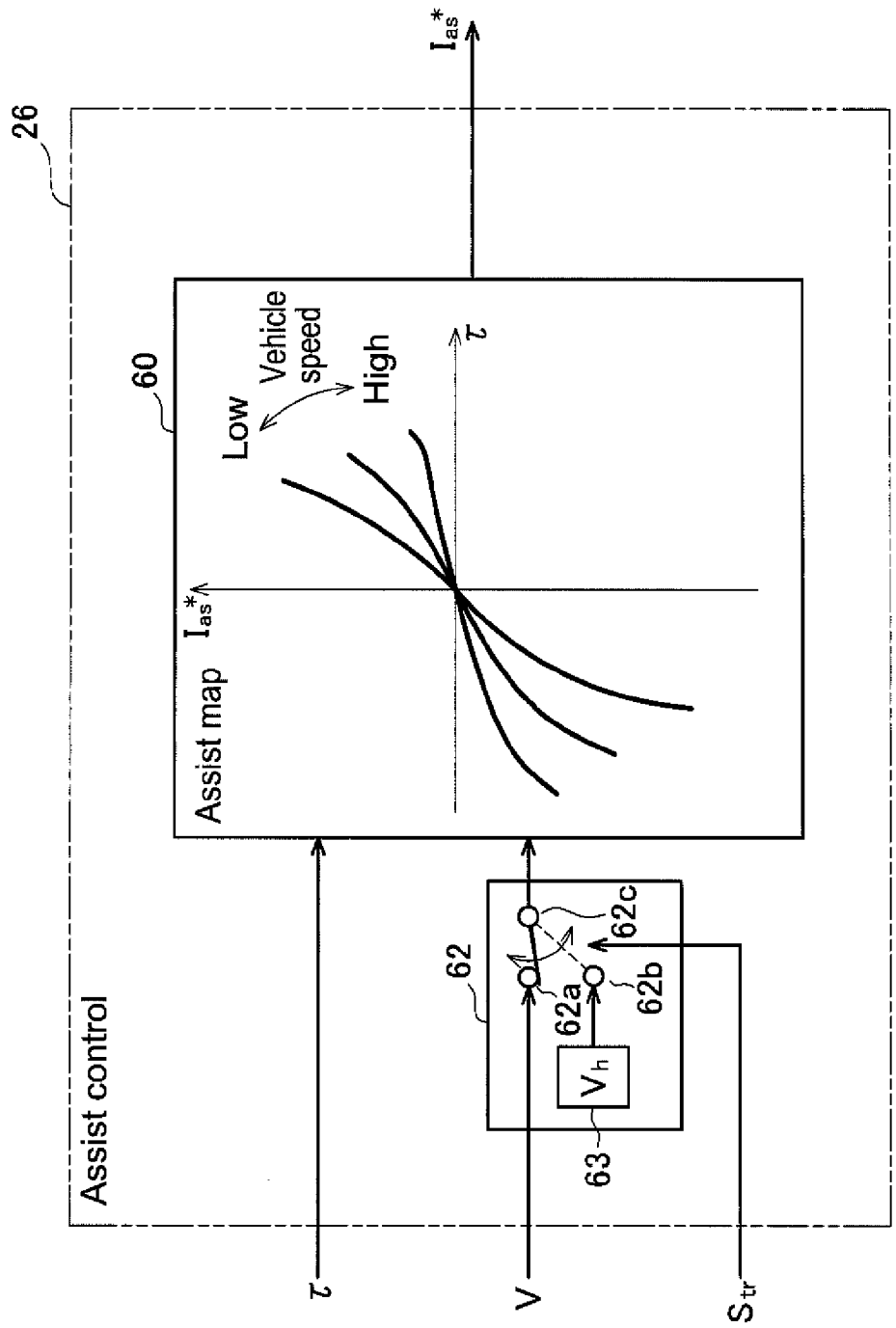
FIG. 51 is a control block diagram showing in detail an assist control unit according to a tenth embodiment.

As shown in FIG. 51, the assist control unit 26 has an assist map 60 and a vehicle speed amount switching unit 62. The assist map 60 is a vehicle speed responsive type three-dimensional map for calculating the basic assist control amount Ias* based on the steering torque $\tau$ and the vehicle speed V. The assist map 60 is used to calculate the basic assist control amount Ias* having a greater value (absolute value) such that a greater assist force is applied to the steering system, when the steering torque $\tau$ (absolute value) is greater or when the vehicle speed V is smaller.

The vehicle speed amount switching unit 62 supplies the vehicle speed amount V that is ordinarily input to the assist map 60, or supplies the high vehicle-speed amount Vh temporarily written in an EEPROM 63 to the assist map 60 based on the abnormality detection signal Str generated by the abnormality detecting unit 30 shown in FIG. 46.

More specifically, when it is determined that both sensor elements 14a, 14b are determined (detected) as normal based on the abnormality detection signal Str, the vehicle speed amount switching unit 62 connects a contact point 62c and a contact point 62a, and supplies the vehicle speed V that is output from the vehicle speed sensor to the assist map 60. When it is determined that only one of the sensor elements 14a, 14b is out of order based on the abnormality detection signal Str, the vehicle speed amount switching unit 62 connects the contact point 62c and a contact point 62b, and supplies the high vehicle-speed amount Vh temporarily written in the EEPROM 63 to the assist map 60.

According to the tenth embodiment, the following advantage is obtained in addition to the advantages (1), (2) of the first embodiment.

(14) The microcomputer 21 fixes the vehicle speed to a large value, after there remains only one output element in which failure is not detected. Then, the microcomputer 21 applies an assist force in accordance with the fixed vehicle speed, by using a sensor signal that is output by the residual output element. According to the present configuration, the assist force to be applied to the steering system at the assist continuation control is reduced as compared with an assist force applied at the ordinary control. Therefore, the driver can promptly know failure in the torque sensor 14, because the steering torque $\tau$ that is greater than that at the ordinary control becomes necessary to steer the steering wheel 2. Further, a change in assist torque when the residual torque sensor becomes out of order is minimized. As a result, the driver can promptly know the failure in the torque sensor 14. Further, safe steering performance is achieved because rapid deterioration of steering feeling is prevented.

Eleventh Embodiment

Next, an eleventh embodiment of the present invention is described. The present embodiment includes a configuration basically similar to that in the first embodiment. Therefore, members and configurations that are the same as those in the first embodiment are given the same reference numerals, and explanation thereof is omitted.

Also in the present embodiment, the ECU 11 executes the power assist control in accordance with an abnormality occurrence mode of the torque sensor 14 detected by the abnormality detecting unit 30, according to the flowchart in FIG. 3.

Also in the present embodiment, the assist continuation control is safely executed after only one sensor signal remains. Specifically, in association with the application of the assist force as the original function of the EPS, instantaneous motor torque is periodically applied to the steering system. Then, an abnormality in the residual sensor signal is detected based on whether torsion of the torsion bar 16 attributable to instantaneous motor torque is reflected in the residual sensor signal, as shown in FIG. 28.

In this case, the magnitude and directional relationship between the assist force and instantaneous motor torque sequentially changes based on the vehicle state and the steering state. Therefore, there is a risk of occurrence of a variation in a steering torque change amount $\Delta T$ based on instantaneous motor torque, depending on the vehicle state or the steering state, although it is desirable that the steering torque change amount $\Delta T$ be constant when the residual sensor element is normal. In this case, because detection of an abnormality in a sensor signal is also influenced, the following configuration is employed in the present embodiment.

The test torque control unit 31 generates a test torque control amount Itt* as a control component for applying instantaneous motor torque. The test torque control amount Itt* includes a positive (+) side test torque control amount Ittp* for applying instantaneous motor torque in a positive direction, and a negative (−) side test torque control amount Ittn* for applying instantaneous motor torque in a negative direction. The test torque control unit 31 also functions as a torque deviation calculating means that measures a change amount $\Delta T(n+1)$ of the steering torque $\tau$. Further, the test torque control unit 31 also functions as a variable function means for changing the test torque control amount Itt* such that the change amount $\Delta T(n+1)$ of the steering torque $\tau$ in a steering torque change amount measuring time trr becomes a constant value, at the application of instantaneous motor torque based on the test torque control amount Itt*. By setting the change amount $\Delta T(n+1)$ of the steering torque $\tau$ to a constant value, steering feeling with no uncomfortable feeling is given to the driver. Then, the current command value calculating unit 23 generates the current command value I*, by adding the test torque control amount Itt* to the basic assist control amount Ias* that is generated by the assist control unit 26.

Next, a calculation procedure of the change amount ΔT(n+1) of the steering torque τ is described.

Figure 52:
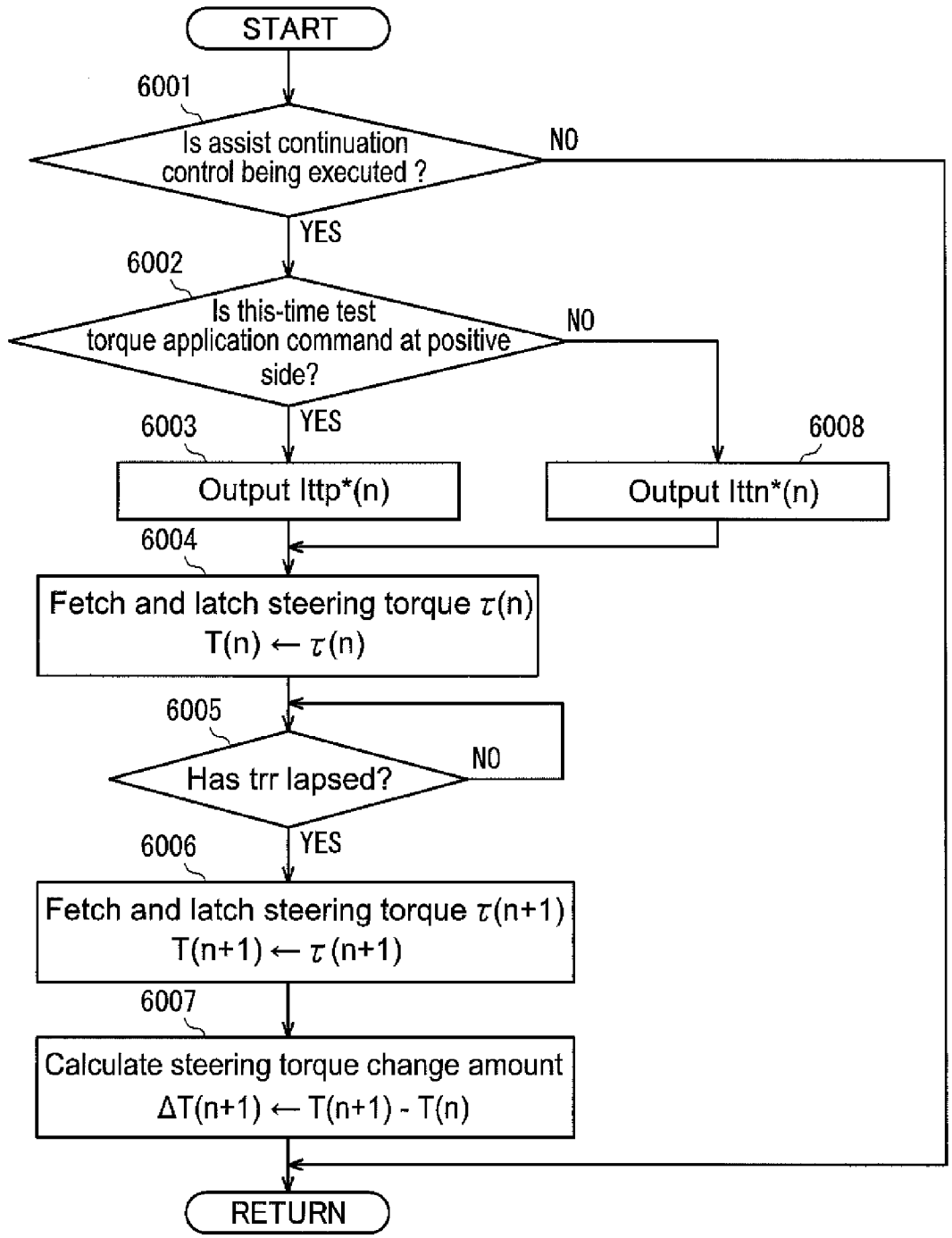
FIG. 52 is a flowchart showing a process of calculation of a torque deviation according to an eleventh embodiment.

As shown in FIG. 52, the test torque control unit 31 determines whether the assist continuation control is being executed (Step 6001). When the assist continuation control is being executed (Step 6001: YES), the test torque control unit 31 determines whether a this-time test torque application command is at a positive (+) side (Step 6002). When the this-time test torque application command is at the positive (+) side (Step 6002: YES), the test torque control unit 31 outputs a test torque control amount Ittp*(n) at the positive (+) side to the adder shown in FIG. 2 (Step 6003).

The test torque control unit 31 shifts the process to Step 6004. At Step 6004, the test torque control unit 31 fetches a steering torque τ(n) at a time point of output of the positive side (+) test torque control amount Ittp*(n), that is, the steering torque τ(n) before instantaneous motor torque is reflected in the residual sensor, and latches the taken-in steering torque (n) (T(n)=τ(n)).

Next, the test torque control unit 31 determines whether the time of a confirmation timer (not shown) is up, that is, whether the steering torque change amount measuring time trr lapsed from a time point of output of the test torque control amount (Step 6005). The confirmation timer is provided as a function of the test torque control unit 31. The confirmation timer starts at a time point of output of a test torque control amount, and time is up at a time point of lapse of the steering torque change amount measuring time trr from this time point.

When the time of the confirmation timer is up (Step 6005: YES), the test torque control unit 31 shifts the process to Step 6006. At Step 6006, the test torque control unit 31 fetches the steering torque τ(n+1) that is generated by the current command value I* obtained by adding the test torque control amount Ittp*(n) to the basic assist control amount Ias*, and latches the taken-in steering torque τ(n+1) (T(n+1)=τ(n+1)). When the time of the confirmation timer is not up (Step 6005: NO), the test torque control unit 31 waits until when time is up.

Next, the test torque control unit 31 shifts the process to Step 6007. At Step 6007, the control torque control unit 31 calculates a difference between the steering torque T(n) and the steering torque T(n+1), that is, a steering torque change amount ΔT(n+1) in the steering torque change amount measuring time trr based on the following equation, and ends the process.

$$\Delta T(n+1)=T(n+1)-T(n)$$

When the test torque application command is at the negative (−) side (Step 6002: NO), the test torque control unit 31 outputs a negative (−) side test torque control amount Ittn*(n) to the adder 33 (Step 6008). Thereafter, the test torque control unit 31 shifts the process to Step 6004, Step 6005, Step 6006, Step 6007, and ends the process.

Next, a procedure of a change process of a test torque control amount is described.

Figure 53:
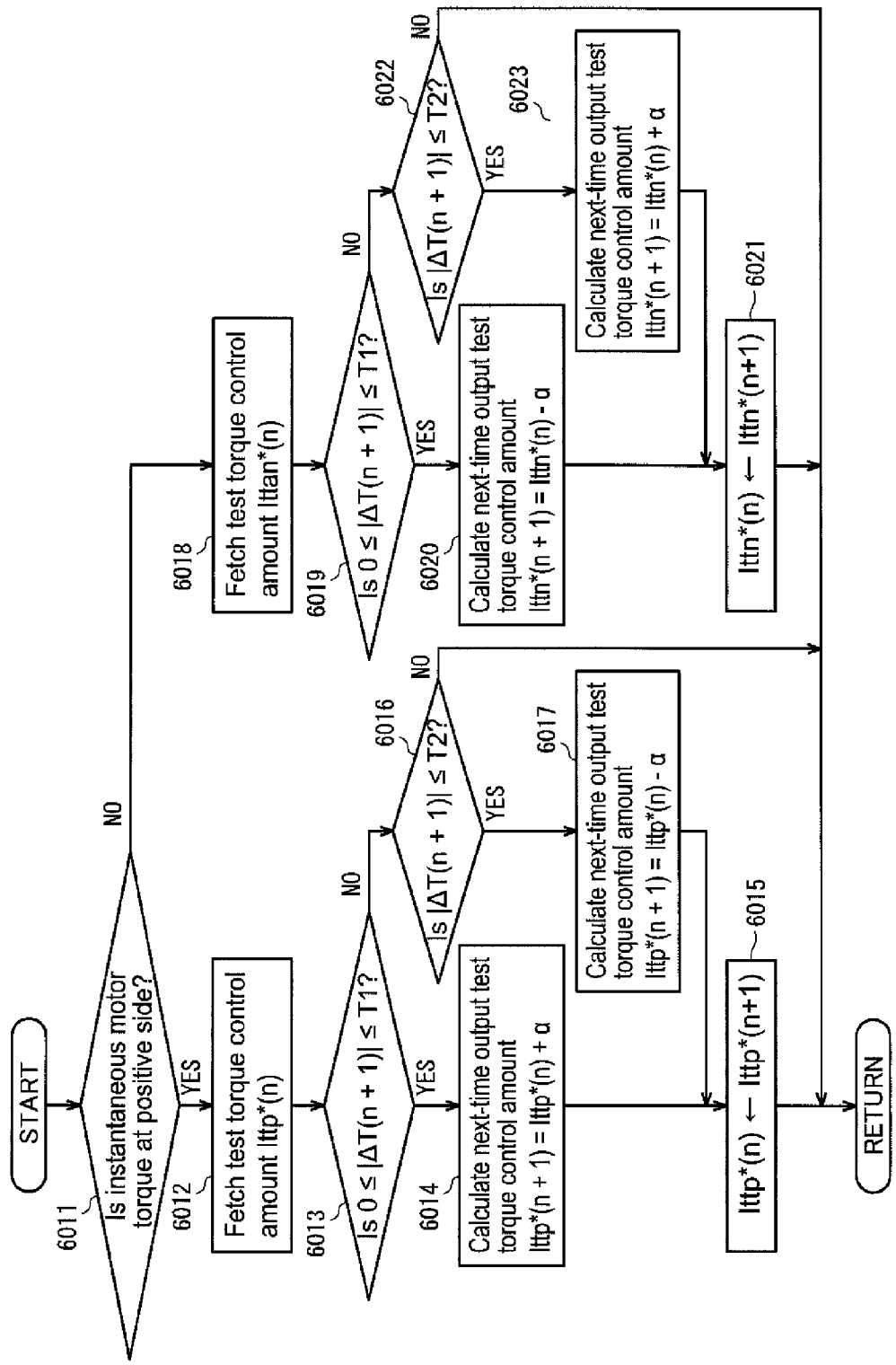
FIG. 53 is a flowchart showing a process of a variable function that outputs instantaneous motor torque.

As shown in FIG. 53, the test torque control unit 31 determines whether instantaneous motor torque is at a positive side (positive (+) side) (Step 6011). Then, when the instantaneous motor torque is at the positive (+) side, (Step 6011: YES), the test torque control unit 31 fetches a test torque control amount Ittp*(n) (Step 6012).

Next, the test torque control unit 31 determines whether the absolute value of the steering torque change amount ΔT(n+1) is greater than or equal to zero and also less than or equal to a predetermined torque value T1 (0≤|ΔT(n+1)|≤T1) (Step 6013). The predetermined torque value T1 is set to 0.5 Nm in the present embodiment.

When the absolute value of the steering torque change amount ΔT(n+1) is greater than or equal to zero and also less than or equal to the predetermined torque value T1 (Step 6013: YES), the test torque control unit 31 calculates a test torque control amount Ittp*(n+1) for the next output, based on the following equation (Step 6014). In the present embodiment, a correction current value α is set 1 A.

$$Ittp^*(n+1)=Ittp^*(n)+\alpha$$

The test torque control unit 31 sets the next-time output test torque control amount Ittp*(n+1) as the test torque control amount Ittp*(n) for this-time output (Step 6015), and ends the process.

When the absolute value of the steering torque change amount ΔT(n+1) is not greater than or equal to zero and not less than or equal to the predetermined torque value T1 (Step 6013: NO), the test torque control unit 31 determines whether the absolute value of the steering torque change amount ΔT(n+1) is greater than or equal to a predetermined torque value T2 (|ΔT(n+1)|≥T2) (Step 6016). In the present embodiment, the predetermined torque value T2 is set to 1 Nm.

When the absolute value of the steering torque change amount ΔT(n+1) is greater than or equal to the predetermined torque value T2 (Step 6016: YES), the test torque control unit 31 calculates the next-time output test torque control amount Ittp*(n+1) based on the following equation (Step 6017).

$$Ittp^*(n+1)=Ittp^*(n)-\alpha$$

Then, the test torque control unit 31 shifts the process to Step 6015, sets the next-time output test torque control amount Ittp*(n+1) as the this-time output test torque control amount Ittp*(n), and ends the process. When the absolute value of the steering torque change amount ΔT(n+1) is not greater than or equal to the predetermined torque value T2 (Step 6016: NO), the test torque control unit 31 ends the process without executing any process. At Step 6011, when the instantaneous motor torque is not at the positive (+) side, (Step 6011: NO), the test torque control unit 31 fetches a negative-side test torque control amount Ittn*(n) (Step 6018).

Next, the test torque control unit 31 determines whether the absolute value of the steering torque change amount ΔT(n+1) is greater than or equal to zero and also less than or equal to the predetermined torque value T1 (0≤|ΔT(n+1)|≤T1) (Step 6019). When the absolute value of the steering torque change amount ΔT(n+1) is greater than or equal to zero and also less than or equal to the predetermined torque value T1 (Step 6019: YES), the test torque control unit 31 calculates the next-time output test torque control amount Ittn*(n+1) based on the following equation (Step 6020).

$$Ittn^*(n+1)=Ittn^*(n)-\alpha$$

Then, the test torque control unit 31 sets the next-time output test torque control amount Ittn*(n+1) as the this-time output test torque control amount Ittn*(n) (Step 6021), and ends the process. At Step 6019, when the absolute value of the steering torque change amount ΔT(n+1) is not greater than or equal to zero and not less than or equal to the predetermined torque value T1 (Step 6019: NO), the test torque control unit 31 determines whether the absolute value of the steering torque change amount ΔT(n+1) is greater than or equal to the predetermined torque value T2 (|ΔT(n+1)|≥T2) (Step 6022). When the absolute value of the steering torque change amount ΔT(n+1) is greater than or equal to the predetermined torque value T2 (Step 6022: YES), the test torque control unit 31 calculates the next-time output test torque control amount Ittn*(n+1) based on the following equation (Step 6023).

$$Ittn^*(n+1)=Ittn^*(n)+\alpha$$

Next, the test torque control unit 31 shifts the process to Step 6021, sets the next-time output test torque control amount Ittn*(n+1) as the this-time output test torque control amount Ittn*(n), and ends the process. At Step 6022, when the absolute value of the steering torque change amount ΔT(n+1) is not greater than or equal to the predetermined torque value τ2 (Step 6022: NO), the test torque control unit 31 ends the process without executing any process.

Further, the test torque control unit 31 generates the test torque application signal Sim, which indicates that instantaneous motor torque based on the test torque control amount Itt* is applied, at each time of outputting the test torque control amount Itt*. Then, the abnormality detecting unit 30 determines failure in the residual sensor element at the assist continuation control, based on the test torque application signal Sim. That is, the abnormality detecting unit 30 executes the processes shown in FIGS. 4 and 6, and determines presence or absence of failure in a sensor element corresponding to the residual sensor signal.

According to the eleventh embodiment, the following advantages are achieved.

(15) The microcomputer 21 applies instantaneous motor torque to the steering system, regardless of the application of an assist force, at the execution of the assist continuation control. At this time, the microcomputer 21 calculates a steering torque change amount ΔT, which is the deviation between the steering torque before the application of instantaneous motor torque is reflected in a sensor signal and the steering torque after the application is reflected. Then, the microcomputer 21 changes the magnitude of the test torque control amount Itt* to be output at the next time based on the magnitude of the calculated steering torque change amount ΔT. Specifically, the microcomputer 21 adjusts the magnitude of the test torque control amount Itt* such that the magnitude of the absolute value of the steering torque change amount ΔT becomes greater than or equal to T1 and also less than or equal to T2 (T1≤|ΔT(n+1)|≤T2).

According to the present configuration, the magnitude of the steering torque change amount ΔT based on instantaneous motor torque is adjusted to substantially constant regardless of the vehicle state or the steering state. Therefore, it is possible to avoid a risk accompanying application of instantaneous motor torque of a constant magnitude, that is, erroneous detection of a sensor signal that occurs due to a sequential change in the magnitude and directional relationship between the assist force and instantaneous motor torque based on the vehicle state and the steering state.

(16) The microcomputer 21 changes the magnitude of instantaneous motor torque based on the application direction of instantaneous motor torque and based on the magnitude of a change amount of steering torque due to instantaneous motor torque. According to the present configuration, instantaneous motor torque of an optimum magnitude for maintaining a substantially constant magnitude of the steering torque change amount is applied. As a result, application of an assist force is more stably continued by suppressing the occurrence of an erroneous determination.

The eleventh embodiment may be modified as follows.

In the eleventh embodiment, although fixed values are set as the correction current value α used for the variable function means, the predetermined torque value T1, and the predetermined torque value T2, these values may be changed in accordance with the vehicle speed, the yaw rate, and the lateral G.

In the eleventh embodiment, although the steering torque τ(n) at a time point of output of the test torque control amount Itt* is fetched and latched, it may be arranged as follows. That is, the steering torque τ(n) may be sampled at several points, and an average value of the steering torque τ(n) may be latched, instead of taking a sample value at only one point. Further, a motor rotation angle may be used, instead of the steering torque τ(n).

Twelfth Embodiment

Next, a twelfth embodiment of the present invention is described. The present embodiment includes a configuration basically similar to that in the first embodiment. Therefore, members and configurations that are the same as those in the first embodiment are given the same reference numerals, and explanation thereof is omitted.

Also in the present embodiment, the ECU 11 executes the power assist control in accordance an abnormality occurrence mode of the torque sensor 14 detected by the abnormality detecting unit 30, according to the flowchart in FIG. 3.

Figure 56A:
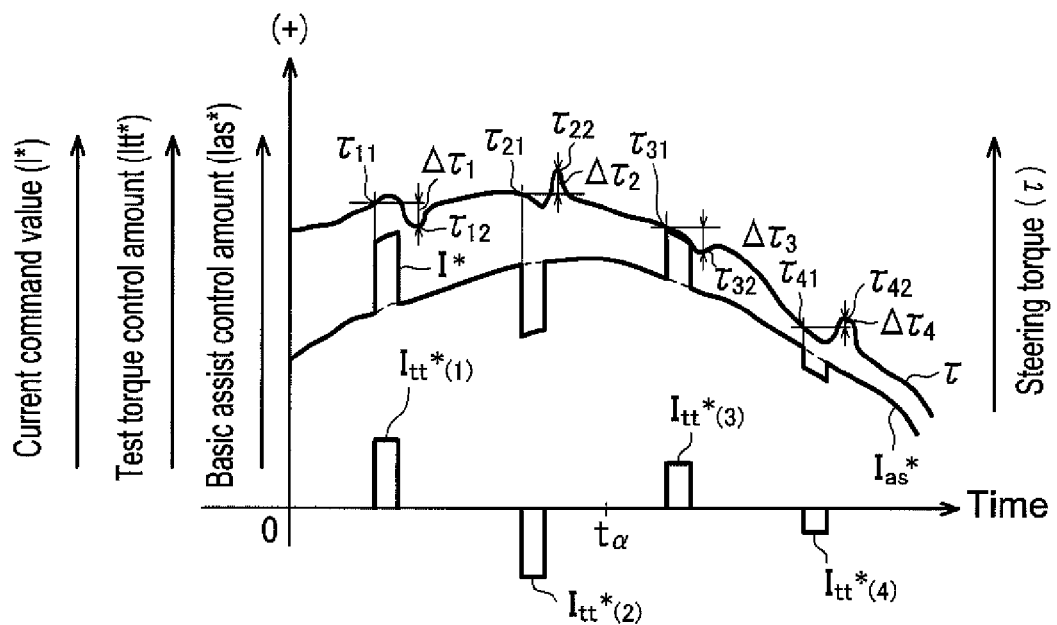
FIG. 56(a) is an explanatory diagram of a current command value, a basic assist control amount, a test torque control amount, and steering torque.
Figure 56B:
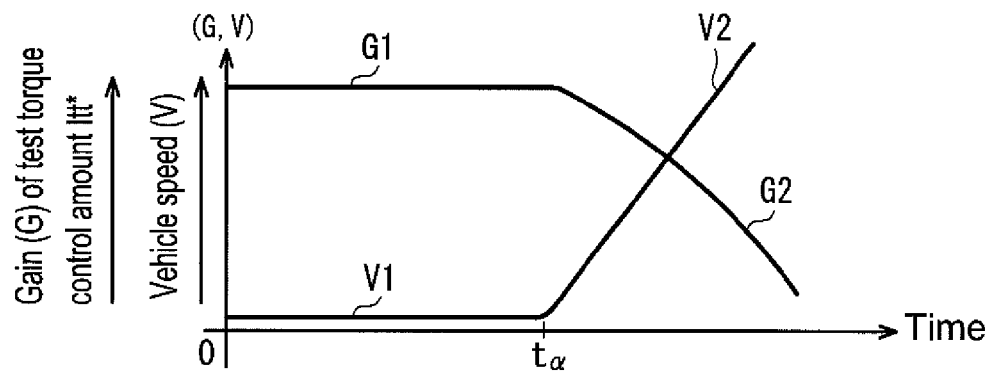
FIG. 56(b) is an explanatory diagram showing changes over time of a vehicle speed and a gain of a test torque control amount, in a certain hypothetical steering state of the vehicle.

Also in the present embodiment, the assist continuation control is safely executed after only one sensor signal remains. Specifically, in association with the application of the assist force as the original function of the EPS, instantaneous motor torque is periodically applied to the steering system. Then, an abnormality in the residual sensor signal is detected based on whether torsion of the torsion bar 16 attributable to instantaneous motor torque is reflected in the residual sensor signal, as shown in FIGS. 28 and 56(*a*).

The torsion bar 16 has a characteristic in that a coefficient of elasticity increases as torsion becomes greater. Therefore, when instantaneous motor torque is applied in a state in which the torsion bar 16 is greatly twisted, torsion generated in the torsion bar 16 is smaller than torsion generated when instantaneous motor torque is applied in a state in which large torsion is not generated in the torsion bar 16. In the first embodiment, the magnitude of periodically-applied instantaneous motor torque is constant. However, when instantaneous motor torque is applied in a state in which an assist force applied to the steering system is small and large torsion is not generated in the torsion bar 16. That is, in a state in which a coefficient of elasticity of the torsion bar 16 is small, a change amount of steering torque by application of instantaneous motor torque may become excessively large. On the other hand, when instantaneous motor torque is applied in a state in which an assist force applied to the steering system is large and large torsion is generated in the torsion bar 16, that is, in a state in which the coefficient of elasticity of the torsion bar 16 is large, a change amount of steering torque by application of instantaneous motor torque may become excessively small. Therefore, the torque sensor 14 may be erroneously detected to be abnormal although the sensor signal that is output by the residual output element (sensor element) is normal, and steering feeling may be degraded by erroneous detection. Accordingly, in the present embodiment, the following configuration is employed.

Figure 54:
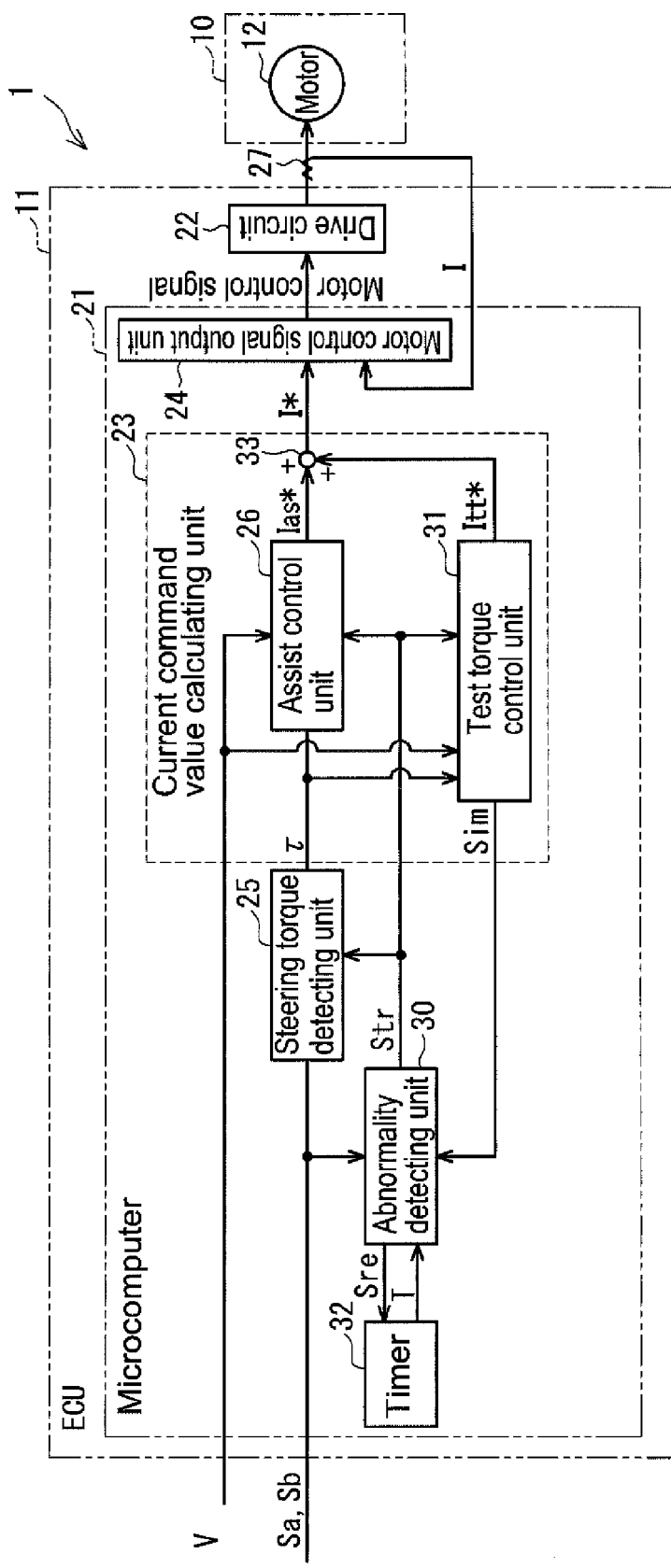
FIG. 54 is a control block diagram of the EPS according to a twelfth embodiment.

As shown in FIG. 54, the vehicle speed V is input to the test torque control unit 31 in the present embodiment, unlike in the first embodiment. Further, as shown in FIG. 55, the test torque control unit 31 has a test torque control amount generating unit 80. The vehicle speed V, the abnormality detection signal Str, and an output command signal that indicates the direction of the test torque control amount Itt* are input to the test torque control amount generating unit 80.

The test torque control amount generating unit 80 has a gain determination map 81 of the test torque control amount Itt*, a temporary storage EEPROM 82, and first and second multipliers 84, 86. The gain determination map 81 prescribes a relationship between the vehicle speed V and the gain G. The gain G is set to be gradually reduced when the vehicle speed V becomes a higher speed from a low speed. The temporary storage EEPROM 82 stores information that indicates the height (h) of the test torque control amount Itt*, that is, the magnitude (prescribed value) of the test torque control amount Itt*.

The first multiplier 84 multiplies the gain G obtained by the gain determination map 81 and the height (h) of the test torque control amount Itt* stored in the temporary storage EEPROM 82, and outputs a product. The second multiplier 84 multiplies an output (G*h) of the first multiplier 84, the abnormality detection signal Str, and a test torque control amount output command signal, and generates the test torque control amount Itt*. The test torque control amount Itt* is supplied to the adder 33 shown in FIG. 54.

As described above, the microcomputer 21 periodically applies the test torque control amount Itt* that has a vehicle running state (vehicle V) to the steering system, at the assist continuation control. The abnormality detecting unit 30 of the present embodiment also determines presence or absence of failure in a sensor element, according to the flowcharts in FIGS. 4 and 6, in a similar manner to that in the first embodiment.

Next, a method for outputting the test torque control amount Itt* is described based on a hypothetical steering state of the vehicle shown in FIGS. 56(*a*) and 56(*b*).

FIG. 56(*a*) is an explanatory diagram showing a current command value (I*), a basic assist control amount (Ias*), a test torque control amount (Itt*), and steering torque (τ), in a certain hypothetical steering state of the vehicle. In FIG. 56(*a*), a left vertical axis expresses the current command value (I*), the basic assist control amount (Ias*), and the test torque control amount (Itt*), and a right vertical axis expresses the steering torque (τ). The horizontal axis is a time axis.

In FIG. 56(*a*), four pulse-shaped signals are test torque control amounts Itt*(1) to Itt*(4). A lower-side curve in FIG. 56(*a*) expresses the basic assist control amount (Ias*). The current command value (I*) is an addition of the basic assist control amount (Ias*) and the test torque control amounts Itt*(1) to Itt*(4). An upper-side curve in FIG. 56(*a*) expresses the steering torque (τ), and Δτ expresses a change amount of the steering torque τ when the test torque control amount (Itt*) is added.

FIG. 56(*b*) shows changes of the vehicle speed V with time in FIG. 56(*a*), and changes of the gain G corresponding to the changes of the vehicle speed V. As shown in FIG. 56(*b*), in the present embodiment, it is assumed that the vehicle speed V is maintained at a constant low vehicle speed (straight line V1) until time tα and that the vehicle speed V gradually increases (straight line V2) after the time tα. On the other hand, the gain G of the test torque control amount Itt* is maintained as a high gain as shown by a straight line G1 until time tα, and gradually reduces as shown by a curved line G2 after the time tα.

As shown in FIG. 56(*a*), the test torque control amounts Itt*(1), Itt*(2) are substantially in the same values. This is because the vehicle speed V at time (before the time tα) of output of the test torque control amounts Itt*(1), Itt*(2) is maintained at the constant low vehicle speed and because the gain G becomes in substantially the same value.

On the other hand, the test torque control amounts Itt*(3), Itt*(4) become smaller than those of the test torque control amounts Itt*(1), Itt*(2). This is because the gain G reduces in response to an increase of the vehicle speed V at the output time (after the time tα) of the test torque control amounts Itt*(3), Itt*(4) from the vehicle speed V at the output time (before the time tα) of the test torque control amounts Itt*(1), Itt*(2). Further, because the vehicle speed V at the output time of the test torque control amount Itt*(4) is greater than the vehicle speed V at the output time of the test torque control amount Itt*(3), the gain G accordingly becomes smaller, and the test torque control amount Itt*(4) accordingly becomes less than the test torque control amount Itt*(3).

In the power assist control, when the detected steering torque τ is the same, an assist force applied to the steering system when the vehicle speed is small is greater than an assist force applied to the steering system when the vehicle speed is large. Since a greater assist force is applied to the steering system, torsion generated in the torsion bar 16 when the vehicle speed is small is greater than torsion generated in the torsion bar 16 when the vehicle speed is large. Further, in a state in which large torsion is generated in the torsion bar 16, that is, in a state in which the coefficient of elasticity of the torsion bar 16 is large, a change amount of the steering torque by application of instantaneous motor torque becomes less than a change amount in a state in which large torsion is not generated in the torsion bar 16, that is, in a state in which the coefficient of elasticity of the torsion bar 16 is small. That is, when vehicle speeds are different, a variation occurs in a change amount of steering torque by application of instantaneous motor torque.

On the other hand, the test torque control amount generating unit 80 in the present embodiment changes the magnitude of the test torque control amount Itt* based on the gain G that gradually reduces as the vehicle speed V becomes a higher speed from a low speed, and sets substantially constant the torsion of the torsion bar 16 at the application of instantaneous motor torque. As shown in FIG. 56(*a*), the test torque control amount Itt*(4) when the vehicle speed is large is set less than the test torque control amounts Itt*(1), Itt*(2), Itt* (3) when the vehicle speed is small. However, a change amount Δτ4 of steering torque by application of instantaneous motor torque becomes substantially the same values of change amounts Δτ1, Δτ2, Δτ3 of other steering torque.

According to the twelfth embodiment, the following advantage is achieved in addition to the advantages (2), (4) of the first embodiment.

(17) The microcomputer 21 controls the operation of the EPS actuator 10 so as to alternately apply positive and negative instantaneous motor torque to the steering system regardless of application of an assist force, at the execution of the assist continuation control. At this time, the microcomputer 21 changes the application amount of instantaneous motor torque by using a gain that gradually reduces when the vehicle speed becomes higher. Then, the microcomputer 21 detects an abnormality in the residual sensor signal, based on whether application of instantaneous motor torque is reflected in the residual sensor signal that becomes a basis of the assist continuation control.

According to the present configuration, the application amount of instantaneous motor torque is changed in accordance with a change in the vehicle speed. When the vehicle speed is low, the torsion bar 16 is greatly twisted by the assist force, because the assist force applied to the steering system is large. In this state, the torsion bar 16 is not easily twisted by application of instantaneous motor torque, because the coefficient elasticity of the torsion bar 16 is relatively large. Then, the microcomputer 21 increases torsion of the torsion bar 16 by applying instantaneous motor torque greater than that of a high speed time. On the other hand, when the vehicle speed is high, torsion of the torsion bar 16 by the assist force is small, because the assist force applied to the steering system is small. In this state, the torsion bar 16 is easily twisted by application of instantaneous motor torque, because the coefficient of elasticity of the torsion bar 16 is relatively small. Then, the microcomputer 21 reduces torsion of the torsion bar 16 by applying instantaneous motor torque less than that of a high speed time. Accordingly, torsion of the torsion bar 16 by application of instantaneous motor torque can be set constant. Erroneous detection (erroneous determination) of determining that a rotation sensor is abnormal even when the torque sensor 14 is normal and degradation of steering feeling is prevented, because torsion of the torsion bar 16 becomes constant. As a result, application of assist force is more stably continued.

The twelfth embodiment may be modified as follows.

Figure 57:
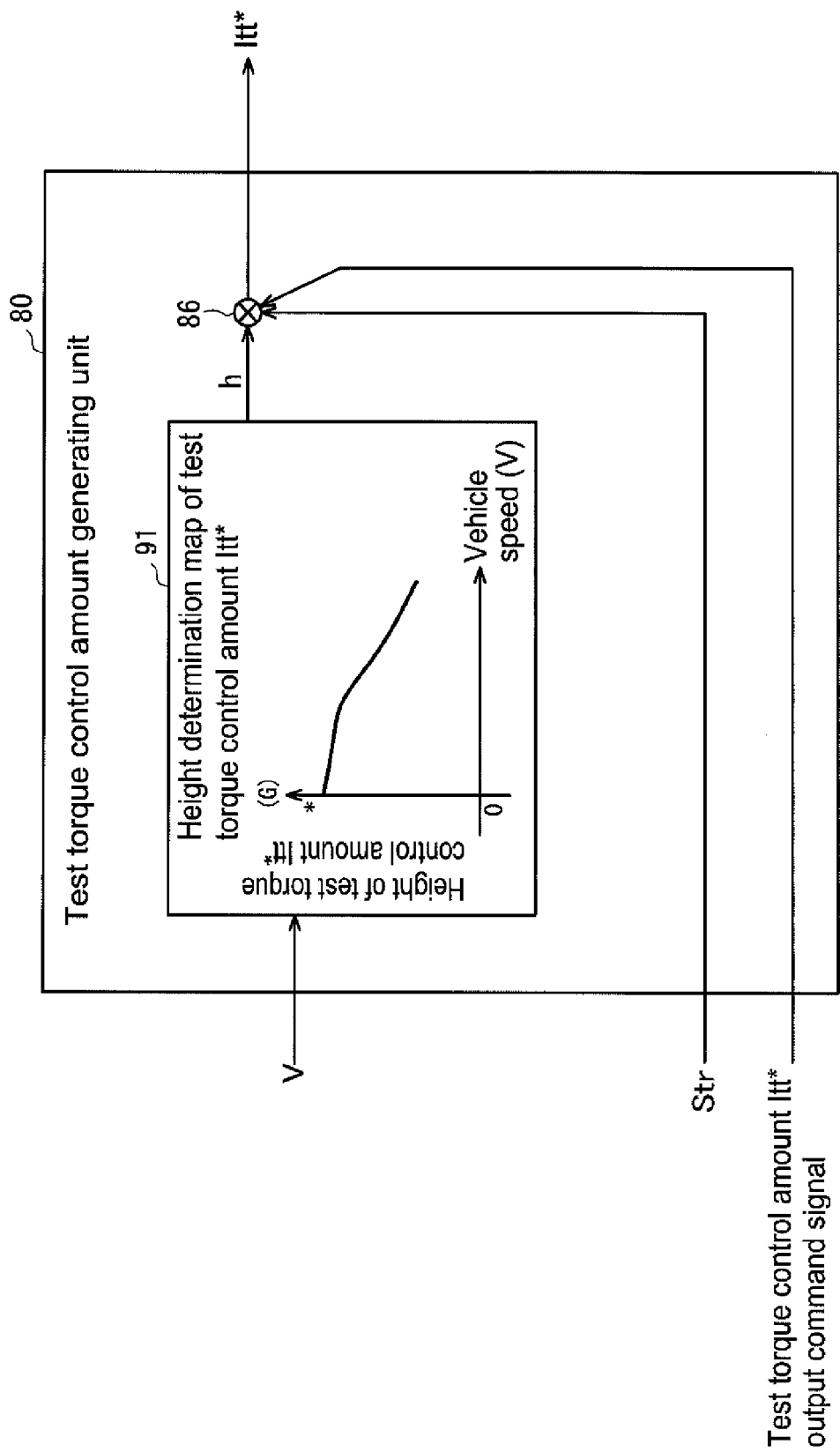
FIG. 57 is a map for determining a test torque control amount of a test torque control amount generating unit according to a modification of the twelfth embodiment.

In the twelfth embodiment, the test torque control amount generating unit 80 determines the gain G according to the vehicle speed V based on the gain determination map 81, and generates the test torque control amount Itt* by multiplying the determined gain G to the height h of the test torque control amount Itt*. However, the operation is not limited to this. As shown in FIG. 57, the test torque control amount generating unit 80 can include a height determination map 91 of the test torque control amount Itt* that corresponds to the gain determination map 81, the temporary storage EEPROM 82, and the first multiplier 84 of the twelfth embodiment. The height determination map 91 prescribes a relationship between the vehicle speed V and the height of the test torque control amount Itt*, and the height of the test torque control amount Itt* is set to be gradually reduced when the vehicle speed V becomes a higher speed from a low speed. Accordingly, advantages similar to those of the twelfth embodiment are achieved.

Figure 58:
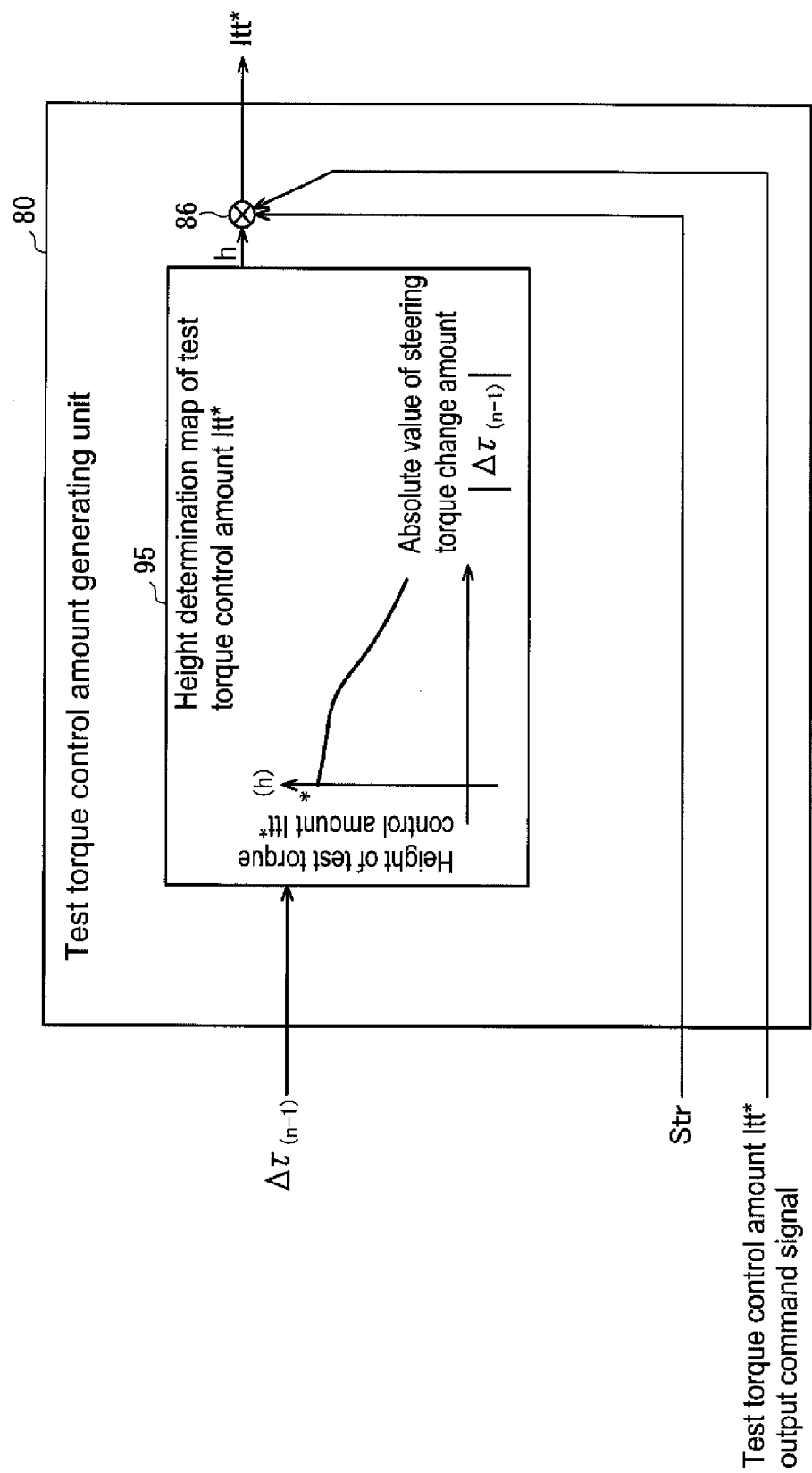
FIG. 58 is a map for determining a test torque control amount of the test torque control amount generating unit.

In the twelfth embodiment, the test torque control amount generating unit 80 changes the magnitude of the test torque control amount Itt* in accordance with the vehicle speed V such that the change amount $\Delta\tau$ of steering torque by instantaneous motor torque becomes constant. However, the operation is not limited to this. As shown in FIG. 58, the test torque control amount generating unit 80 can change the magnitude of the test torque control amount Itt* in accordance with a change amount $\Delta\tau(n-1)$ of the steering torque in the last-time calculation cycle. Specifically, the test torque control amount generating unit 80 has a height determination map 95 in which the height h of the test torque control amount Itt* is gradually reduced when the absolute value ($|\Delta T(n-1)|$) of a change amount of steering torque in the last-time calculation cycle becomes in a greater value from a small value. When the absolute value $|\Delta\tau(n-1)|$ of a change amount of steering torque in the last-time calculation cycle is large, the test torque control amount generating unit 80 determines, based on the height determination map 95, the height h of a small test torque control amount Itt* such that instantaneous motor torque applied this time becomes small. On the other hand, when the absolute value $|\Delta\tau(n-1)|$ of a change amount of steering torque in the last-time calculation cycle is small, the test torque control amount generating unit 80 determines the height h of a large test torque control amount Itt* such that instantaneous motor torque applied this time becomes large. Accordingly, the change amount $\Delta\tau$ of steering torque by instantaneous motor torque is held substantially constant.

Figure 59:
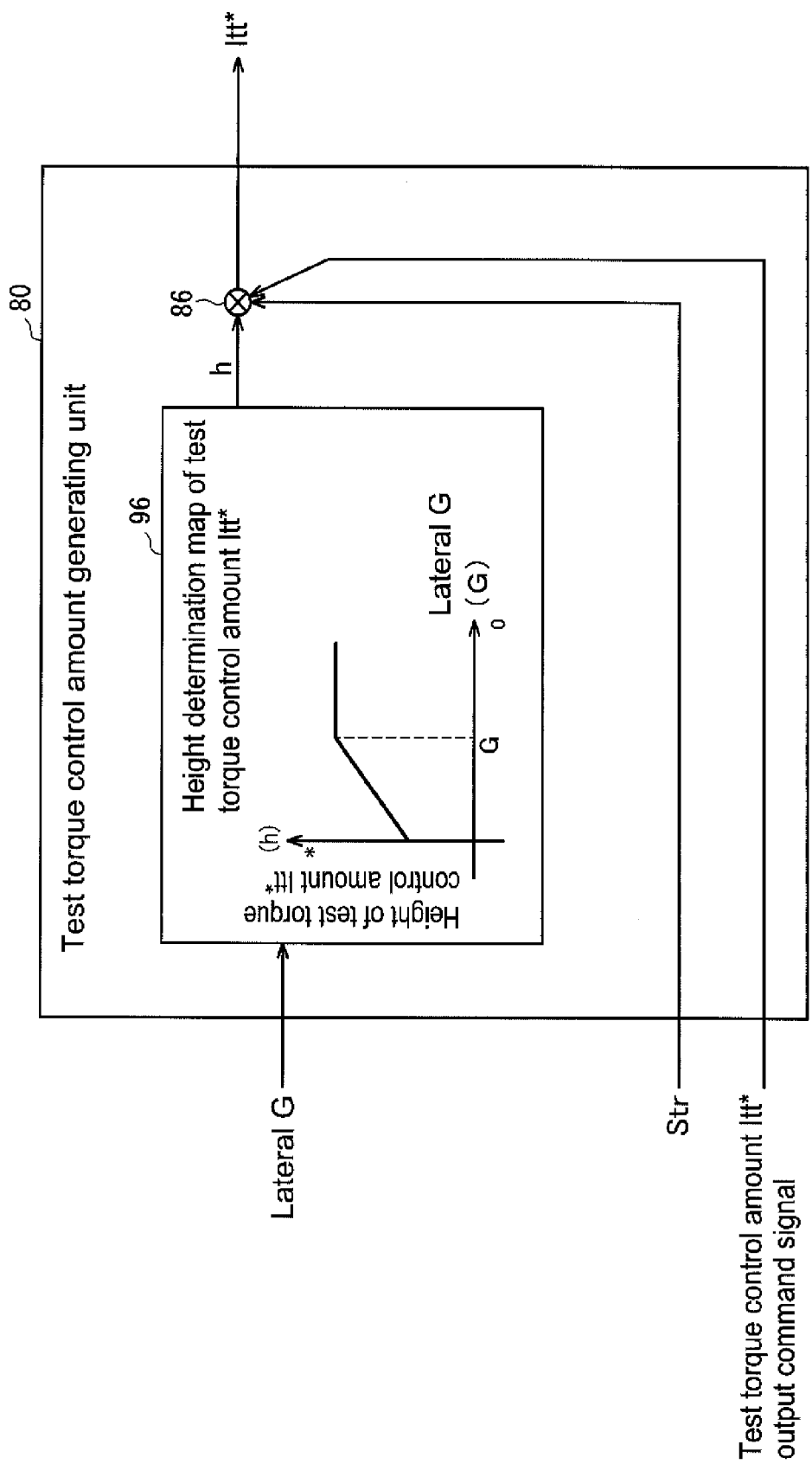
FIG. 59 is a map for determining a test torque control amount of the test torque control amount generating unit.

As shown in FIG. 59, the test torque control amount generating unit 80 can change the magnitude of the test torque control amount Itt* in accordance with lateral direction acceleration (hereinafter, also "lateral G"), which acts on the vehicle. Specifically, the test torque control amount generating unit 80 has a height determination map 96 in which the height h of the test torque control amount Itt* gradually increases as the lateral G, which acts on the vehicle, becomes a greater value from a small value. In general, as the lateral G, which acts on the vehicle, becomes greater, reactive force that is input from a road surface to the steering system becomes larger. Therefore, as the lateral G becomes greater, the driver steers by applying greater steering torque to the steering wheel 2. When the steering torque applied to the steering wheel 2 becomes large, large torsion occurs in the torsion bar 16.

By taking these factors into account, when the lateral G, which acts on the vehicle, is large, the test torque control amount generating unit 80 determines that large torsion has already occurred in the torsion bar 16 and that the vehicle is in a state in which further torsion by instantaneous motor torque does not easily occur. Then, the test torque control amount generating unit 80 determines the height h of a relatively large test torque control amount Itt*, based on the height determination map 96. On the other hand, when the lateral G, which acts on the vehicle, is small, the test torque control amount generating unit 80 determines that large torsion is not generated in the torsion bar 16 and that the vehicle is in a state in which further torsion by application of instantaneous motor torque easily occurs. Then, the test torque control amount generating unit 80 determines the height h of a relatively small test torque control amount Itt*, based on the height determination map 96. Accordingly, the change amount $\Delta\tau$ of steering torque by instantaneous motor torque is held substantially constant, and advantages similar to those of the twelfth embodiment are achieved.

In the above, the test torque control amount generating unit 80 changes the magnitude of the test torque control amount Itt* in accordance with any one of vehicle state quantities of the vehicle speed V, the change amount $\Delta\tau$ of steering torque, and the lateral direction acceleration. However, the change in the magnitude is not limited to this. For example, the test torque control amount generating unit 80 may change the magnitude of the test torque control amount Itt* based on other vehicle state quantity such as steering speed and yaw rate. Further, the magnitude of the test torque control amount Itt* may be changed based on multiple vehicle state quantities, not based on only one vehicle state quantity.

In the above, the test torque control amount generating unit 80 changes the height h of the test torque control amount Itt* in accordance with a change in a vehicle state quantity such as the vehicle V. However, the change is not limited to this. For example, the test torque control amount generating unit 80 can change the output time tr of the test torque control amount Itt*, in accordance with a change in a vehicle state quantity such as the vehicle V. The test torque control amount generating unit 80 can also change both of the height h and the output time tr of the test torque control amount Itt*, in accordance with a change in a vehicle state quantity such as the vehicle V. In this case, advantages similar to those of the above embodiments are achieved.

Further, each embodiment may be modified as follows.

In the first to third embodiments, the application direction of instantaneous motor torque is alternately changed. However, the application direction does not need to be changed. Further, the application cycle of instantaneous motor torque is not necessarily required to be changed. Also in this case, an abnormality in the residual sensor signal is promptly detected by monitoring a change in the residual sensor signal. It is more preferable to employ a configuration of suitably changing the application direction and the application cycle of instantaneous motor torque, like in the first to third embodiments.

In the fourth to seventh embodiments, whether the vehicle is in the straight-line traveling state is determined, by setting a predetermined steering angle range to near the neutral position of the steering sensor 17. However, a configuration is not limited to this configuration. In place of the steering sensor 17, the current sensor 27 may be used. Further, whether the vehicle is in the straight-line traveling state may be determined, by setting a predetermined current-value range near the neutral position to a current sensor detectable range.

In the fourth to seventh embodiments, when the FLG generated by the assist control amount determining unit 28 is 0, application of instantaneous motor torque is stopped. However, the configuration is not limited to this. For example, when the FLG generated by the assist control amount determining unit 28 is 0, instantaneous motor torque may be applied by changing a value of the test torque control amount Itt* as a basic component for generating instantaneous motor torque to a current value (magnitude of about ⅓, for example) less than the first predetermined current value Ia1 or the second predetermined current value −Ia1. This allows the driver to recognize that a failure diagnosis of the torque sensor is being continuously executed.

Figure 16:
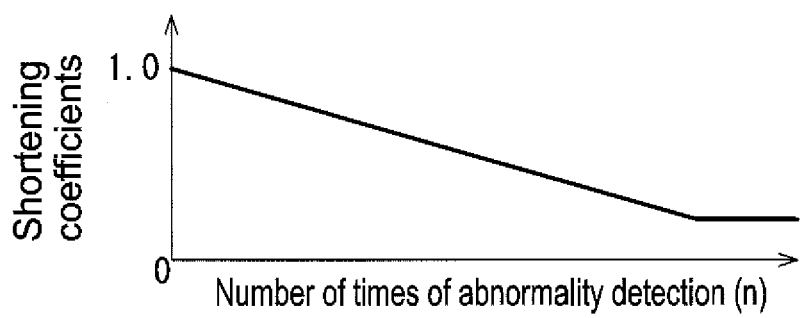
FIG. 16 is a graph showing a manner for changing an application cycle in accordance with number of times of detecting an abnormality in a residual sensor signal according to a modification of the first to seventh embodiments.

In the first to seventh embodiments, the application cycle of instantaneous motor torque is set short, during a period of executing a failure determination about a sensor element corresponding to the residual sensor signal. However, the application cycle is not limited to this. As shown in FIG. 16, the application cycle of instantaneous motor torque may be changed in accordance with the number of times of abnormality detection n in the residual sensor signal. According to the present configuration, the application cycle of instantaneous motor torque is more properly shortened in accordance with the degree of possibility of occurrence of failure in the output element. Further, a failure determination about a sensor element corresponding to the residual sensor signal is executed more promptly and in higher precision while ensuring satisfactory steering feeling at the execution of the assist continuation control.

In this case, after normality of a sensor element is confirmed by the failure determination, whether the application cycle should be recovered to the basic cycle (the output cycle f1 shown in FIG. 5 or FIG. 29) or should be kept shortened can be selected based on which one of satisfactory steering feeling and prompt failure detection is considered to be important.

In the first to twelfth embodiments, although the present invention is embodied into detection of an abnormality in the torque sensor 14 that outputs two series of the sensor signals Sa, Sb, the present invention is not limited to this embodiment. The present invention may be also applied to detection of an abnormality in the torque sensor that outputs three or more series of sensor signals. That is, the present invention may be applied to a case where three or more output elements of sensor signals are included, and application of an assist force is continued by using a sensor signal output by the residual output element after there remains only one output element in which failure is not detected.

Further, the present invention may be applied to detection of an abnormality in a torque sensor of the EPS that detects steering torque by using one of sensor signals. That is, detection of an abnormality based on application of instantaneous motor torque and reflection in a sensor signal in the first to twelfth embodiments is not necessarily limited to provisional control (assist continuation control) after an abnormality in the torque sensor is detected, and may be executed at the ordinary control. Accordingly, higher reliability is ensured.

In the first to twelfth embodiments, a hall IC is employed as a magnetism detecting element that constitutes a sensor element. However, an MR sensor may be employed, and the present invention may be applied to detection of an abnormality in other than a magnetic torque sensor.

In the first to twelfth embodiments, although application of instantaneous motor torque to the steering system is executed periodically, configuration is not limited to this application. Instantaneous motor torque may be applied at random. Then, an abnormality in the residual sensor signal may be detected, based on whether instantaneous motor torque applied at random is reflected in the residual sensor signal.

In the first to twelfth embodiments, failure in a sensor element corresponding to the residual sensor signal is confirmed when an abnormality in the residual sensor signal is detected at or more than the threshold number of times n0 within the threshold time T0 (failure detection predetermined time). However, the threshold time T0 does not necessarily need to be time limit. Further, failure in a sensor element corresponding to the residual sensor signal may be confirmed by detection of an abnormality at one time. As in the first to twelfth embodiments, it is more preferable to employ a configuration in which failure in a sensor element corresponding to the residual sensor signal is confirmed by detecting an abnormality in the residual sensor signals at multiple times, and in which a limit time is set to determination of failure in the sensor element.

In the first to twelfth embodiments, although a direct-current motor with brushes is employed as the motor 12 as a drive force of the EPS actuator 10, a brushless motor or an induction motor may be employed. Particularly, when changing the application cycle of instantaneous motor torque in accordance with a steering speed like in the first to tenth embodiments, it is preferable to use a rotation sensor of a brushless motor for detecting a steering speed.

In the first to twelfth embodiments, although the present invention is embodied into what is called a column type EPS 1, the present invention may be applied to a pinion type or rack assist type EPS.

The first to twelfth embodiments and the above other embodiments may be implemented by suitably combining them together. For example, the eleventh or twelfth embodiment may be combined with the eighth, ninth, or tenth embodiment. Further, the sixth or seventh embodiment may be combined with these combinations.

In the first to twelfth embodiments, detection of an abnormality in the torque sensor 14 of a power steering device is described. However, the present invention may be applied to detection of an abnormality in a torque sensor that is provided in a detection device of engine torque and other devices such as various FA (Factory Automation) machines, for example. As the FA machine, there are industrial robots and automatic assembling machines. In this case, a situation is created in which a timing change and a direction change of a sensor signal can be naturally forecast by applying instantaneous motor torque to a detection item of the torque sensor. In this situation, by monitoring a change in a sensor signal, an abnormality is detected promptly, at a stage before the sensor signal indicates a clearly abnormal value.

In the first to twelfth embodiments, detection of an abnormality in the torque sensor 14 is described. However, an abnormality in a rotation sensor that detects rotation of a rotation body such as a shaft can be also detected, based on a technical idea similar to that of each embodiment. Further, number of rotation sensors (sensor elements) such as a hall IC may be single or two or more. For example, when the eighth embodiment is applied to detection of an abnormality in the rotation sensor that detects a rotation angle of a motor in general, the steering torque τ in each process of the flowchart in FIG. 49 is replaced with a rotation angle (θ) of the motor. In this case, a pulse-shaped current (current in accordance with the test torque control amount Itt*) is supplied to the motor, in accordance with the rotation angle of the motor. Then, presence of an abnormality in the rotation sensor is determined, depending on whether the rotation angle obtained based on a sensor signal generated by one of the rotation sensors changes in accordance with the direction of the pulse-shaped current.

In the first to twelfth embodiments, the two sensor elements 14*a*, 14*b* of the torque sensor 14 may be regarded as rotation sensors that detect a torsion angle of the torsion bar 16. That is, the sensor signals Sa, Sb may be regarded as first and second rotation angle signals that indicate a torsion angle of the torsion bar 16. Then, presence or absence of an abnormality in each sensor element may be determined, based on whether each rotation angle signal changes in accordance with the direction of the pulse-shaped current, when the pulse-shaped current (current in accordance with the test torque control amount Itt*) is supplied to the motor 12.

Further, an abnormality in a position detection device (sensor element) that detects a position of a detection item that is linearly displaced can be also detected, based on a technical idea similar to that of each embodiment. That is, a control device of the position detection device supplies a pulse-shaped drive signal (instantaneous control amount) to the drive source (such as a motor) to be detected, and determines presence or absence of an abnormality in the sensor element, based on whether a sensor signal generated in one of the sensor elements changes in accordance with a positive or negative direction of the pulse-shaped drive signal. Also in this case, number of sensor elements may be single or two or more.

The invention claimed is:

1. An electric power steering device comprising:
   a steering force assist device that applies an assist force to a steering system by using a motor as a drive source;
   a rotation body that constitutes a part of the motor or the steering system and rotates as the motor rotates;
   a rotation sensor that outputs a sensor signal based on rotation of the rotation body;
   a control means that controls operation of the steering force assist device to generate the assist force based on the sensor signal; and
   an abnormality detecting means that detects an abnormality in the sensor signal, wherein
   the control means controls the operation of the steering force assist device to apply an instantaneous motor torque, regardless of the assist force, to the steering system, and
   the abnormality detecting means determines that the sensor signal is abnormal if the applied instantaneous motor torque is not reflected in the sensor signal.

2. The electric power steering device according to claim 1, wherein the control means alternately applies positive and negative instantaneous motor torque to the steering system.

3. The electric power steering device according to claim 1, wherein
   the rotation sensor is a torque sensor that outputs a sensor signal based on torsion of a torsion bar, which serves as the rotation body provided in the middle of a steering shaft,
   the electric power steering device comprises a torque detecting means that detects steering torque based on the sensor signal, and
   the control means controls the operation of the steering force assist device such that
   when the absolute value of steering torque detected by the torque detecting means is less than or equal to a predetermined value, positive and negative instantaneous motor torque is alternately applied to the steering system regardless of the direction of the sign of the basic assist control amount as a basic component of the assist force that is calculated based on the steering torque, and when the absolute value of steering torque detected by the torque detecting means is greater than a predetermined value, instantaneous motor torque is applied to the steering system in the direction of the sign of the basic assist control amount.

4. The electric power steering device according to claim 1, wherein the control means
   calculates a change amount between values based on a sensor signal before and after the application of instantaneous motor torque is reflected in the sensor signal, and
   changes the magnitude of instantaneous motor torque based on the magnitude of the change amount.

5. The electric power steering device according to claim 4, wherein the control means gradually reduces the magnitude of instantaneous motor torque to be applied, as the absolute value of the change amount becomes greater.

6. The electric power steering device according to claim 4, wherein
   when the absolute value of the change amount is within a first basic value, the control means increases, by a predetermined amount, the magnitude of instantaneous motor torque to be applied subsequently, and
   when the absolute value of the change amount is equal to or greater than a second basic value, which is greater than the first basic value, the control means decreases, by a predetermined amount, the magnitude of instantaneous motor torque to be applied subsequently.

7. The electric power steering device according to claim 1, wherein
   the rotation sensor has a plurality of output elements that output the sensor signal, and
   the control means reduces the assist force when there remains only one output element in which failure is not detected by the abnormality detecting means.

8. The electric power steering device according to claim 1, further comprising a vehicle speed sensor that detects a vehicle speed, wherein
   the rotation sensor has a plurality of output elements that output the sensor signal,
   the control means controls the operation of the steering force assist device to generate a greater assist force as the vehicle speed becomes smaller, and
   when only one of the output elements remains in which failure is not detected by the abnormality detecting means, the control means fixes the vehicle speed to a high vehicle-speed equivalent value, which is stored in advance, but not to a vehicle speed detected by the vehicle speed sensor.

9. The electric power steering device according to claim 1, further comprising:
   a steering sensor that detects a steering angle generated in a steering, and
   a steering angular velocity detecting means that detects a steering angular velocity by differentiating the steering angle, wherein the control means sets the magnitude of the assist force to zero when signs of the steering angle and the steering angular velocity are different.

10. The electric power steering device according to claim 1, wherein
the rotation sensor is a torque sensor that outputs a sensor signal based on torsion of a torsion bar provided in the middle of a steering shaft,
the electric power steering device comprises a torque detecting means that detects steering torque based on the sensor signal,
the torque sensor has a plurality of output elements that output the sensor signal,
the control means executes feedback control of the motor based on a deviation between a current command value for generating the assist force corresponding to the steering torque and an actual current that flows in the motor, and
after only one of the output elements remains in which failure is not detected, when continuing application of the assist force by using a sensor signal that is output by the residual output element, the control means sets a feedback gain used in the feedback control to be greater than a feedback gain when two or more of the output elements remain in which failure is not detected.

11. The electric power steering device according to claim 1, further comprising a vehicle speed sensor that detects a vehicle speed,
wherein the control means changes the magnitude of the instantaneous motor torque based on a vehicle speed detected by the vehicle speed sensor.

12. The electric power steering device according to claim 11, wherein the control means gradually reduces the magnitude of instantaneous motor torque to be applied as a vehicle speed becomes higher.

13. The electric power steering device according to claim 1, further comprising a lateral G sensor that detects lateral direction acceleration acting on a vehicle,
wherein the control means changes the magnitude of instantaneous motor torque based on lateral direction acceleration detected by the lateral G sensor.

14. The electric power steering device according to claim 13, wherein the control means gradually increases the magnitude of instantaneous motor torque to be applied as lateral direction acceleration becomes greater.

15. A sensor abnormality detection device comprising:
a sensor that generates a signal corresponding to displacement of an item to be detected that is displaced by drive of a drive source; and
a control device that controls the drive source based on a signal generated by the sensor, wherein
the control device includes an abnormality detecting means that detects an abnormality in a signal generated by the sensor, and
if an instantaneous control amount is not reflected in the sensor signal in a case in which the control device supplies the instantaneous control amount to the drive source, in addition to an ordinary control amount by the control device, the abnormality detecting means determines that a sensor signal is abnormal.

* * * * *